US012655315B2

(12) United States Patent
Yamamoto et al.

(10) Patent No.: US 12,655,315 B2
(45) Date of Patent: Jun. 16, 2026

(54) POLYTETRAFLUOROETHYLENE AQUEOUS DISPERSION

(71) Applicant: DAIKIN INDUSTRIES, LTD., Osaka (JP)

(72) Inventors: Emi Yamamoto, Osaka (JP); Takuya Yamabe, Osaka (JP); Yoshihiro Soda, Osaka (JP); Taku Yamanaka, Osaka (JP); Takahiro Taira, Osaka (JP); Yohei Fujimoto, Osaka (JP); Taketo Kato, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 1045 days.

(21) Appl. No.: 17/687,086

(22) Filed: Mar. 4, 2022

(65) Prior Publication Data

US 2022/0275237 A1 Sep. 1, 2022

Related U.S. Application Data

(63) Continuation of application No. PCT/JP2020/033806, filed on Sep. 7, 2020.

(30) Foreign Application Priority Data

Sep. 5, 2019 (JP) ................................ 2019-162321

(51) Int. Cl.

| | |
|---|---|
| ***C09D 127/18*** | (2006.01) |
| ***C08F 2/22*** | (2006.01) |
| ***C08F 14/26*** | (2006.01) |
| ***C08J 5/18*** | (2006.01) |
| ***C09D 7/20*** | (2018.01) |
| ***C09D 7/63*** | (2018.01) |

(52) U.S. Cl.

CPC .............. *C09D 127/18* (2013.01); *C08F 2/22* (2013.01); *C08F 14/26* (2013.01); *C08J 5/18* (2013.01); *C09D 7/20* (2018.01); *C09D 7/63* (2018.01); *C08J 2327/18* (2013.01)

(58) Field of Classification Search

CPC .......... C08L 27/18; C08L 71/02; C08F 14/26; C08F 2/26

See application file for complete search history.

(56) References Cited

U.S. PATENT DOCUMENTS

| | | | | |
|---|---|---|---|---|
| 2004/0242753 | A1 | 12/2004 | Tomihashi et al. | |
| 2007/0015857 | A1 | 1/2007 | Hoshikawa et al. | |
| 2009/0286932 | A1 | 11/2009 | Sawauchi et al. | |
| 2013/0231020 | A1* | 9/2013 | Liao ........................ | D06N 3/047 524/546 |
| 2015/0329701 | A1* | 11/2015 | Tsuda ................. | C08G 65/2609 106/499 |
| 2016/0347966 | A1 | 12/2016 | Dadalas et al. | |
| 2018/0298160 | A1 | 10/2018 | Kobayashi et al. | |
| 2020/0056031 | A1 | 2/2020 | Kobayashi et al. | |
| 2020/0255551 | A1 | 8/2020 | Taira et al. | |
| 2023/0203297 | A1* | 6/2023 | Yamabe ................. | C09D 5/027 525/326.4 |

FOREIGN PATENT DOCUMENTS

| | | | |
|---|---|---|---|
| EP | 1 472 307 | A0 | 7/2003 |
| EP | 1 917 384 | A0 | 2/2007 |
| EP | 1 939 252 | A1 | 7/2008 |
| EP | 2 826 550 | A1 | 1/2015 |
| EP | 3 546 517 | A1 | 10/2019 |
| JP | 4-370161 | A | 12/1992 |
| JP | 2003-171570 | A | 6/2003 |
| JP | 2014-508193 | A | 4/2014 |
| JP | 2017-511394 | A | 4/2017 |
| WO | 03/011991 | A1 | 2/2003 |
| WO | 2007/007422 | A1 | 1/2007 |
| WO | 2008/004614 | A1 | 1/2008 |
| WO | 2017/094798 | A1 | 6/2017 |
| WO | 2018/097141 | A1 | 5/2018 |
| WO | 2018/102187 | A1 | 6/2018 |
| WO | 2018/199034 | A1 | 11/2018 |
| WO | 2019/031617 | A1 | 2/2019 |

OTHER PUBLICATIONS

International Search Report for PCT/JP2020/033806, dated Nov. 17, 2020.
International Preliminary Report on Patentability with Written Opinion dated Mar. 8, 2022 in International Application No. PCT/JP2020/033806.
Extended European Search Report dated Dec. 19, 2023 in counterpart European Application No. 20860627.7.
Extended European Search Report dated Sep. 18, 2023 in Application No. 20860627.7.

* cited by examiner

*Primary Examiner* — Mark S Kaucher
(74) *Attorney, Agent, or Firm* — Sughrue Mion, PLLC

(57) ABSTRACT

A PTFE aqueous dispersion having low viscosity at high temperature. The PTFE aqueous dispersion contains PTFE and a nonionic surfactant, has a PTFE solid concentration of 50 to 70% by mass, is substantially free from a fluorine-containing surfactant, and has a viscosity at 55° C. of 50 mPa·s or lower. Also disclosed is a method for producing the PTFE aqueous dispersion, a coating film obtained by applying the PTFE aqueous dispersion, an impregnated film obtained by impregnating the PTFE aqueous dispersion, and a coated article containing a coating film obtained by applying the PTFE aqueous dispersion.

19 Claims, 1 Drawing Sheet

POLYTETRAFLUOROETHYLENE AQUEOUS DISPERSION

CROSS-REFERENCE TO RELATED APPLICATIONS

This application is a Rule 53(b) Continuation of International Application No. PCT/JP2020/033806 filed Sep. 7, 2020, which claims priority based on Japanese Patent Application No. 2019-162321 filed Sep. 5, 2019, the respective disclosures of which are incorporated herein by reference in their entireties.

TECHNICAL FIELD

The disclosure relates to polytetrafluoroethylene aqueous dispersions.

BACKGROUND ART

Polytetrafluoroethylene (hereinafter, referred to as "PTFE") is commonly produced by emulsion polymerization of tetrafluoroethylene (hereinafter, referred to as "TFE") in an aqueous medium using a surfactant. Emulsion polymerization can provide an aqueous dispersion in which PTFE particles are dispersed in an aqueous medium. Adding a nonionic surfactant as a dispersant to the aqueous dispersion is a known technique to stabilize the aqueous dispersion.

For example, Patent Literature 1 discloses a PTFE aqueous dispersion containing from 15 to 70% by mass of PTFE particles having an average primary particle size of 0.1 to 0.5 μm; from 0.1 to 20,000 ppm, to the mass of the above PTFE particles, of a fluorine-containing surfactant selected from the group consisting of C4-C7 fluorine-containing carboxylic acids which may have an etheric oxygen atom, and salts thereof; from 1 to 20 parts by mass, per 100 parts by mass of the above PTFE particles, of a nonionic surfactant having a specific structure; from 0.01 to 3.0 parts by mass, per 100 parts by mass of the above PTFE particles, of a compound having a specific structure; and water.

Patent Literature 2 discloses an aqueous dispersion containing a tetrafluoroethylene core-shell polymer and at least one non-fluorinated nonionic surfactant corresponding to the formula:

$$R_1O—[CH_2CH_2O]_n—[R_2O]_mR^3 \quad (I)$$

(wherein $R_1$ represents a linear or branched aliphatic hydrocarbon group having at least 6 carbon atoms, preferably 8 to 18 carbon atoms, $R^2$ represents an alkylene unit having 3 or 4 carbon atoms, R3 represents hydrogen, a $C_1$-$C_3$ alkyl group, or a $C_1$-$C_3$ hydroxyalkyl group, n has a value of 0 to 40, m has a value of 0 to 40, and the sum of n+m is at least 2), wherein the core-shell polymer contains an outer shell that has a greater molecular weight than the core and wherein the dispersion is essentially free of fluorinated emulsifiers corresponding to the formula:

$$Y—R_f—Z—M$$

(wherein Y represents hydrogen, Cl, or F, $R_f$ represents a linear or branched perfluorinated or partially fluorinated alkylene wherein the alkylene chain may be interrupted once or more than once by oxygen atoms, Z represents an acid anion or a plurality thereof, M represents a counter cation or a plurality thereof), and wherein essentially free means an amount of less than 50 ppm and including 0 ppm based on the weight of the dispersion.

Patent Literature 3 discloses an aqueous dispersion of fluoropolymers containing: (a) from 45 to 70 weight %, based on the total weight of the dispersion, of PTFE particles, the PTFE particles being non melt-processible; (b) from 1 to 15 weight % of a nonionic surfactant; and (c) from 1 to 10 weight % of a water-soluble alkaline earth metal salt, or from 0.1 to 10 weight % of a colloidal silica, wherein the weight % of component (b) or (c) is based on the weight of the PTFE particles.

CITATION LIST

Patent Literature

Patent Literature 1: WO 2017/094798
Patent Literature 2: JP 2017-511394 T
Patent Literature 3: JP 2014-508193 T

SUMMARY

The disclosure provides a PTFE aqueous dispersion containing PTFE and a nonionic surfactant, having a PTFE solid concentration of 50 to 70% by mass, being substantially free from a fluorine-containing surfactant, and having a viscosity at 55° C. of 50 mPa·s or lower.

Advantageous Effects

The PTFE aqueous dispersion of the disclosure has low viscosity at high temperature.

BRIEF DESCRIPTION OF THE DRAWINGS

FIG. 1(*a*) is a plan view seen from the top and FIG. 1(*b*) is a side view.

DESCRIPTION OF EMBODIMENTS

Figure 1:
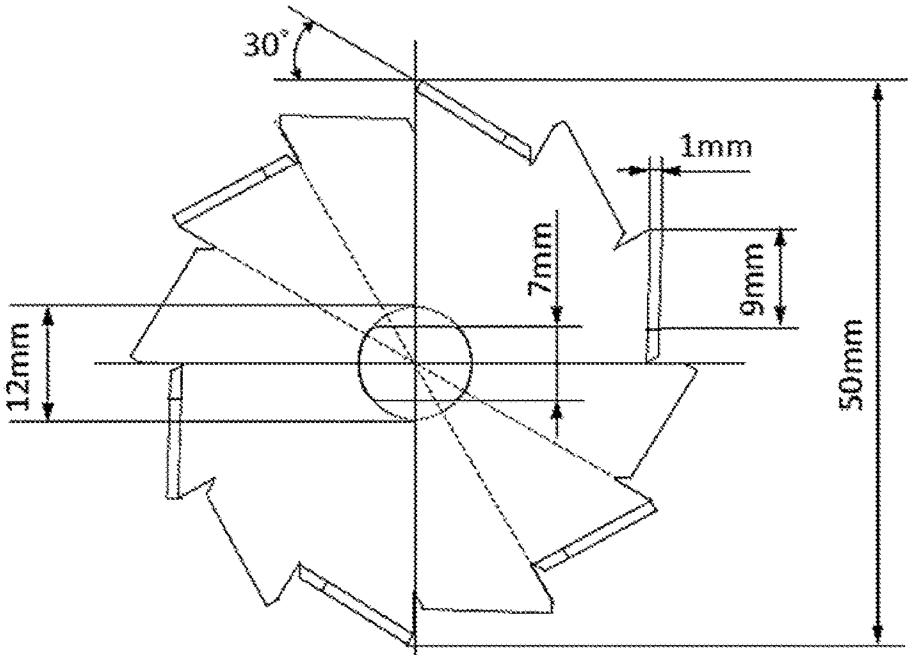
FIGS. 1(*a*) and 1(*b*) include figures of a stirring blade used for evaluating the mechanical stability.
Figure 1:
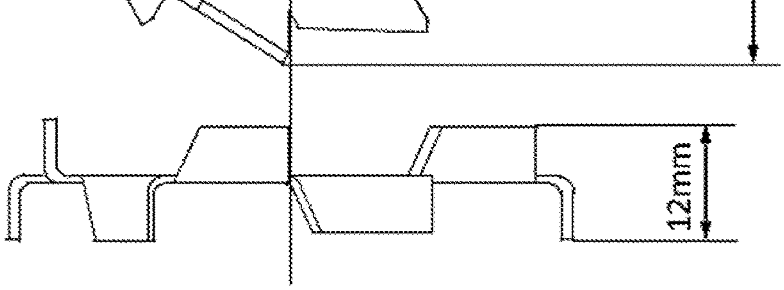

The PTFE aqueous dispersion of the disclosure (hereinafter, also referred to as a "first PTFE aqueous dispersion of the disclosure") contains PTFE (or a PTFE resin particulate) and a nonionic surfactant. The PTFE has a solid concentration of 50 to 70% by mass, is substantially free from a fluorine-containing surfactant, and has a viscosity at 55° C. of 50 mPa·s or lower.

The first PTFE aqueous dispersion of the disclosure has a viscosity at 55° C. of 50 mPa·s or lower. The first PTFE aqueous dispersion of the disclosure having a viscosity at 55° C. of 50 mPa·s or lower is particularly suitable for use at high temperature such as use in the field of impregnation into a fibrous substrate. Impregnation includes baking and therefore easily causes a high temperature environment. Still, the first PTFE aqueous dispersion of the disclosure exhibits good permeability into a fibrous substrate even in a high temperature environment and thus can uniformly impregnate thereinto. The viscosity at 55° C. is preferably 45 mPa·s or lower, more preferably 40 mPa·s or lower, still more preferably 35 mPa·s or lower. The lower limit of the viscosity at 55° C. may be, but is not limited to, 10 mPa·s or higher, for example.

The first PTFE aqueous dispersion of the disclosure preferably has a ratio (viscosity at 55° C.)/(viscosity at 25° C.) of 4.00 or lower. The first PTFE aqueous dispersion of the disclosure is particularly suitable for use in impregnation into a fibrous substrate. Impregnation includes baking and therefore easily causes a high temperature environment. The amount of PTFE sticking to the fibrous substrate during impregnation is easily influenced by the viscosity of the aqueous dispersion, which generates a demand for an aqueous dispersion having a low viscosity-temperature dependence. The first PTFE aqueous dispersion of the disclosure, the above ratio of which is 4.00 or lower, is excellent in that it has a low viscosity-temperature dependence and has stable quality.

From this viewpoint, the ratio (viscosity at 55° C.)/(viscosity at 25° C.) is more preferably 3.00 or lower, still more preferably 2.00 or lower, further more preferably 1.50 or lower, still further more preferably 1.20 or lower, particularly preferably 1.10 or lower, more particularly preferably 1.00 or lower.

The viscosity at 25° C. is a value measured using a B-type rotational viscometer under the conditions described in Examples later. The viscosity at 55° C. is a value obtained by increasing the liquid temperature up to 55° C., maintaining the liquid for 60 minutes, and then performing the measurement under the same conditions as for the measurement at 25° C. In the case of 80 mPa·s or higher, a viscosity-increasing phenomenon occurs over time in the viscosity measurement. Thus, the viscosity is measured after 5 minutes and 10 minutes from the start of measurement and the average thereof is used.

The first PTFE aqueous dispersion of the disclosure preferably has a viscosity-temperature transition (VTT) of higher than 55° C., more preferably 60° C. or higher. A viscosity-temperature transition of higher than 55° C. means a technical significance of eliminating the need for changing the processing conditions between 25° C. and 55° C.

VTT indicates the viscosity-temperature dependence of the PTFE aqueous dispersion. VTT is obtainable by increasing the PTFE aqueous dispersion up to 25° C., 35° C., 45° C., and 55° C., maintaining the PTFE aqueous dispersion at the respective temperatures for 60 minutes, and then performing the measurement using a B-type rotational viscometer under the conditions described in Examples later. The VTT point is a temperature at which the viscosity again reaches the same value as obtained in the measurement at 25° C. In the case of 80 mPa·s or higher, a viscosity-increasing phenomenon occurs over time in the viscosity measurement. Thus, the viscosity is measured after 5 minutes and 10 minutes from the start of measurement and the average thereof is used.

The PTFE in the first PTFE aqueous dispersion of the disclosure has a solid concentration of 50 to 70% by mass. The solid concentration is preferably 55% by mass or more, more preferably 57% by mass or more, while preferably 65% by mass or less, more preferably 60% by mass or less. Even though the PTFE has a solid concentration within the above range, the aqueous dispersion of the disclosure is able to have a viscosity at 55° C. of 50 mPa·s or lower.

The first PTFE aqueous dispersion of the disclosure contains the nonionic surfactant in an amount of preferably 4% by mass or more, more preferably 5% by mass or more, still more preferably 5.5% by mass or more, while preferably 12% by mass or less, more preferably 10% by mass or less, still more preferably 8% by mass or less, further more preferably 7% by mass or less, relative to the PTFE.

Too large an amount of the nonionic surfactant may cause too high a viscosity. Too small an amount thereof may cause poor storage stability and poor mechanical stability.

The nonionic surfactant is preferably a nonionic surfactant containing no fluorine. An example thereof is a compound represented by the following formula (i):

$$R^3\text{—O—}A^1\text{—H} \quad (i)$$

wherein $R^3$ is a C8-C18 linear or branched primary or secondary alkyl group; and $A^1$ is a polyoxyalkylene chain.

$R^3$ preferably has a carbon number of 8 to 16, more preferably 10 to 14. $R^3$ having a carbon number within the above range can lead to high affinity with the PTFE in the aqueous dispersion, a much lower viscosity at 55° C., and excellent mechanical stability.

$R^3$ is preferably an alkyl group represented by the following formula (i-1):

$$CH_2R^{31}R^{32}, \text{—} \quad (i\text{-}1)$$

(wherein $R^{31}$ is a hydrogen atom or a C1-C16 alkyl group; $R^{32}$ is a C1-C17 alkyl group; and $R^{31}$ and $R^{32}$ have a total carbon number of 7 to 17). $R^{31}$ is more preferably a hydrogen atom or a C1-C15 alkyl group, still more preferably a hydrogen atom or a C1-$C_{12}$ alkyl group, further more preferably a hydrogen atom or a C1-C10 alkyl group. $R^{32}$ is more preferably a C1-C15 alkyl group, still more preferably a C1-$C_{14}$ alkyl group, further more preferably a C1-C13 alkyl group.

$R^3$ is preferably a C8-C18 alkyl group having an average number of methyl groups of 2.0 or more. The average number of methyl groups of $R^3$ is more preferably 2.5 or more, still more preferably 3.0 or more, further more preferably 3.5 or more, particularly preferably 4.0 or more. The upper limit of the average number of methyl groups of $R^3$ is preferably 12 or less, more preferably 10 or lower, still more preferably 8 or less.

$R^3$ preferably has an average number of methyl groups per molecule of 4.0 or more, more preferably 4.3 or more, still more preferably 4.7 or more, most preferably 5.0 or more. $R^3$ is particularly preferably a 2,6,8-trimethyl-4-nonyl group.

The average number of methyl groups herein is a value obtained by Soxhlet extraction on a sample combined with methanol and 1H-NMR measurement on the extract.

Examples of commercially available products of the nonionic surfactant include Genapol X080 (product name, available from Clariant), Noigen TDS series (available from DKS Co., Ltd.) such as Noigen TDS-80 (trade name) and Noigen TDS-100 (trade name), Leocol TD series (available from Lion Corp.) such as Leocol TD-90 (trade name), Lionol (registered trademark) TD series (available from Lion Corp.), T-Det A series (available from Harcros Chemicals) such as T-Det A138 (trade name), Tergitol (registered trademark) 15S series (available from Dow), and Dispanol TOC (trade name, available from NOF Corp.).

The nonionic surfactant may be a mixture of two different nonionic surfactants. For example, it may be a mixture of a compound represented by the formula (i) wherein $A^1$ is a polyoxyalkylene chain having an average number of oxyethylene units of 7.0 to 12.0 and an average number of oxypropylene units of 0.0 to 2.0 and a compound represented by the formula (i) wherein $A^1$ is a polyoxyalkylene chain having an average number of oxyethylene units of 10.0 to 12.0.

For example, the nonionic surfactant may also be a mixture of a compound represented by the formula (i) wherein $A^1$ has an average number of oxyethylene units of 7.0 or more and less than 10.0 and a compound represented by the formula (i) wherein $A^1$ is a polyoxyalkylene chain having an average number of oxyethylene units of 10.0 or more and 12.0 or less.

The nonionic surfactant is more preferably poly(oxyethylene) 2,6,8-trimethyl-4-nonyl ether having an average number of oxyethylene units of 4.0 to 18.0, poly(oxyethylene) 2,6,8-trimethyl-4-nonyl ether having an average number of oxyethylene units of 6.0 to 12.0, or a mixture thereof. Such types of nonionic surfactants are commercially available as Tergitol TMN-6, Tergitol TMN-10, and Tergitol TMN-100X (product names, available from Dow Chemical), for example.

The average number of oxyalkylene units of $A^1$ in the formula (i) is preferably 5.0 to 20.0, more preferably 8.0 to 15.0, still more preferably 10.0 to 12.0.

In particular, $A^1$ preferably contains an oxyethylene unit and the average number of oxyethylene units is preferably 10.1 or more, more preferably 10.2 or more, while preferably 10.8 or less, more preferably 10.7 or less, still more preferably 10.6 or less, further more preferably 10.5 or less. The average number of oxyalkylene units herein is a value obtained by Soxhlet extraction on a sample combined with methanol and 1H-NMR measurement on the extract.

$A^1$ in the formula (i) may include an oxyethylene unit and an oxypropylene unit. For example, it may be a polyoxyalkylene chain having an average number of oxyethylene units of 5.0 to 20.0 and an average number of oxypropylene units of 0.0 to 2.0. The number of oxyethylene units may have either a wide or narrow unimodal distribution that is commonly provided or a wider or bimodal distribution that is obtainable by blending. When the average number of oxypropylene units is more than 0.0, the oxyethylene units and the oxypropylene units in the polyoxyalkylene chain may be arranged in a block manner or may be arranged in a random manner.

In terms of the viscosity and mechanical stability of the PTFE aqueous dispersion, the polyoxyalkylene chain preferably has an average number of oxyethylene units of 7.0 to 12.0 and an average number of oxypropylene units of 0.0 to 2.0. $A^1$ preferably has an average number of propylene units of 0.5 to 1.5 so as to achieve good low-foaming performance.

The nonionic surfactant preferably has a HLB value of 13.00 or higher, more preferably 13.20 or higher, still more preferably 14.00 or higher, further more preferably 14.05 or higher, particularly preferably 14.10 or higher, while preferably 14.50 or lower, more preferably 14.40 or lower, still more preferably 14.30 or lower, further more preferably 14.20 or lower, particularly preferably 14.15 or lower. A HLB value within the above range can lead to low viscosity at high temperature while maintaining the mechanical stability.

The HLB value means a value calculated using the Griffin's formulas: HLB=E/5 (wherein E is weight % of ethylene oxide in the molecule); HLB=(E+P)/5 (wherein E is defined as described above; and P is weight % of polyhydric alcohol in the molecule); and HLB=20 (1-S/N)/5 (wherein S is a saponification value of ester; and N is a neutralization value of fatty acid constituting the ester).

In the case of using two or more nonionic surfactants, the HLB value is calculated from the HLB values of the respective nonionic surfactants and the mass ratio thereof. For example, in the case of using a 60% by mass of a nonionic surfactant having a HLB value of 14.00 and 40% by mass of a nonionic surfactant having a HLB value of 15.00 relative to the total amount of the nonionic surfactants, the HLB value is $14.00 \times 0.6 + 15.00 \times 0.4 = 14.40$.

In order to provide the aqueous dispersion of the disclosure, adding two nonionic surfactants having different hydrophilicity is preferred. An index of the difference in hydrophilicity may be the above HLB value. For example, the aqueous dispersion of the disclosure preferably contains a nonionic surfactant having a HLB value of 13.00 or higher and lower than 14.10 and a nonionic surfactant having a HLB value of 14.10 or higher and 15.00 or lower. Adding nonionic surfactants having different HLB values can also reduce foaming without adding an antifoam.

For example, the aqueous dispersion of the disclosure also preferably contains a nonionic surfactant having a HLB value of 13.00 or higher and lower than 13.50 and a nonionic surfactant having a HLB value of 13.50 or higher and 15.00 or lower (preferably 14.50 or lower, more preferably 14.00 or lower).

The cloud point of a nonionic surfactant is a scale of the solubility of a surfactant in water. The surfactant used in the aqueous dispersion of the disclosure has a cloud point of 30° C. to 90° C., preferably 35° C. to 85° C., more preferably 40° C. to 80° C., still more preferably 45° C. to 75° C.

In order to provide the aqueous dispersion of the disclosure, adding two nonionic surfactants having different cloud points is preferred. For example, the aqueous dispersion of the disclosure preferably contains a nonionic surfactant having a cloud point of 30° C. or higher and 60° C. or lower and a nonionic surfactant having a cloud point of higher than 60° C. and 90° C. or lower, more preferably contains a nonionic surfactant having a cloud point of 35° C. to 60° C. and a nonionic surfactant having a cloud point of 65° C. to 80° C. Using a nonionic surfactant having a high cloud point can improve the mechanical stability. Adding nonionic surfactants having different cloud points can also reduce foaming without adding an antifoam.

For example, the aqueous dispersion of the disclosure also preferably contains a nonionic surfactant having a cloud point of 30° C. or higher and 60° C. or lower and a nonionic surfactant having a cloud point of higher than 60° C. and 90° C. or lower, more preferably contains a nonionic surfactant having a cloud point of 35° C. to 60° C. and a nonionic surfactant having a cloud point of 65° C. to 80° C.

A viscosity at 55° C. of 50 mPa·s or lower as described above can be achieved by appropriately adjusting the HLB value and average number of oxyalkylene units of the nonionic surfactant. For example, the HLB value and average number of oxyalkylene units of the nonionic surfactant are preferably adjusted to respectively 14.05 to 14.35 and 10.2 to 10.9.

In a more specific structure, preferably, the nonionic surfactant is a mixture of a compound (first component) represented by the formula (i) (wherein $R^3$ is a 2,6,8-trimethyl-4-nonyl group and $A^1$ is a polyoxyethylene chain having an average number of oxyethylene units of 7.0 to 9.0) and a compound (second component) represented by the formula (i) (wherein $R^3$ is a 2,6,8-trimethyl-4-nonyl group and $A^1$ is a polyoxyethylene chain having an average number of oxyethylene units of 10.0 to 12.0), the first component being contained in an amount of 5% by mass or more and 25% by mass or less and the second component being contained in an amount of 75% by mass or more and 95% by mass or less. The nonionic surfactant contains the first component in an amount of more preferably 10% by mass or more and 15% by mass or less and contains the second component in an amount of more preferably 85% by mass or more and 90% by mass or less.

A viscosity at 55° C. of 50 mPa·s or lower as described above can be achieved by appropriately adjusting the HLB value and average number of oxyalkylene units of the nonionic surfactant. For example, the HLB value and average number of oxyalkylene units of the nonionic surfactant are preferably adjusted to respectively 13.00 to 13.50 and 7.0 to 12.0.

In a more specific structure, preferably, the nonionic surfactant is a mixture of a compound (first component) represented by the formula (i) (wherein $A^1$ is a polyoxyethylene chain having an average number of oxyethylene units of 7.0 to 9.5) and a compound (second component) represented by the formula (i) (wherein $A^1$ is a polyoxyethylene chain having an average number of oxyethylene units of 10.0 to 12.0, the first component being contained in an amount of 40% by mass or more and 70% by mass or less and the second component being contained in an amount of 30% by mass or more and 60% by mass or less. The nonionic surfactant contains the first component in an amount of more preferably 45% by mass or more and 65% by mass or less and contains the second component in an amount of more preferably 35% by mass or more and 55% by mass or less.

The PTFE may be a homopolymer of TFE or may be a modified PTFE containing 99.0% by mass or more of a polymerized unit based on TFE and 1.0% by mass or less of a polymerized unit based on a modifying monomer. In order to achieve much improved mechanical stability at high temperature, a modified PTFE is preferred.

The modified PTFE preferably contains the polymerized unit based on a modifying monomer (hereinafter, also referred to as a "modifying monomer unit") within the range of 0.00001 to 1.0% by mass. The lower limit of the modifying monomer unit is more preferably 0.0001% by mass, still more preferably 0.001% by mass, further preferably 0.005% by mass, further more preferably 0.010% by mass, still further more preferably 0.030% by mass. The upper limit of the modifying monomer unit is preferably 0.90% by mass, more preferably 0.50% by mass, still more preferably 0.40% by mass, further more preferably 0.30% by mass.

The modifying monomer unit herein means a portion that is part of the molecular structure of the PTFE and is derived from a modifying monomer.

The amounts of the respective monomers constituting the PTFE herein can be calculated by appropriate combination of NMR, FT-IR, elemental analysis, and X-ray fluorescence analysis in accordance with the types of the monomers.

The modifying monomer may be any monomer copolymerizable with TFE. Examples thereof include perfluoroolefins such as hexafluoropropylene (HFP); hydrogen-containing fluoroolefins such as trifluoroethylene and vinylidene fluoride (VDF); perhaloolefins such as chlorotrifluoroethylene; perfluorovinyl ether; perfluoroallyl ether; a (perfluoroalkyl)ethylene; and ethylene. These modifying monomers may be used alone or in combination.

The perfluorovinyl ether may be, but is not limited to, an unsaturated perfluoro compound represented by the following formula (A):

$$CF_2{=}CF{-}ORf \qquad (A)$$

(wherein Rf is a perfluoro organic group). The term "perfluoro organic group" herein means an organic group in which all hydrogen atoms bonded to any carbon atom are replaced by fluorine atoms. The perfluoro organic group may have ether oxygen.

An example of the perfluorovinyl ether is a perfluoro (alkyl vinyl ether) (PAVE) represented by the formula (A) wherein Rf is a C1-C10 perfluoroalkyl group. The perfluoroalkyl group preferably has a carbon number of 1 to 5.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group.

Examples of the perfluorovinyl ether further include:

those represented by the formula (A) wherein Rf is a C4-C9 perfluoro(alkoxyalkyl) group;

those represented by the formula (A) wherein Rf is a group represented by the following formula:

[Chem. 1]

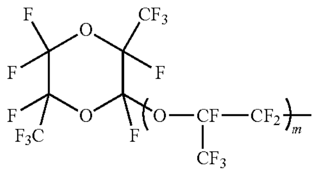

wherein m is 0 or an integer of 1 to 4; and those represented by the formula (A) wherein Rf is a group represented by the following formula:

[Chem. 2]

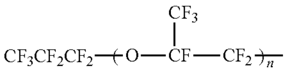

wherein n is an integer of 1 to 4.

Examples of the (perfluoroalkyl)ethylene (PFAE) include, but are not limited to, (perfluorobutyl)ethylene (PFBE) and (perfluorohexyl)ethylene.

An example of the perfluoroallyl ether is a fluoromonomer represented by the formula:

$$CF_2{=}CF{-}CF_2{-}ORf^{11}$$

wherein $Rf^{11}$ is a perfluoro organic group.

$Rf^{11}$ is preferably a C1-C10 perfluoroalkyl group or a C1-C10 perfluoroalkoxyalkyl group. The perfluoroallyl ether preferably includes at least one selected from the group consisting of $CF_2{=}CF{-}CF_2{-}O{-}CF_3$, $CF_2{=}CF{-}CF_2{-}O{-}C_2F_5$, $CF_2{=}CF{-}CF_2{-}O{-}C_3F_7$, and $CF_2{=}CF{-}CF_2{-}O{-}C_4F_9$, more preferably includes at least one selected from the group consisting of $CF_2{=}CF{-}CF_2{-}O{-}C_2F_5$, $CF_2{=}CF{-}CF_2{-}O{-}C_3F_7$, and $CF_2{=}CF{-}CF_2{-}O{-}C_4F_9$, and is still more preferably $CF_2{=}CF{-}CF_2{-}O{-}CF_2CF_2CF_3$.

The modifying monomer may also be a cyclic monomer. The cyclic monomer is preferably a vinyl heterocycle represented by the following formula (ii):

[Chem. 3]

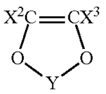

(ii)

(wherein $X^2$ and $X^3$ are the same as or different from each other, and are each a hydrogen atom or a fluorine atom; Y is $-CR^1R^2-$; and $R^1$ and $R^2$ are the same as or different from each other, and are each a fluorine atom, a C1-C6 alkyl group, or a C1-C6 fluoroalkyl group).

The vinyl heterocycle represented by the formula (ii) is preferably one in which $X^2$ and $X^3$ are each a fluorine atom or preferably one in which $R^1$ and $R^2$ are each a C1-C6 fluoroalkyl group, for example.

The vinyl heterocycle represented by the formula (ii) is preferably perfluoro-2,2-dimethyl-1,3-dioxole (PDD) in which $X^2$ and $X^3$ are each a fluorine atom and $R^1$ and $R^2$ are each a perfluoromethyl group.

In terms of the transparency of a coating film, the modifying monomer preferably includes at least one selected from the group consisting of PAVE, PFAE, and the cyclic monomer.

Also, a preferred example of the modifying monomer is a modifying monomer (3) having a monomer reactivity ratio of 0.1 to 8. The presence of the modifying monomer (3) can lead to a PTFE particulate having a small particle size and can lead to an aqueous dispersion having high dispersion stability.

The monomer reactivity ratio in copolymerization with TFE refers to a value obtained by dividing the rate constant in a reaction between propagating radicals and TFE in the case where the number of the propagating radicals is smaller than that of TFE-based repeating units by the rate constant in a reaction between the propagating radicals and the modifying monomer. The lower the value is, the higher the reactivity of the modifying monomer with TFE is. The monomer reactivity ratio can be calculated using the Fineman-Ross equation from the formulation of the polymer generated immediately after the start of copolymerization between TFE and the modifying monomer.

The copolymerization is performed in a 6.0-L-capacity stainless steel autoclave charged with 3600 g of deionized degassed water, ammonium perfluorooctanoate in an amount of 1000 ppm relative to the water, and 100 g of paraffin wax at a pressure of 0.78 MPa and a temperature of 70° C. To the reactor is added 0.05 g, 0.1 g, 0.2 g, 0.5 g, or 1.0 g of a modifying monomer, followed by 0.072 g of ammonium persulfate (20 ppm relative to the water). TFE is fed continually so as to maintain the polymerization pressure at 0.78 MPa. When the amount of TFE fed reaches 1000 g, stirring is stopped and the reactor is depressurized to the atmospheric pressure. The system is cooled and paraffin wax is then separated, whereby an aqueous dispersion containing a generated polymer is obtained. The aqueous dispersion is stirred so that the generated polymer coagulates, and then dried at 150° C. The formulation in the resulting generated polymer is calculated by appropriate combination of NMR, FT-IR, elemental analysis, and X-ray fluorescence analysis in accordance with the types of the monomers.

The modifying monomer (3) having a monomer reactivity ratio of 0.1 to 8 preferably includes at least one selected from the group consisting of modifying monomers represented by the formulas (3a) to (3d):

$$CH_2{=}CH{-}Rf^1 \quad (3a)$$

wherein $Rf^1$ is a C1-C10 perfluoroalkyl group;

$$CF_2{=}CF{-}O{-}Rf^2 \quad (3b)$$

wherein $Rf^2$ is a C1-C2 perfluoroalkyl group;

$$CF_2{=}CF{-}O{-}(CF_2)_nCF{=}CF_2 \quad (3c)$$

wherein n is 1 or 2; and

[Chem. 4]

(3d)

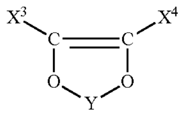

wherein $X^3$ and $X^4$ are each F, Cl, or a methoxy group; and Y is the formula Y1 or Y2:

[Chem. 5]

$$—CF{=}CF— \quad (Y1)$$

(Y2)

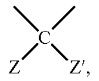

in the formula Y2, Z and Z' are each F or a C1-C3 fluorinated alkyl group.

The modifying monomer (3) is preferably in an amount within a range of 0.00001 to 1.0% by mass relative to the PTFE. The lower limit is more preferably 0.0001% by mass, still more preferably 0.001% by mass, further preferably 0.005% by mass, further more preferably 0.010% by mass, still further more preferably 0.030% by mass. The upper limit is preferably 0.90% by mass, more preferably 0.50% by mass, still more preferably 0.40% by mass, further more preferably 0.30% by mass.

In terms of low viscosity at high temperature and excellent mechanical stability at high temperature, the modifying monomer preferably includes at least one selected from the group consisting of hexafluoropropylene, vinylidene fluoride, a fluoro(alkyl vinyl ether), perfluoroallyl ether, a (perfluoroalkyl)ethylene, ethylene, and a modifying monomer containing a functional group reactive in radically polymerization and a hydrophilic group.

The modifying monomer also preferably includes at least one selected from the group consisting of hexafluoropropylene, a perfluoro(alkyl vinyl ether), and a (perfluoroalkyl) ethylene, is more preferably a perfluoro(alkyl vinyl ether), still more preferably perfluoro(propyl vinyl ether) (hereinafter, also referred to as PPVE).

The total amount of the hexafluoropropylene unit, the perfluoro(alkyl vinyl ether) unit, and the (perfluoroalkyl) ethylene unit is preferably within a range of 0.00001 to 1% by mass relative to the PTFE. The lower limit of the total amount is more preferably 0.0001% by mass, still more preferably 0.001% by mass, further preferably 0.005% by mass, further more preferably 0.010% by mass, still further more preferably 0.030% by mass. The upper limit is more preferably 0.50% by mass, still more preferably 0.40% by mass, further more preferably 0.30% by mass.

The modifying monomer is also preferably a modifying monomer (hereinafter, referred to as a "modifying monomer (4)") containing a functional group reactive in radical polymerization and a hydrophilic group. The presence of a polymerized unit based on the modifying monomer (4) can lead to a PTFE particulate having a small particle size and can lead to an aqueous dispersion having high dispersion stability.

In the polymerization for producing a PTFE, the modifying monomer (4) is preferably in an amount that exceeds the amount corresponding to 0.1 ppm, more preferably 5 ppm or more, still more preferably 10 ppm or more, of the aqueous medium. Too small an amount of the modifying monomer (4) may cause the resulting PTFE to have a large particle size. The modifying monomer (4) is in any amount within the above range, and the upper limit may be 5000 ppm, for example. In the above production method, the modifying monomer (4) may be added to the system during the reaction to improve the stability of the aqueous dispersion during or after the reaction.

The modifying monomer (4) has high water solubility. Thus, even when an unreacted modifying monomer (4) remains in the aqueous dispersion, it can be easily removed during condensation or coagulation and washing similarly to the fluorine-containing compound to be described later.

The modifying monomer (4) is incorporated into the generated polymer in the course of polymerization, but the concentration of the modifying monomer (4) is low in the polymerization system and only a small amount thereof is incorporated into the polymer. Thus, no issue occurs such as reduction in heat resistance of the PTFE or coloring after baking.

The modifying monomer (4) contains a functional group reactive in radical polymerization and a hydrophilic group. Examples of the hydrophilic group in the modifying monomer (4) include $—NH_2$, $—PO_3M$, $—OPO_3M$, $—SO_3M$, $—OSO_3M$, and —COOM (wherein M is H, a metal atom, $NR^7_4$, imidazolium optionally containing a substituent, pyridinium optionally containing a substituent, or phosphonium optionally containing a substituent; $R^7$s are each H or an organic group and are the same as or different from each other. Any two of these may bond to each other to form a ring). Preferred among these hydrophilic groups are $—SO_3M$ and —COOM. The metal atom is preferably an alkali metal, and examples of the alkali metal include Na and K.

An example of the "functional group reactive in radical polymerization" in the modifying monomer (4) is a group containing an unsaturated bond such as a vinyl group or an allyl group.

The modifying monomer (4) contains a functional group reactive in radical polymerization. Thus, when used in the above polymerization, it reacts with a fluorine-containing monomer in an early stage of the polymerization reaction, which presumably results in formation of particles containing a hydrophilic group derived from the modifying monomer (4) and having high stability. Accordingly, polymerization in the presence of the modifying monomer (4) seems to generate a large number of emulsion particles.

In the polymerization, one modifying monomer (4) may be present or two or more thereof may be present.

In the polymerization, the modifying monomer (4) may be a compound containing an unsaturated bond.

The modifying monomer (4) is preferably a compound represented by the following formula (4):

$$CX^iX^k{=}CX^jR^a—(CZ^1Z^2)_k—Y^3 \quad (4)$$

wherein $X^i$, $X^j$, and $X^k$ are each independently F, Cl, H, or $CF_3$; $Y^3$ is a hydrophilic group; $R^a$ is a linking group; $Z^1$ and $Z^2$ are each independently H, F, or $CF_3$; and k is 0 or 1.

Examples of the hydrophilic group include $—NH_2$, $—PO_3M$, $—OPO_3M$, $—SO_3M$, $—OSO_3M$, —COOM (wherein M is H, a metal atom, $NR^7_4$, imidazolium optionally containing a substituent, pyridinium optionally containing a substituent, or phosphonium optionally containing a substituent; $R^7$s are each H or an organic group and are the same as or different from each other. Any two of these may bond to each other to form a ring). Preferred among these hydrophilic groups is $—SO_3M$ or —COOM. $R^7$ is preferably H or a $C_{1-10}$ organic group, more preferably H or a $C_{1-4}$ organic group, still more preferably H or a $C_{1-4}$ alkyl group.

Examples of the metal atom include monovalent or divalent metal atoms, alkali metals (Group 1), and alkaline earth metals (Group 2). Preferred is Na, K, or Li.

$R^a$ is a linking group. The "linking group" herein means a divalent linking group. The linking group may be a single bond and preferably contains at least one carbon atom. The number of carbon atoms may be 2 or more, 4 or more, 8 or more, 10 or more, or 20 or more. The upper limit may be, but is not limited to, 100 or lower or 50 or lower.

The linking group may be linear or branched, may have a cyclic or acyclic structure, may be saturated or unsaturated, may be substituted or unsubstituted, may contain, if necessary, at least one hetero atom selected from sulfur, oxygen, and nitrogen, and may contain, if necessary, one or more functional groups selected from the group consisting of an ester, amide, sulfonamide, carbonyl, carbonate, urethane, urea, and carbamate. The linking group may contain no carbon atom and may be a catenary hetero atom such as oxygen, sulfur, or nitrogen.

For example, $R^a$ is preferably a catenary hetero atom such as oxygen, sulfur, or nitrogen or a divalent organic group.

When $R^a$ is a divalent organic group, a hydrogen atom bonded to a carbon atom may be replaced by a halogen other than fluorine, such as chlorine, and the group may or may not contain a double bond. $R^a$ may be either linear or branched and may be either cyclic or acyclic. $R^a$ may contain a functional group, such as an ester, an ether, a ketone, an amine, or a halide.

$R^a$ may also be a fluorine-free divalent organic group or may be a partially fluorinated or perfluorinated divalent organic group.

For example, $R^a$ may be a hydrocarbon group in which no fluorine atom is bonded to a carbon atom, a hydrocarbon group in which part of hydrogen atoms bonded to any carbon atom is replaced by a fluorine atom, a hydrocarbon group in which all hydrogen atoms bonded to any carbon atom are replaced by fluorine atoms, or a hydrocarbon group containing —(C═O)—, —(C═O)—O—, or —(C═O)—. These may contain an oxygen atom, may contain a double bond, and may contain a functional group.

The modifying monomer (4) preferably includes at least one selected from the group consisting of compounds represented by the following formulas (4a) to (4e):

$$CF_2{=}CF—(CF_2)_{n1}—Y^3 \quad (4a)$$

wherein n1 is an integer of 1 to 10; $Y^3$ is $—SO_3M^1$ or $—COOM^1$; and $M^1$ is H, $NH_4$, or an alkali metal;

$$CF_2{=}CF—(CF_2C(CF_3)F)_{n2}—Y^3 \quad (4b)$$

wherein n2 is an integer of 1 to 5; and $Y^3$ is defined as described above;

$$CF_2{=}CF—O—(CFX^1)_{n3}—Y^3 \quad (4c)$$

wherein $X^1$ is F or $CF_3$; n3 is an integer of 1 to 10; and $Y^3$ is defined as described above;

$$CF_2{=}CF—O—(CF_2CFX^1O)_{n4}—CF_2CF_2—Y^3 \quad (4d)$$

wherein n4 is an integer of 1 to 10; and $Y^3$ and $X^1$ are defined as described above; and $$CX^2_2{=}CFCF_2{-}O{-}(CF(CF_3)CF_2O)_{n5}{-}CF(CF_3){-}Y^3 \quad (4e)$$

wherein $X^2$s are the same as each other and are each F or H; n5 is 0 or an integer of 1 to 10; and $Y^3$ is defined as described above.

Examples of the alkali metal include Na and K.

In the formula (4a), n1 is preferably an integer of 5 or smaller, more preferably an integer of 2 or smaller. In order to achieve appropriate water solubility and interfacial activity, $Y^3$ is preferably $-COOM^1$. In order to reduce remaining as impurities and to achieve improved heat resistance of the resulting molded article, $M^1$ is preferably H or $NH_4$.

An example of a perfluorovinyl alkyl compound represented by the formula (4a) is $CF_2{=}CFCF_2COOM^1$ wherein $M^1$ is defined as described above.

In terms of emulsifying performance, n2 in the formula (4b) is preferably an integer of 3 or smaller. In order to achieve appropriate water solubility and interfacial activity, $Y^3$ is preferably $-COOM^1$. In order to reduce remaining as impurities and to achieve improved heat resistance of the resulting molded article, $M^1$ is preferably H or $NH_4$.

In terms of water solubility, n3 in the formula (4c) is preferably an integer of 5 or smaller. In order to achieve appropriate water solubility and interfacial activity, $Y^3$ is preferably $-COOM^1$. In order to achieve better dispersion stability, $M^1$ is preferably H or $NH_4$.

In terms of interfacial activity, $X^1$ in the formula (4d) is preferably $-CF_3$. In terms of water solubility, n4 is preferably an integer of 5 or smaller. In order to achieve appropriate water solubility and interfacial activity, $Y^3$ is preferably $-COOM^1$. $M^1$ is preferably H or $NH_4$.

An example of a perfluorovinyl ether compound represented by the formula (4d) is $CF_2{=}CFOCF_2CF(CF_3)OCF_2CF_2COOM^1$, wherein $M^1$ is H, $NH_4$, or an alkali metal.

In terms of emulsifying performance, n5 in the formula (4e) is preferably 0 or an integer of 1 to 5, more preferably 0, 1, or 2, still more preferably 0 or 1. In order to achieve appropriate water solubility and interfacial activity, $Y^3$ is preferably $-COOM^1$. In order to reduce remaining as impurities and to achieve improved heat resistance of the resulting molded article, $M^1$ is preferably H or $NH_4$.

Examples of a perfluorovinyl alkyl compound represented by the formula (4e) include $CH_2{=}CFCF_2OCF(CF_3)COOM^1$ and $CH_2{=}CFCF_2OCF(CF_3)CF_2OCF(CF_3)COOM^1$, wherein $M^1$ is defined as described above.

The PTFE preferably has a core-shell structure. An example of a fluoropolymer having a core-shell structure is a modified PTFE including a core of a high molecular weight PTFE in a particle and a shell of a lower molecular weight PTFE or modified PTFE. Examples of this modified PTFE include PTFEs disclosed in JP 2005-527652 T.

The core-shell structure may be any of the following structures.

Core: TFE homopolymer; Shell: TFE homopolymer
Core: modified PTFE; Shell: TFE homopolymer
Core: modified PTFE; Shell: modified PTFE
Core: TFE homopolymer; Shell: modified PTFE These structures each may be in embodiments of high molecular weight and low molecular weight. Examples thereof include:

a structure including a core of high molecular weight TFE homopolymer and a shell of low molecular weight TFE homopolymer;

a structure including a core of high molecular weight modified PTFE and a shell of low molecular weight TFE homopolymer;

a structure including a core of high molecular weight modified PTFE and a shell of low molecular weight modified PTFE;

a structure including a core of high molecular weight TFE homopolymer and a shell of low molecular weight modified PTFE;

a structure including a core of low molecular weight TFE homopolymer and a shell of high molecular weight TFE homopolymer;

a structure including a core of low molecular weight modified PTFE and a shell of high molecular weight TFE homopolymer;

a structure including a core of low molecular weight modified PTFE and a shell of high molecular weight modified PTFE; and a structure including a core of low molecular weight TFE homopolymer and a shell of high molecular weight modified PTFE.

The PTFE particularly preferably has a core-shell structure including a core of modified PTFE and a shell of low molecular weight PTFE. Polymerizing a monomer composition containing TFE in the presence of a chain transfer agent can provide a shell of a low molecular weight PTFE, which can lead to significantly improved mechanical stability.

The monomer composition containing TFE may consist of TFE or may contain TFE and a modifying monomer.

The modifying monomer of the modified PTFE constituting the core preferably includes at least one selected from the group consisting of PAVE, PFAE and the aforementioned cyclic monomer. Examples of the PAVE include PPVE, PEVE, and PMVE. Preferred is PPVE.

Examples of the PFAE include PFBE and (perfluorohexyl)ethylene. Preferred is PFBE.

An example of the cyclic monomer is a vinyl heterocycle represented by the aforementioned formula (ii). Preferred is perfluoro-2,2-dimethyl-1,3-dioxole (PDD).

The amount of a polymerized unit based on the modifying monomer in the modified PTFE constituting the core is preferably within a range of 0.00001 to 1.0% by mass relative to the PTFE. The lower limit is more preferably 0.0001% by mass, still more preferably 0.001% by mass, further preferably 0.005% by mass, further more preferably 0.010% by mass, still further more preferably 0.030% by mass. The upper limit is preferably 0.90% by mass, more preferably 0.50% by mass, still more preferably 0.40% by mass, further more preferably 0.30% by mass.

The low molecular weight PTFE in the shell is obtainable by polymerizing a monomer composition containing TFE in the presence of a chain transfer agent. The chain transfer agent may be any one capable of reducing the molecular weight of the PTFE constituting the shell. Examples thereof include non-peroxide organic compounds such as a water-soluble alcohol, a hydrocarbon, and a fluorinated hydrocarbon; water-soluble organic peroxides such as disuccinic acid peroxide (DSP); and persulfates such as ammonium persulfate (APS) and potassium persulfate (KPS). The chain transfer agent used in polymerization for forming the shell preferably includes at least one selected from the above non-peroxide organic compounds, water-soluble organic peroxides, and persulfates.

For the chain transfer agent, one or two or more of the non-peroxide organic compounds, one or two or more of the water-soluble organic peroxides, and one or two or more of the persulfates may be used.

In order to achieve good dispersibility and good uniformity in the reaction system, the chain transfer agent preferably includes at least one selected from the group consisting of a C1-C4 water-soluble alcohol, a C1-C4 hydrocarbon, and a C1-C4 fluorinated hydrocarbon, more preferably at least one selected from the group consisting of methane, ethane, n-butane, isobutane, methanol, and isopropanol, still more preferably at least one selected from the group consisting of methanol and isobutane.

The polymerization is commonly performed in an aqueous medium. The amount of the chain transfer agent is preferably 0.001 to 10000 ppm relative to the aqueous medium. The amount of the chain transfer agent is more preferably 0.01 ppm or more, still more preferably 0.05 ppm or more, particularly preferably 0.1 ppm or more, relative to the aqueous medium, while more preferably 1000 ppm or less, still more preferably 750 ppm or less, particularly preferably 500 ppm or less, relative to the aqueous medium.

In the PTFE having a core-shell structure, the upper limit of the proportion of the core is preferably 99.5% by mass, more preferably 99.0% by mass, still more preferably 98.0% by mass, further more preferably 97.0% by mass, particularly preferably 95.0% by mass, most preferably 90.0% by mass.

In the PTFE having a core-shell structure, the lower limit of the proportion of the shell is preferably 0.5% by mass, more preferably 1.0% by mass, still more preferably 3.0% by mass, particularly preferably 5.0% by mass, most preferably 10.0% by mass.

In the PTFE having a core-shell structure, the core or the shell may have a structure of two or more layers. For example, the PTFE may have a trilayer structure including a core center of a modified PTFE, a core outer layer of a TFE homopolymer, and a shell of a low molecular weight PTFE.

The PTFE having a core-shell structure preferably has an extrusion pressure at a reduction ratio of 1500 of 80 MPa or lower, more preferably 70 MPa or lower, still more preferably 60 MPa or lower. An extrusion pressure at a reduction ratio of 1500 within the above range can be achieved by the method for producing the first PTFE aqueous dispersion of the disclosure to be described later.

The "extrusion pressure at a reduction ratio of 1500" is determined in accordance with the following procedure.

The first PTFE aqueous dispersion of the disclosure is coagulated in methanol and the resulting wet PTFE powder is subjected to Soxhlet extraction with methanol. Additives, including a nonionic surfactant, are then removed and the wet PTFE powder after the removal is dried at 150° C. for 18 hours. Thereby, PTFE powder is obtained.

Alternatively, the PTFE aqueous dispersion immediately after the polymerization, i.e., before a nonionic surfactant is added, is diluted with deionized water to a PTFE concentration of 10 to 15% by mass. The diluted product is then mechanically sheared so that wet PTFE powder is obtained, and this wet PTFE powder is dried at 150° C. for 18 hours. Thereby, PTFE powder is obtained.

To 100 parts by mass (60 g) of the PTFE powder is added 20.5 parts by mass (12.3 g) of hydrocarbon oil (trade name: Isopar G, available from Exxon Chemical Co.) as an extrusion aid. The mixture is aged at room temperature (25±1° C.) for one hour and is paste-extrusion-molded using an extrusion die (reduction ratio 1500) equipped with a cylinder having an inner diameter of 25.4 mm. In a late stage of extrusion, the pressure at a position at which the pressure is in an equilibrium state is divided by the cross-sectional area of the cylinder and the resulting value is taken as the extrusion pressure at a reduction ratio of 1500.

The PTFE preferably has an average primary particle size of 500 nm or smaller, more preferably 400 nm or smaller, still more preferably 350 nm or smaller. The lower limit of the average primary particle size may be, but is not limited to, 100 nm. In terms of molecular weight in the case of high molecular weight PTFE, for example, the average primary particle size is preferably 150 nm or greater, more preferably 200 nm or greater.

The average primary particle size was determined as follows. The resin solid concentration of the aqueous dispersion is adjusted to 0.15% by mass. The transmittance of 550-nm light relative to the unit length of the aqueous dispersion is measured, while the Feret diameters are measured in a photograph taken by a transmission electron microscope (TEM) and the number-based length average primary particle size is determined therefrom. A calibration curve is obtained from these values. Based on this calibration curve, the average primary particle size is determined from the transmittance.

In the aqueous dispersion of the disclosure, PTFE particles having an aspect ratio of 5 or higher is preferably in an amount of less than 1.5% by mass of the total amount of the PTFE particles.

The aspect ratio is determined as follows. The PTFE aqueous dispersion diluted to have a solid concentration of about 1% by mass is observed using a scanning electron microscope (SEM) and 200 or more randomly sampled particles are imaged. The ratio of the major axis and minor axis is calculated for each particle, and the aspect ratio is determined from the average thereof.

The PTFE preferably has a standard specific gravity (SSG) of 2.220 or lower, more preferably 2.190 or lower, while preferably 2.140 or higher, more preferably 2.150 or higher. The SSG is measured by the water displacement method in conformity with ASTM D792 using a sample molded in conformity with ASTM D4895-89.

The PTFE commonly has stretchability, fibrillatability, and non-melt secondary processibility.

The non-melt secondary processibility means a property of a polymer such that the melt flow rate cannot be measured at a temperature higher than the crystallization melting point in conformity with ASTM D1238 and D2116, i.e., a property such that the polymer does not easily flow even within a melting point range.

The first PTFE aqueous dispersion of the disclosure is substantially free from a fluorine-containing surfactant. For the composition of the disclosure, "substantially free from a fluorine-containing surfactant" means that the fluorine-containing surfactant amounts to 1.0 ppm or less relative to the PTFE aqueous dispersion.

Even though the first PTFE aqueous dispersion of the disclosure is substantially free from a fluorine-containing surfactant, it can have low viscosity at high temperature and can have excellent mechanical stability at high temperature.

The amount of the fluorine-containing surfactant may be the concentration of the lower detection limit or more, may be the concentration of the lower quantification limit or more, or may be 100 ppb or more. The amount is preferably 700 ppb or less, more preferably 600 ppb or less, still more preferably 500 ppb or less.

In the composition of the disclosure, the amount of the fluorine-containing surfactant is a value determined by liquid chromatography-mass spectrometry as described in Examples later. Specifically, the amount may be determined by the following method.

(Method for Determining Amount of Fluorine-Containing Surfactant)

The solid content of the aqueous dispersion is measured and the aqueous dispersion in an amount corresponding to 1.5 g of the PTFE solid content is weighed in a 100-mL screw tube bottle. Water and methanol are added thereto such that the extraction solvent amounted to 37 g containing water/methanol=10/90% by mass in combination with the water contained in the aqueous dispersion. The tube is shaken until coagulation. The liquid phase is extracted and centrifuged at 4000 rpm for one hour, whereby a supernatant is extracted. Instead of this methanol extraction, Soxhlet extraction may be performed by adding methanol to the aqueous dispersion.

The fluorine-containing surfactant in the extract obtained above is subjected to measurement using a liquid chromatograph-mass spectrometer.

In the case where the first PTFE aqueous dispersion of the disclosure is obtained by polymerization using a fluorine-containing surfactant, the amount of the fluorine-containing surfactant can be adjusted to the above range by adding a nonionic surfactant to the PTFE aqueous dispersion immediately after polymerization and then concentrating the mixture, for example.

An example of the fluorine-containing surfactant is a fluorine-containing anion surfactant.

The fluorine-containing anion surfactant may be a surfactant containing a fluorine atom represented by the following formula ($N^0$) wherein a portion excluding the anion group $Y^0$ has a total carbon number of 20 or smaller.

The fluorine-containing surfactant may also be a fluorine-containing surfactant in which the anion portion has a molecular weight of 800 or lower.

The "anion portion" means a portion excluding the cation in the fluorine-containing surfactant. For example, in the case of $F(CF_2)_{n1}COOM$ represented by the formula (I) to be described later, the anion portion refers to the portion "$F(CF_2)_{n1}COO$".

The fluorine-containing surfactant may also be a fluorine-containing surfactant having a LogPOW value of 3.5 or lower, preferably 3.4 or lower. Log POW is a 1-octanol/water partition coefficient which is represented by Log P, wherein P is the ratio between the concentration of the fluorine-containing surfactant in octanol and the concentration of the fluorine-containing surfactant in water in a phase-separated octanol/water (1:1) liquid mixture containing the fluorine-containing surfactant.

Log POW is determined as follows. Specifically, HPLC is performed on standard substances (heptanoic acid, octanoic acid, nonanoic acid, and decanoic acid) each having a known octanol/water partition coefficient using TOSOH ODS-120T (ϕ4.6 mm×250 mm, available from Tosoh Corp.) as a column and an acetonitrile/0.6% by mass $HClO_4$ aqueous solution (=1/1 (vol/vol %)) as an eluent at a flow rate of 1.0 ml/min, a sample amount of 300 μL, and a column temperature of 40° C. with a detection light of 210-nm UV. For each standard substance, a calibration curve is drawn with respect to the elution time and the known octanol/water partition coefficient. Based on this calibration curve, Log POW is calculated from the elution time of the sample liquid in HPLC.

Specific examples of the fluorine-containing surfactant include those described in US 2007/0015864, US 2007/0015865, US 2007/0015866, US 2007/0276103, US 2007/0117914, US 2007/142541, US 2008/0015319, U.S. Pat. Nos. 3,250,808, 3,271,341, JP 2003-119204 A, WO 2005/042593, WO 2008/060461, WO 2007/046377, WO 2007/119526, WO 2007/046482, WO 2007/046345, US 2014/0228531, WO 2013/189824, and WO 2013/189826.

An example of the fluorine-containing anion surfactant is a compound represented by the following formula ($N^0$):

$$X^{n0}—Rf^{n0}—Y^0 \quad (N^0)$$

wherein $X^{n0}$ is H, $C_1$, or/and F; $Rf^{n0}$ is a C3-C20 linear, branched, or cyclic alkylene group in which part or all of H atoms are replaced by F atoms, the alkylene group optionally containing one or more ether bonds with part of H atoms being optionally replaced by Cl; and $Y^0$ is an anion group.

The anion group for $Y^0$ may be —COOM, —$SO_2M$, or —$SO_3M$, and may be —COOM or —$SO_3M$.

M is H, a metal atom, $NR^7_4$, imidazolium optionally containing a substituent, pyridinium optionally containing a substituent, or phosphonium optionally containing a substituent, wherein $R_7$ is H or an organic group.

Examples of the metal atom include an alkali metal (Group 1) and an alkaline earth metal (Group 2), such as Na, K, and Li.

$R^7$ may be H or a $C_{1-10}$ organic group, may be H or a $C_{1-4}$ organic group, and may be H or a $C_{1-4}$ alkyl group.

M may be H, a metal atom, or $NR^7_4$, may be H, an alkali metal (Group 1), an alkaline earth metal (Group 2), or $NR^7_4$, and may be H, Na, K, Li, or $NH_4$.

In $Rf^{n0}$, 50% or more of H atoms may be replaced by fluorine.

Examples of the compound represented by the formula ($N^0$) include:

a compound represented by the following formula ($N^1$):

$$X^{n0}—Rf^{n}—Y^0 \quad (N^1)$$

wherein $X^{n0}$ is H, Cl, or F; $Rf^{n}$ is a C3-C15 linear or branched perfluoroalkylene group; and $Y^0$ is defined as described above (specifically, a compound represented by the following formula ($N^{1a}$):

$$X^{n0}—(CF_2)_{m1}—Y^0 \quad (N^{1a})$$

wherein $X^{n0}$ is H, Cl, or F; m1 is an integer of 3 to 15; and $Y^0$ is defined as described above);

a compound represented by the following formula ($N^2$):

$$Rf^{n1}—O—(CF(CF_3)CF_2O)_{m2}CFX^{n1}—Y^0 \quad (N^2)$$

wherein $Rf^{n1}$ is a C1-C5 perfluoroalkyl group; m2 is an integer of 0 to 3; $X^{n1}$ is F or $CF_3$; and $Y^0$ is defined as described above;

a compound represented by the following formula ($N^3$):

$$Rf^{n2}(CH_2)_{m3}—(Rf^{n3})_q—Y^0 \quad (N^3)$$

wherein $Rf^{n2}$ is a C1-C13 partially or completely fluorinated alkyl group optionally containing an ether bond; m3 is an integer of 1 to 3; $Rf^{n3}$ is a C1-C3 linear or branched perfluoroalkylene group; q is 0 or 1; and $Y^0$ is defined as described above;

a compound represented by the following formula ($N^4$):

$$Rf^{n4}—O-L^4-Y^0 \quad (N^4)$$

wherein $Rf^{n4}$ is a linear or branched partially or completely fluorinated aliphatic group optionally containing an ether bond and/or chlorine; L is a partially or completely fluorinated linear alkylene group or aliphatic hydrocarbon group; and $Y^0$ is defined as described above (specifically, a compound represented by the following formula ($N^{4a}$)):

$$Rf^{n4}\text{—O—}(CY^{n1}Y^{n2})_pCF_2\text{—}Y^0 \quad (N^{4a})$$

wherein $Rf^{n4}$ is a C1-$C_{12}$ linear or branched partially or completely fluorinated alkyl group optionally containing an ether bond and/or chlorine; $Y^{n1}$ and $Y^{n2}$ are the same as or different from each other, and are each H or F; p is 0 or 1; and $Y^0$ is defined as described above); and a compound represented by the following formula ($N^5$):

[Chem. 6]

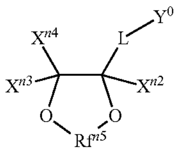

($N^5$)

wherein $X^{n2}$, $X^{n3}$, and $X^{n4}$ are the same as or different from each other, and are each H, F, or a C1-C6 linear or branched partially or completely fluorinated alkyl group optionally containing an ether bond; $Rf^{n5}$ is a C1-C3 linear or branched partially or completely fluorinated alkylene group optionally containing an ether bond; L is a linking group; and $Y^0$ is defined as described above, where $X^{n2}$, $X^{n3}$, $X^{n4}$, and $Rf^{n5}$ have a total carbon number of 18 or less.

Specific examples of the compound represented by the formula ($N^0$) include a perfluorocarboxylic acid (I) represented by the following formula (I), an ω-H perfluorocarboxylic acid (II) represented by the following formula (II), a perfluoropolyether carboxylic acid (III) represented by the following formula (III), a perfluoroalkylalkylenecarboxylic acid (IV) represented by the following formula (IV), a perfluoroalkoxyfluorocarboxylic acid (V) represented by the following formula (V), a perfluoroalkylsulfonic acid (VI) represented by the following formula (VI), an ω-H perfluorosulfonic acid (VII) represented by the following formula (VII), a perfluoroalkylalkylenesulfonic acid (VIII) represented by the following formula (VIII), an alkylalkylenecarboxylic acid (IX) represented by the following formula (IX), a fluorocarboxylic acid (X) represented by the following formula (X), an alkoxyfluorosulfonic acid (XI) represented by the following formula (XI), and a compound (XII) represented by the following formula (XII).

The perfluorocarboxylic acid (I) is represented by the following formula (I):

$$F(CF_2)_{n1}COOM \quad (I)$$

wherein n1 is an integer of 3 to 14; M is H, a metal atom, $NR^7{}_4$, imidazolium optionally containing a substituent, pyridinium optionally containing a substituent, or phosphonium optionally containing a substituent; and $R^7$ is H or an organic group.

The ω-H perfluorocarboxylic acid (II) is represented by the following formula (II):

$$H(CF_2)_{n2}COOM \quad (II)$$

wherein n2 is an integer of 4 to 15; and M is defined as described above.

The perfluoropolyether carboxylic acid (III) is represented by the following formula (III):

$$Rf^1\text{—O—}(CF(CF_3)CF_2O)_{n3}CF(CF_3)COOM \quad (III)$$

wherein $Rf^1$ is a C1-C5 perfluoroalkyl group; n3 is an integer of 0 to 3; and M is defined as described above.

The perfluoropolyether carboxylic acid (III) is preferably a perfluoropolyether carboxylic acid having a total carbon number of 7 or less and having a LogPOW value of 3.5 or lower. The total carbon number is particularly preferably 5 to 7 and the LogPOW value is more preferably 3.4 or lower.

The perfluoroalkylalkylenecarboxylic acid (IV) is represented by the following formula (IV):

$$Rf^2(CH_2)_{n4}Rf^3COOM \quad (IV)$$

wherein $Rf^2$ is a C1-C5 perfluoroalkyl group; $Rf^3$ is a C1-C3 linear or branched perfluoroalkylene group; n4 is an integer of 1 to 3; and M is defined as described above.

The alkoxyfluorocarboxylic acid (V) is represented by the following formula (V):

$$Rf^4\text{—O—}CY^1Y^2CF_2\text{-}COOM \quad (V)$$

wherein $Rf^4$ is a C1-C12 linear or branched partially or completely fluorinated alkyl group optionally containing an ether bond and/or chlorine; $Y^1$ and $Y^2$ are the same as or different from each other, and are each H or F; and M is defined as described above.

The perfluoroalkylsulfonic acid (VI) is represented by the following formula (VI):

$$F(CF_2)_{n5}SO_3M \quad (VI)$$

wherein n5 is an integer of 3 to 14; and M is defined as described above.

The ω-H perfluorosulfonic acid (VII) is represented by the following formula (VII):

$$H(CF_2)_{n6}SO_3M \quad (VII)$$

wherein n6 is an integer of 4 to 14; and M is defined as described above.

The perfluoroalkylalkylenesulfonic acid (VIII) is represented by the following formula (VIII):

$$Rf^5(CH_2)_{n7}SO_3M \quad (VIII)$$

wherein $Rf^5$ is a C1-C13 perfluoroalkyl group; n7 is an integer of 1 to 3; and M is defined as described above.

The alkylalkylenecarboxylic acid (IX) is represented by the following formula (IX):

$$Rf^6(CH_2)_{n8}COOM \quad (IX)$$

wherein $Rf^6$ is a C1-C13 linear or branched partially or completely fluorinated alkyl group optionally containing an ether bond; n8 is an integer of 1 to 3; and M is defined as described above.

The fluorocarboxylic acid (X) is represented by the following formula (X):

$$Rf^7\text{—O—}Rf^8\text{—O—}CF_2\text{-}COOM \quad (X)$$

wherein $Rf^7$ is a C1-C6 linear or branched partially or completely fluorinated alkyl group optionally containing an ether bond and/or chlorine; $Rf^8$ is a C1-C6 linear or branched partially or completely fluorinated alkyl group; and M is defined as described above.

The alkoxyfluorosulfonic acid (XI) is represented by the following formula (XI):

$$Rf^9\text{—O—}CY^1Y^2CF_2\text{-}SO_3M \quad (XI)$$

wherein $Rf^9$ is a C1-C12 linear or branched partially or completely fluorinated alkyl group optionally containing an ether bond and optionally containing chlorine;

$Y^1$ and $Y^2$ are the same as or different from each other, and are each H or F; and M is defined as described above.

The compound (XII) is represented by the following formula (XII):

[Chem. 7]

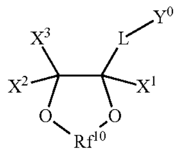

(XII)

wherein $X^1$, $X^2$, and $X^3$ are the same as or different from each other, and are each H, F, or a C1-C6 linear or branched partially or completely fluorinated alkyl group optionally containing an ether bond; $Rf^{10}$ is a C1-C3 perfluoroalkylene group; L is a linking group; and $Y^0$ is an anion group.

$Y^0$ may be —COOM, —$SO_2M$, or —$SO_3M$, and may be —$SO_3M$ or COOM, wherein M is defined as described above.

Examples of L include a single bond and a C1-C10 partially or completely fluorinated alkylene group optionally containing an ether bond.

As described above, examples of the fluorine-containing anion surfactant include a carboxylic acid-based surfactant and a sulfonic acid-based surfactant.

In the case of using a compound represented by the formula ($N^1$) in the fluorine-containing anion surfactant, the carbon number of $Rf^{n}$ in the formula ($N^1$) is preferably an integer of 3 to 6. Also, m1 in the formula ($N^{1a}$) is preferably an integer of 3 to 6. In the case of using a perfluorocarboxylic acid (I), n1 in the formula (I) is preferably an integer of 3 to 6.

In particular, the fluorine-containing anion surfactant is preferably a compound selected from the group consisting of a fluorine-containing carboxylic acid having a carbon number of 4 to 9, preferably 4 to 7, and optionally containing etheric oxygen and/or chlorine and salts thereof. The carbon number herein means the total carbon number in one molecule. The fluorine-containing anion surfactant used may be a combination of two or more thereof.

The fluorine-containing anion surfactant is preferably a compound selected from the group consisting of a fluorine-containing carboxylic acid having a carbon number of 4 to 9, preferably 4 to 7, and optionally containing etheric oxygen and/or chlorine and salts thereof. The fluorine-containing carboxylic acid containing etheric oxygen is a compound containing etheric oxygen in the middle of the main carbon chain having a carbon number of 4 to 9, preferably 4 to 7, and having —COOH at an end. The terminal —COOH may form a salt.

The number of etheric oxygen atoms in the middle of the main chain is one or more, preferably 1 to 4, more preferably 1 or 2.

The carbon number is preferably 5 to 7.

In particular, the fluorine-containing anion surfactant is preferably a partially or completely fluorinated carboxylic acid whose main chain has a carbon number of 6 or 7, an etheric oxygen number of 1 to 4, and is linear, branched, or cyclic, or a salt thereof. The "main chain" herein means a continuous chain having the maximum carbon atom number.

Specific examples of the fluorine-containing surfactant include $F(CF_2)$—COOM, $F(CF_2)_5COOM$, $H(CF_2)_6COOM$, $CF_3O(CF_2)_3OCHFCF_2COOM$, $C_3F$—$OCF(CF_3)CF_2OCF(CF_3)COOM$, $CF_3CF_2CF_2OCF(CF_3)COOM$, $CF_3CF_2OCF_2CF_2OCF_2COOM$, $C_2F_5OCF(CF_3)CF_2OCF(CF_3)COOM$, $CF_3OCF(CF_3)CF_2OCF(CF_3)COOM$, $CF_2ClCF_2CF_2OCF(CF_3)CF_2OCF_2COOM$, $CF_2ClCF_2CF_2OCF_2CF(CF_3)OCF_2COOM$, $CF_2ClCF(CF_3)OCF(CF_3)CF_2OCF_2COOM$, $CF_2ClCF(CF_3)OCF_2CF(CF_3)OCF_2COOM$, and a compound represented by the following formula:

[Chem. 8]

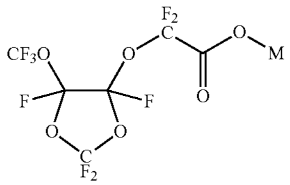

(wherein M is defined as described above). The anionic fluorine-containing surfactant may not have a single formulation but may be a mixture of two or more thereof.

In order to adjust the viscosity or to improve the miscibility of an additive such as a pigment or filler, the first PTFE aqueous dispersion of the disclosure preferably contains an anion surfactant. The anion surfactant may be added as appropriate within a range that causes no economical or environmental issue.

Examples of the anion surfactant include a fluorine-free anion surfactant that contains no fluorine and a fluorine-containing anion surfactant. Preferred is a fluorine-free anion surfactant that contains no fluorine (i.e., a hydrocarbon anion surfactant).

For the purpose of adjusting the viscosity, any types of known anion surfactants may be used, such as fluorine-free anion surfactants disclosed in WO 2013/146950 and WO 2013/146947. Examples thereof include those having a C6-C40, preferably C8-$C_{20}$, more preferably C9-C13 saturated or unsaturated aliphatic chain. The saturated or unsaturated aliphatic chain may be either linear or branched, or may have a cyclic structure. The hydrocarbon may be aromatic or may have an aromatic group. The hydrocarbon may contain a hetero atom such as oxygen, nitrogen, or sulfur.

Examples of the fluorine-free anion surfactant include an alkyl sulfonate, an alkyl sulfate, an alkyl aryl sulfate, and salts thereof; a fatty acid (aliphatic carboxylic acid) and salts thereof; and an alkyl phosphate, an alkyl aryl phosphate, and salts thereof. Preferred among these are an alkyl sulfonate, an alkyl sulfate, an aliphatic carboxylic acid, and salts thereof.

The alkyl sulfate or a salt thereof is preferably ammonium lauryl sulfate or sodium lauryl sulfate, for example.

The fatty acid (aliphatic carboxylic acid) or a salt thereof is preferably succinic acid, decanoic acid, undecanoic acid, undecenoic acid, lauric acid, hydrododecanoic acid, or a salt thereof.

The fluorine-free anion surfactant preferably includes at least one selected from the group consisting of an alkyl sulfate and salts thereof and a fatty acid and salts thereof.

The fluorine-free anion surfactant is preferably contained in an amount of 10 ppm to 5000 ppm relative to the solid mass of the PTFE, although it depends on the types of the fluorine-free anion surfactant and other compounding agents.

The lower limit of the amount of the fluorine-free anion surfactant added is more preferably 50 ppm or more, still more preferably 100 ppm or more. Too small an amount thereof may have a poor viscosity adjusting effect.

The upper limit of the amount of the fluorine-free anion surfactant added is more preferably 4000 ppm or less, still more preferably 3000 ppm or less. Too large an amount thereof may cause an increased viscosity, especially an increased viscosity at high temperature, as well as a large amount of bubbling.

In order to adjust the viscosity of the first PTFE aqueous dispersion of the disclosure, methyl cellulose, alumina sol, polyvinyl alcohol, a carboxylated vinyl polymer, and the like may be compounded in addition to the fluorine-free anion surfactant.

In order to adjust the pH of the aqueous dispersion, a pH adjuster such as ammonia water may be compounded.

The first PTFE aqueous dispersion of the disclosure preferably has a pH of 8 to 13, more preferably 9 to 12, still more preferably 9 to 11.

The pH is a value measured at 25° C. in conformity with JIS K6893.

The first PTFE aqueous dispersion of the disclosure may contain a different water soluble polymer compound within a range that does not impair the features of the aqueous dispersion, if necessary.

Examples of the different water soluble polymer compound include, but are not limited to, polyethylene oxide (dispersion stabilizer), polyethylene glycol (dispersion stabilizer), polyvinyl pyrrolidone (dispersion stabilizer), phenol resin, urea resin, epoxy resin, melamine resin, polyester resin, polyether resin, acrylic silicone resin, silicone resin, silicone polyester resin, and polyurethane resin. In addition, a preservative may be contained such as an isothiazolone-based one, azole-based one, bronopol, chlorothalonil, methylsulfonyl tetrachloropyridine, carbendazim, fluor folpet, sodium diacetate, and diiodomethyl paratolyl sulfone.

The first PTFE aqueous dispersion of the disclosure may contain an antifoam. The antifoam may be added as appropriate within a range that causes no economical or environmental issue.

The antifoam used may include a variety of aqueous ones. Examples thereof include lower alcohols such as methanol, ethanol, and butanol; higher alcohols such as amyl alcohol, polypropylene glycol, and derivatives thereof; oil and fat such as oleic acid, tall oil, mineral oil, and soap; surfactants such as sorbitan fatty acid ester, polyethylene glycol fatty acid ester, and a pluronic nonionic surfactant; and silicone surfactants such as siloxane and silicone resin. These may be used alone or in combination. Examples of typical commercially available products of the antifoam include B-series such as Adeka Nate B and Adeka Nate B1068 (available from Adeka Corp.); Foamaster DL, Nopco NXZ, and SN defoamer series such as SN defoamer 113, 325, 308, and 368; Dehydran 1293 and Dehydran 1513 (available from San Nopco Ltd.); FLOWNON SB-110N, SB-210, 510, and 551, Aqualen 800, 805, and Aqualen 1488 (available from Kyoeisha Chemical Co., Ltd.); Surfynol 104E and 440 (acetylene-based antifoam available from Air Products and Chemicals, Inc.); KS-607A (available from Shin-Etsu Chemical Co., Ltd.); FS Antifoam (available from Dow Corning); BYK-020, 031, 073, and W (available from BYK Chemie); Dehydran 981 (available from Henkel Hakusui Corp.); Epan-410, 710, and 720 (available from DKS Co., Ltd.); Tego Foamex series (available from Tego Goldschmidt); and Foamlex-747, TY-10, EP series (available from Nicca Chemical Co., Ltd.). The antifoam is contained in an amount of preferably 0.01 to 10% by mass, particularly preferably 0.05 to 5% by mass relative to the PTFE aqueous dispersion.

The first PTFE aqueous dispersion of the disclosure may contain, but preferably does not contain, an antifoam. The absence of an antifoam is advantageous in cost. The presence of an antifoam may cause coloring when the PTFE aqueous dispersion is formed into a coating film.

The first PTFE aqueous dispersion of the disclosure commonly contains an aqueous medium. The aqueous medium means a liquid that contains water. The aqueous medium may be any medium that contains water, and may be one containing water and, for example, a fluorine-free organic solvent such as an alcohol, ether, or ketone and/or a fluorine-containing organic solvent having a boiling point of 40° C. or lower. The aqueous medium preferably contains 90% by mass or more, more preferably 95% by mass or more of water.

The first PTFE aqueous dispersion of the disclosure preferably has a stability retention time at 60° C. of 30 minutes or longer, more preferably 40 minutes or longer, still more preferably 50 minutes or longer, further preferably 55 minutes or longer, further more preferably 60 minutes or longer, particularly preferably 65 minutes or longer. The stability retention time may have any upper limit.

The stability retention time is a value determined by the following method.

A plastic cup having a diameter of 67 mm and an inner capacity of 300 mL is charged with 100 g of the PTFE aqueous dispersion. This cup is immersed in a water tank at 60° C. A stirring blade having a diameter of 50 mm (FIG. 1(*a*)) is set such that the height from the bottom of the plastic cup to the center of the stirring blade (the position 6 mm from the lower end of the stirring blade in the axial direction of FIG. 1(*b*)) is 20 mm. The stirring blade is rotated at 3000 rpm and the period of time until the PTFE aqueous dispersion coagulates or solidifies to scatter is taken as the stability retention time.

The first PTFE aqueous dispersion of the disclosure may contain a different additive such as a coating material ingredient. Examples of the coating material ingredient include common coating material additives such as a pigment (e.g., extender pigment, scale pigment), pigment dispersant, thickening agent, leveling agent, film-forming aid, solid lubricant, precipitation inhibitor, moisture absorbent, surface conditioner, thixotropic agent, viscosity modifier, anti-gelling agent, ultraviolet absorber, HALS (light stabilizer), matting agent, plasticizer, anti-flooding agent, anti-skinning agent, scratch inhibitor, anti-corrosive agent, fungicide, antibacterial agent, antioxidant, flame retarder, sagging inhibitor, antistatic agent, silane-coupling agent, filler, carbon black, clay, talc, diamond, fluorinated diamond, tourmaline, jade, germanium, extender pigment, corundum, silica stone, chrysoberyl, topaz, beryl, garnet, quartz, garnet, zirconium oxide, zirconium carbide, barium sulfate, glass, a variety of reinforcing material, a variety of extender, conductive filler, colloidal silica, and powder of metal such as gold, silver, copper, platinum, or stainless steel.

The first PTFE aqueous dispersion of the disclosure is more preferably free from colloidal silica.

The first PTFE aqueous dispersion of the disclosure also preferably contains a preservative. Examples of the preservative include hydrogen peroxide, an organic bromine-based compound, an organic nitrogen-sulfur compound, an organic iodine-based compound, an organic sulfur-based compound, and a triazine-based compound. In terms of preservative performance, preferred is an organic iodine-based compound or an organic nitrogen-sulfur compound. Specific examples of the organic iodine-based compound and the organic nitrogen-sulfur compound include Deltop series available from Osaka Gas Chemical Co., Ltd.

The preservative is preferably added in an amount of 0.01% by mass or more, more preferably 0.05% by mass or more, relative to the PTFE aqueous dispersion.

The first PTFE aqueous dispersion of the disclosure is obtainable by adding a nonionic surfactant to the PTFE aqueous dispersion immediately after polymerization or by adjusting the solid concentration of PTFE by, for example, condensation or dilution.

More specifically, the PTFE aqueous dispersion of the disclosure can be produced by the following production method.

A method for producing the first PTFE aqueous dispersion of the disclosure is a method for producing a PTFE aqueous dispersion, the method including:

a step A of emulsion-polymerizing TFE in the presence of a fluorine-containing anion surfactant and providing a dispersion containing PTFE;

a step B of adding a nonionic surfactant (1) to the dispersion obtained in the step A;

a step C of removing the fluorine-containing anion surfactant from the dispersion obtained in the step B and then condensing the dispersion, or of condensing the dispersion obtained in the step B and then removing the fluorine-containing anion surfactant; and a step D of adding a nonionic surfactant (2) and a fluorine-free anion surfactant to the dispersion obtained in the step C.

The phrase "dispersion obtained in the step A" herein means the dispersion that has undergone the step A, and may be a dispersion that has been subjected to a different treatment after the step A, for example. The same applies to the steps B to D.

The emulsion polymerization may be performed by, for example, charging a reactor with an aqueous medium, a fluorine-containing anion surfactant, a monomer, and optionally other additives, stirring the contents in the reactor, maintaining the reactor at a predetermined polymerization temperature, and then adding a predetermined amount of a polymerization initiator to start the polymerization reaction. After the polymerization reaction starts, the monomer, the polymerization initiator, a chain transfer agent, the surfactant, and the like may be added in accordance with the purposes. The surfactant may be added after the polymerization reaction starts.

The polymerization temperature and the polymerization pressure in the emulsion polymerization may be determined as appropriate in accordance with the type of the monomer used, the target molecular weight of the PTFE, and the reaction rate.

For example, the polymerization temperature is preferably 10° C. to 150° C. The polymerization temperature is more preferably 30° C. or higher, still more preferably 50° C. or higher, while more preferably 120° C. or lower, still more preferably 100° C. or lower.

The polymerization pressure is preferably 0.05 to 10 MPa. The polymerization pressure is more preferably 0.3 MPa or higher, still more preferably 0.5 MPa or higher, while more preferably 5.0 MPa or lower, still more preferably 3.0 MPa or lower.

The polymerization initiator may be any initiator capable of generating radicals within the above polymerization temperature range, and any known oil-soluble and/or water-soluble polymerization initiator may be used. Further, the initiator may be combined with a reducing agent, for example, into the form of a redox agent to start polymerization. The concentration of the polymerization initiator is appropriately determined in accordance with the type of the monomer, the target molecular weight of the PTFE, and the reaction rate.

The polymerization initiator used may be an oil-soluble radical polymerization initiator or a water-soluble radical polymerization initiator.

The oil-soluble radical polymerization initiator may be a known oil-soluble peroxide. Typical examples thereof include dialkyl peroxycarbonates such as diisopropyl peroxydicarbonate and di-sec-butyl peroxydicarbonate, peroxy esters such as t-butyl peroxyisobutyrate and t-butyl peroxypivalate, dialkyl peroxides such as di-t-butyl peroxide, as well as di(perfluoroacyl) or di(fluorochloro)acyl peroxides such as di(ω-hydro-dodecafluoroheptanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl) peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl) peroxide, and di(undecachlorodotriacontafluorodocosanoyl) peroxide.

The water-soluble radical polymerization initiator may be a known water-soluble peroxide. Examples thereof include ammonium salts, potassium salts, and sodium salts of any of persulfuric acid, perboric acid, perchloric acid, perphosphoric acid, and percarbonic acid, t-butyl permaleate, and t-butyl hydroperoxide. The initiator may also contain a reducing agent such as a sulfite or a sulfurous acid salt. The amount thereof used may be 0.1 to 20 times the peroxide.

For example, in the case of polymerization at a low temperature of 30° C. or lower, a polymerization initiator used is preferably a redox initiator that is a combination of an oxidizing agent and a reducing agent. Examples of the oxidizing agent include a persulfate, an organic peroxide, potassium permanganate, manganese triacetate, ammonium cerium nitrate, and a bromate. Examples of the reducing agent include a sulfite, bisulfite, bromate, diimine, and oxalic acid. Examples of the persulfate include ammonium persulfate and potassium persulfate. Examples of the sulfite include sodium sulfite and ammonium sulfite. In order to increase the decomposition rate of the initiator, the combination of the redox initiator is also preferably combined with a copper salt or an iron salt. An example of the copper salt is copper(II) sulfate and an example of the iron salt is iron(II) sulfate.

Examples of the redox initiator include potassium permanganate/oxalic acid, ammonium persulfate/bisulfite/iron (II) sulfate, ammonium persulfate/sulfite/iron(II) sulfate, ammonium persulfate/sulfite, ammonium persulfate/iron(II) sulfate, manganese triacetate/oxalic acid, ammonium cerium nitrate/oxalic acid, bromate/sulfite, and bromate/bisulfite. Preferred are potassium permanganate/oxalic acid and ammonium persulfate/sulfite/iron(II) sulfate. In the case of using a redox initiator, a polymerization vessel may be charged with an oxidizing agent or a reducing agent in advance, and the other may be continually or intermittently added thereto to start polymerization. For example, in the case of using potassium permanganate/oxalic acid, preferably, a polymerization vessel is charged with oxalic acid and potassium permanganate is continually added thereto.

The polymerization initiator may be added in any amount. For example, it may be added in an amount that does not significantly decrease the polymerization rate (e.g., concentration of several parts per million relative to water) or more at one time in an early stage of polymerization or intermittently or continuously. The upper limit thereof falls within a range where the reaction temperature is allowed to increase while the heat is removed owing to the polymerization reaction heat through the device surfaces. The upper limit more preferably falls within a range where the polymerization reaction heat can be removed through the device surfaces.

The polymerization initiator used may also be a radical polymerization initiator. The radical polymerization initiator is preferably a peroxide. Examples of the radical polymerization initiator include the oil-soluble radical polymerization initiator and the water-soluble radical polymerization initiator as described above. The water-soluble radical polymerization initiator is preferred. The water-soluble radical polymerization initiator is more preferably a peroxide, still more preferably a persulfate or an organic peroxide, or a mixture thereof. Examples of the persulfate include ammonium persulfate and potassium persulfate. Examples of the organic peroxide include disuccinic acid peroxide and diglutaric acid peroxide, further more preferred are ammonium persulfate and disuccinic acid peroxide.

In the emulsion polymerization, a water-soluble radical polymerization initiator is used in an amount of preferably 500 ppm or less relative to the aqueous medium. The amount is more preferably 400 ppm or less, still more preferably 300 ppm or less, particularly preferably 200 ppm or less, while preferably 5 ppm or more, more preferably 10 ppm or more, still more preferably 20 ppm or more.

For example, the water-soluble radical polymerization initiator is preferably ammonium persulfate in an amount of preferably 0.1 ppm or more, more preferably 1.0 ppm or more, still more preferably 1.5 ppm or more, further more preferably 2.0 ppm or more, particularly preferably 2.5 ppm or more, relative to the aqueous medium. It is also preferably ammonium persulfate in an amount of preferably 50 ppm or less, more preferably 40 ppm or less, still more preferably 30 ppm or less, relative to the aqueous medium.

The water-soluble radical polymerization initiator is preferably disuccinic acid peroxide in an amount of preferably 10 ppm or more, more preferably 30 ppm or more, still more preferably 50 ppm or more, relative to the aqueous medium. It is also preferably disuccinic acid peroxide in an amount of preferably 500 ppm or less, more preferably 300 ppm or less, still more preferably 200 ppm or less, relative to the aqueous medium.

In the emulsion polymerization, particularly preferably, ammonium persulfate and disuccinic acid peroxide are used in combination. In the case of combination use, the amounts of ammonium persulfate and disuccinic acid peroxide used may be the combination of the above amount of ammonium persulfate and the above amount of disuccinic acid peroxide.

In the emulsion polymerization, a radical polymerization initiator may be added continuously or intermittently after the polymerization starts.

Examples of the chain transfer agent include esters such as dimethyl malonate, diethyl malonate, methyl acetate, ethyl acetate, butyl acetate, and dimethyl succinate, isopentane, methane, ethane, propane, isobutane, methanol, ethanol, isopropanol, acetone, a variety of mercaptan, a variety of halogenated hydrocarbons such as carbon tetrachloride, and cyclohexane.

In terms of properties such as polymerization reactivity, crosslink reactivity, and easy availability, preferred among these is at least one selected from the group consisting of an alkane and an alcohol. The alkane preferably has a carbon number of 1 to 6, more preferably 1 to 5. The alcohol preferably has a carbon number of 1 to 5, more preferably 1 to 4. In particular, the chain transfer agent preferably includes at least one selected from the group consisting of methane, ethane, propane, isobutane, methanol, ethanol, and isopropanol.

The chain transfer agent is preferably in an amount of 0.001 to 10000 ppm relative to the aqueous medium. The amount of the chain transfer agent is more preferably 0.01 ppm or more, still more preferably 0.05 ppm or more, particularly preferably 0.1 ppm or more, relative to the aqueous medium, while more preferably 1000 ppm or less, still more preferably 500 ppm or less, relative to the aqueous medium.

The chain transfer agent may be added to a reactor at one time before start of polymerization, may be added at one time after start of polymerization, may be added in portions during polymerization, or may be added continually during polymerization.

The step (A) is preferably a step of polymerizing TFE and a monomer copolymerizable with TFE.

Examples of the monomer copolymerizable with TFE include the aforementioned modifying monomers. In particular, preferred is at least one monomer selected from the group consisting of PAVE, PFAE, perfluoroallyl ether, and a cyclic monomer, more preferred is PAVE.

Examples of the PAVE (perfluoro(alkyl vinyl ether)) include perfluoro(methyl vinyl ether) (PMVE), perfluoro (ethyl vinyl ether) (PEVE), perfluoro (propyl vinyl ether) (PPVE), and perfluoro (butyl vinyl ether) (PBVE). Preferred is at least one selected from the group consisting of PMVE, PEVE, and PPVE, more preferred is PPVE.

Examples of the PFAE include, but are not limited to, (perfluorobutyl)ethylene (PFBE) and (perfluorohexyl)ethylene.

An example of the perfluoroallyl ether is a fluoromonomer represented by the formula:

$$CF_2{=}CF{-}CF_2{-}ORf^{12}$$

wherein $Rf^{12}$ is a perfluoro organic group.

$Rf^{12}$ is preferably a C1-C10 perfluoroalkyl group or a C1-C10 perfluoroalkoxyalkyl group. The perfluoroallyl ether preferably includes at least one selected from the group consisting of $CF_2{=}CF{-}CF_2{-}O{-}CF_3$, $CF_2{=}CF{-}CF_2{-}O{-}C_2F_5$, $CF_2{=}CF{-}CF_2{-}O{-}C_3F_7$, and $CF_2{=}CF{-}CF_2{-}O{-}C_4F_9$, more preferably at least one selected from the group consisting of $CF_2{=}CF{-}CF_2{-}O{-}C_2F_5$, $CF_2{=}CF{-}CF_2{-}O{-}C_3F_7$, and $CF_2{=}CF{-}CF_2{-}O{-}C_4F_9$, and is still more preferably $CF_2{=}CF{-}CF_2{-}O{-}CF_2CF_2CF_3$.

The cyclic monomer is preferably a vinyl heterocycle represented by the formula (ii):

[Chem. 9]

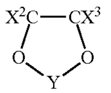

(ii)

(wherein $X^2$ and $X^3$ are the same as or different from each other, and are each a hydrogen atom or a fluorine atom; Y is $—CR^1R^2$, —, wherein $R^1$ and $R^2$ are the same as or different from each other, and are each a fluorine atom, a C1-C6 alkyl group, or a C1-C6 fluoroalkyl group). The vinyl heterocycle represented by the formula (ii) is preferably one in which $X^2$ and $X^3$ are fluorine atoms, and also preferably one in which $R^1$ and $R^2$ are C1-C6 fluoroalkyl groups.

The vinyl heterocycle represented by the formula (ii) is preferably perfluoro-2,2-dimethyl-1,3-dioxole (PDD) in which $X^2$ and $X^3$ are fluorine atoms and $R^1$ and $R^2$ are perfluoromethyl groups.

In the step A, examples of the fluorine-containing anion surfactant include the fluorine-containing anion surfactants described for the first PTFE aqueous dispersion of the disclosure. For example, a fluorine-containing anion surfactant having a LogPOW value of 3.5 or lower, preferably a fluorine-containing anion surfactant having a LogPOW value of 3.4 or lower may be used.

The step A is preferably a step of providing a dispersion of PTFE having a core-shell structure.

For example, this dispersion is obtainable by first polymerizing TFE and optionally a modifying monomer to form a core (PTFE or modified PTFE), and then polymerizing TFE and optionally a modifying monomer to form a shell (PTFE or modified PTFE).

The step A is also preferably a step of providing a dispersion of modified polytetrafluoroethylene having a core-shell structure, including a step A-1 of polymerizing TFE and at least one modifying monomer selected from the group consisting of a perfluoro(alkyl vinyl ether), a (perfluoroalkyl)ethylene, and a cyclic monomer to form a core and a step A-2 of polymerizing, in addition to TFE and the modifying monomer, at least one selected from the group consisting of hexafluoropropylene and a chain transfer agent to form a shell.

The step A-2 is more preferably a step of polymerizing TFE and a chain transfer agent.

The shell may be one obtainable by copolymerizing a modifying monomer that is a monomer copolymerizable with TFE, or may be one obtainable by adding a chain transfer agent during polymerization, or may be one obtainable by both of these.

The shell is preferably one obtainable by the use of a chain transfer agent and/or one obtainable by copolymerizing a fluoro(alkyl vinyl ether) represented by the following formula (iii):

$$F_2C{=}CFO(CF_2)_{n1}X^1 \quad \text{(iii)}$$

(wherein $X^1$ is a hydrogen atom or a fluorine atom; and n1 is an integer of 1 to 6) or a fluoroolefin represented by the following formula (iv)

$$CX^4X^5{=}CX^6(CF_2)_{n2}F \quad \text{(iv)}$$

wherein $X^4$, $X^5$, and $X^6$ are each a hydrogen atom or a fluorine atom, with at least one thereof being a fluorine atom; and n2 is an integer of 1 to 5.

The chain transfer agent used for forming the shell may be any one capable of reducing the molecular weight of the PTFE constituting the shell. Examples thereof include non-peroxide organic compounds such as water-soluble alcohol, hydrocarbon, and fluorinated hydrocarbon; water-soluble organic peroxides such as disuccinic acid peroxide (DSP); and/or persulfates such as ammonium persulfate (APS) and potassium persulfate (KPS). The chain transfer agent includes at least one selected from a non-peroxide organic compound, a water-soluble organic peroxide, and a persulfate. The chain transfer agent used may include one or two or more of non-peroxide organic compounds, one or two or more of water-soluble organic peroxides, and one or two or more of persulfates.

In order to achieve good dispersibility and good uniformity in the system, the chain transfer agent preferably includes at least one selected from the group consisting of a C1-C4 water-soluble alcohol, a C1-C4 hydrocarbon, and a C1-C4 fluorinated hydrocarbon, more preferably includes at least one selected from the group consisting of methane, ethane, n-butane, isobutane, methanol, isopropanol, DSP, APS, and KPS, still more preferably includes methanol and/or isobutane.

The modifying monomer used for forming a shell is preferably a fluoroolefin represented by the formula (iv). Examples of the fluoroolefin include a C2-C4 perfluoroolefin and a C2-C4 hydrogen-containing fluoroolefin.

The fluoroolefin is preferably a perfluoroolefin, particularly preferably hexafluoropropylene (HFP).

In terms of stability of the PTFE dispersion, a modifier unit derived from a modifying monomer in the shell is preferably in an amount of 0.001 to 0.5% by mass of all primary particles constituting the PTFE, although it depends on the type of the modifying monomer used. The lower limit is more preferably 0.005% by mass. The upper limit is more preferably 0.2% by mass, still more preferably 0.10% by mass. In the case of using HFP as a modifying monomer in the shell, the amount thereof is preferably 0.001 to 0.3% by mass of all primary particles constituting the PTFE. The lower limit is more preferably 0.005% by mass and the upper limit is more preferably 0.15% by mass.

The PTFE may be one obtainable by the use of a chain transfer agent or by copolymerization with a modifier, or may be one obtainable by both copolymerization with a modifying monomer and the use of a chain transfer agent.

In the case of using a fluoro(alkyl vinyl ether) represented by the formula (iii), particularly PPVE, as a modifying monomer in the PTFE constituting the core, the PTFE is preferably one obtainable by the use of methanol, isobutane, DSP and/or APS as a chain transfer agent or by copolymerization with HFP and/or PPVE as a modifier, more preferably one obtainable by the use of methanol or HFP.

The step A is preferably a step of polymerizing TFE and a modifying monomer to form a core and then polymerizing a monomer composition containing TFE in the presence of a chain transfer agent to form a shell. The modifying monomer and the chain transfer agent are any modifying monomer and/or any chain transfer agent described for the aforementioned PTFE of the core-shell structure.

Examples of the core-shell structure include the aforementioned structures. The core-shell structure is particularly preferably a core-shell structure including a core of modified PTFE and a shell of low molecular weight PTFE obtainable by polymerizing a monomer composition containing TFE in the presence of a chain transfer agent.

As described above, polymerizing a monomer composition containing TFE in the presence of a chain transfer agent can provide a shell of low molecular weight PTFE.

The step A preferably includes a step 1 of charging a reactor with deionized water, a fluorine-containing anion surfactant (excluding PFOA and salts thereof), and a stabilization aid, removing oxygen, adding TFE, and adding a polymerization initiator; a step 2 of adding a monomer copolymerizable with TFE; a step 3 of adding a chain transfer agent; and a step 4 of cooling the system and removing the stabilization aid after the polymerization.

In the step 1, the fluorine-containing anion surfactant (excluding PFOA and salts thereof) is a fluorine-containing anion surfactant excluding PFOA and salts thereof among the aforementioned fluorine-containing surfactants. A preferred example is a fluorine-containing anion surfactant having a LogPOW value of lower than 3.5. Preferred is a fluorine-containing anion surfactant having a LogPOW value of 3.4 or lower.

Specific examples thereof include at least one compound (excluding PFOA and salts thereof) selected from the group consisting of a compound (excluding PFOA and salts thereof) represented by the formula ($N^1$), a compound represented by the formula ($N^2$), a compound represented by the formula ($N^3$), a compound represented by the formula ($N^4$), and a compound represented by the formula ($N^5$).

More specific examples thereof include at least one selected from the group consisting of a perfluorocarboxylic acid (I) (excluding PFOA and salts thereof) represented by the formula (I), an ω-H perfluorocarboxylic acid (II) represented by the formula (II), a perfluoropolyether carboxylic acid (III) represented by the formula (III), a perfluoroalkylalkylenecarboxylic acid (IV) represented by the formula (IV), a perfluoroalkoxyfluorocarboxylic acid (V) represented by the formula (V), a perfluoroalkylsulfonic acid (VI) represented by the formula (VI), an ω-H perfluorosulfonic acid (VII) represented by the formula (VII), a perfluoroalkylalkylenesulfonic acid (VIII) represented by the formula (VIII), an alkylalkylenecarboxylic acid (IX) represented by the formula (IX), a fluorocarboxylic acid (X) represented by the formula (X), an alkoxyfluorosulfonic acid (XI) represented by the formula (XI), and a compound (XII) represented by the formula (XII).

In the case of using a compound represented by the formula ($N^1$) in the fluorine-containing anion surfactant in the step 1, the carbon number of Rf'' in the formula ($N^1$) is preferably an integer of 3 to 6. Also, m1 in the formula ($N^{1a}$) is preferably an integer of 3 to 6. In the case of using a perfluorocarboxylic acid (I), n1 in the formula (I) is preferably an integer of 3 to 6.

In particular, the fluorine-containing anion surfactant is preferably a compound selected form the group consisting of a fluorine-containing carboxylic acid having a carbon number of 4 to 7 and optionally containing etheric oxygen and salts thereof. The carbon number herein means the total carbon number in one molecule. The fluorine-containing anion surfactant used may be a combination of two or more thereof.

The fluorine-containing anion surfactant is preferably a compound selected from the group consisting of a fluorine-containing carboxylic acid having a carbon number of 4 to 7 and containing etheric oxygen and salts thereof. The fluorine-containing carboxylic acid containing etheric oxygen is a compound containing etheric oxygen in the middle of the main carbon chain having a carbon number of 4 to 7, and having-COOH at an end. The terminal-COOH may form a salt.

The number of etheric oxygen atoms in the middle of the main chain is one or more, preferably 1 to 4, more preferably 1 or 2.

The carbon number is preferably 5 to 7.

In particular, the fluorine-containing anion surfactant is preferably a partially or completely fluorinated carboxylic acid whose main chain has a carbon number of 6 or 7, an etheric oxygen number of 1 to 4, and is linear, branched, or cyclic, or a salt thereof. The "main chain" herein means a continuous chain having the maximum carbon atom number.

Specific examples of the fluorine-containing surfactant include $F(CF_2)$—COOM, $F(CF_2)_5COOM$, $H(CF_2)_6COOM$, $CF_3O(CF_2)_3OCHFCF_2COOM$, $C_3F_7$—O—$CF(CF_3)CF_2$—O—$CF(CF_3)COOM$, $CF_3CF_2CF_2OCF(CF_3)COOM$, $CF_3CF_2OCF_2CF_2OCF_2COOM$, $C_2F_5$—O—$CF(CF_3)CF_2$—O—$CF(CF_3)COOM$, $CF_3OCF(CF_3)CF_2OCF(CF_3)COOM$, $CF_2ClCF_2CF_2OCF(CF_3)CF_2OCF_2COOM$, $CF_2ClCF_2CF_2OCF_2CF(CF_3)OCF_2COOM$, $CF_2ClCF(CF_3)OCF(CF_3)CF_2OCF_2COOM$, $CF_2ClCF(CF_3)OCF_2CF(CF_3)OCF_2COOM$, and a compound represented by the following formula:

[Chem. 10]

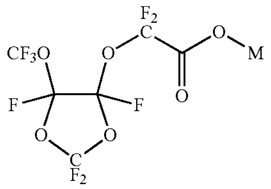

(wherein M is defined as described above). The anionic fluorine-containing surfactant may not have a single formulation but may be a mixture of two or more thereof.

In the step 1, examples of the stabilization aid include those described above. Particularly preferred is paraffin wax. The paraffin wax may be liquid, semi-solid, or solid at room temperature, and is preferably a C12 or higher saturated hydrocarbon. The paraffin wax commonly has a melting point of preferably 40° C. to 65° C., more preferably 50° C. to 65° C.

In the step 1, the polymerization initiator used may be one described for the step A, and may be added in any amount.

In the step 2, the monomer copolymerizable with TFE used may be any of the aforementioned modifying monomers. For example, preferred is at least one monomer selected from the group consisting of PAVE, PFAE, and a cyclic monomer. The PAVE preferably includes at least one selected from the group consisting of PMVE, PEVE, and PPVE. The cyclic monomer is preferably a vinyl heterocycle represented by the formula (II).

Examples of the PFAE include (perfluorobutyl)ethylene (PFBE) and (perfluorohexyl)ethylene.

In the step 2, the monomer copolymerizable with TFE is preferably added before start of polymerization or when the solid concentration of the PTFE is less than 5% by mass after start of polymerization. This can lead to a dispersion of PTFE having a core of modified PTFE.

In the step 2, oxygen may be removed by any method, such as a conventionally known method.

In the step 3, the amount of the chain transfer agent added may be the amount described for the step A.

In the step 3, p1/p2 is preferably 0.60 or higher, more preferably 0.70 or higher, still more preferably 0.80 or higher, particularly preferably 0.90 or higher. For example, the upper limit of p1/p2 may be, but is not limited to, 0.98.

The p1/p2 indicates the proportion of the core in the whole PTFE, and indicates the proportion of the TFE fed in polymerization for PTFE in the case of feeding a modifying monomer or a chain transfer agent during the polymerization relative to the total amount of TFE fed. The p1 is the amount of TFE in the case of feeding a shell and the p2 is the total amount of TFE fed.

In the step 4, cooling and removal of stabilization aid may be performed by any methods, such as conventionally known methods.

In addition to the surfactant and a different compound having a surface-activating performance to be used if necessary, the emulsion polymerization may include the use of an additive for stabilizing the compounds. Examples of the additive include a buffer, a pH adjuster, a stabilization aid, and a dispersion stabilizer.

Preferred examples of the stabilization aid include paraffin wax, fluorine oil, fluorine solvent, and silicone oil. One stabilization aid may be used alone or two or more thereof may be used in combination. The stabilization aid is more preferably paraffin wax. The paraffin wax may be liquid, semi-solid, or solid at room temperature, and is preferably a C12 or higher saturated hydrocarbon. The paraffin wax commonly has a melting point of preferably 40° C. to 65° C., more preferably 50° C. to 65° C.

The stabilization aid is preferably used in an amount of 0.1 to 12% by mass, more preferably 0.1 to 8% by mass, based on the mass of the aqueous medium (e.g., deionized water) used. The stabilization aid is preferably such that it is sufficiently hydrophobic, completely separated from the PTFE aqueous emulsion after emulsion polymerization of TFE, and does not serve as a contaminant.

The aqueous medium is a reaction medium in which polymerization is allowed to occur, and means a liquid that contains water. The aqueous medium may be any medium that contains water, and may be one containing water and, for example, a fluorine-free organic solvent such as an alcohol, ether, or ketone and/or a fluorine-containing organic solvent having a boiling point of 40° C. or lower.

The nonionic surfactant (1) added in the step B may be a nonionic surfactant represented by the aforementioned formula (i).

The nonionic surfactant (1) is preferably a compound represented by the following formula (1):

$$R^4\text{—O-}A^2\text{-H} \qquad (1)$$

wherein $R^4$ is a C8-C18 linear or branched primary or secondary alkyl group having an average number of methyl groups per molecule of 2.0 or more; and $A^2$ is a polyoxyalkylene chain having an average number of oxyethylene units of 7.0 to 12.0 and an average number of oxypropylene units of 0.0 to 2.0.

$R^4$ is preferably an alkyl group represented by the following formula (1-1):

$$CHR^{41}R^{42}, \text{—} \qquad (1\text{-}1)$$

(wherein $R^{41}$ is a hydrogen atom or a C1-C16 alkyl group; $R^{42}$ is a C1-C17 alkyl group; and $R^{41}$ and $R^{42}$ have a total carbon number of 7 to 17). $R^{41}$ is more preferably a hydrogen atom or a C1-C15 alkyl group, still more preferably a hydrogen atom or a C1-C12 alkyl group, further more preferably a hydrogen atom or a C1-C10 alkyl group. $R^{42}$ is more preferably a C1-C15 alkyl group, still more preferably a C1-$C_{14}$ alkyl group, further more preferably a C1-C13 alkyl group.

$R^4$ is preferably a C8-C18 alkyl group having an average number of methyl groups of 2.5 or more. The average number of methyl groups of $R^4$ is more preferably 3.0 or more, still more preferably 3.5 or more, further more preferably 4.0 or more. The upper limit of the average number of methyl groups of $R^4$ is preferably 12 or less, more preferably 10 or less, still more preferably 8 or less.

In the formula (1), $R^4$ is preferably a 2,6,8-trimethyl-4-nonyl group.

When $R^4$ is a 2,6,8-trimethyl-4-nonyl group, the average number of oxyethylene units is preferably 10.0 to 10.5. In this case, the average number of oxypropylene units is 0.0.

In the step C, the fluorine-containing anion surfactant is preferably removed by bringing the aqueous dispersion into contact with an anion exchange resin.

The anion exchange resin used in the step C may be, but is not limited to, a known one. The above contact with an anion exchange resin may be achieved by a known method.

Examples of the anion exchange resin include known ones such as a strongly basic anion exchange resin having as a functional group a $\text{—}N^+X^{-(CH}{}_3)_3$ group (X is Cl or OH) and a strongly basic anion exchange resin having a $\text{—}N^+X^-(CH_3)_3(C_2H_4OH)$ group (X is defined as described above). Specific examples thereof include those disclosed in WO 99/62858, WO 03/020836, WO 2004/078836, WO 2013/027850, and WO 2014/084399.

Examples of the cation exchange resin include, but are not limited to, known ones such as a strongly acidic cation exchange resin having as a functional group a $\text{—}SO_3^-$ group, and a weakly acidic cation exchange resin having as a functional group a $\text{—}COO^-$ group. In terms of removal efficiency, preferred among these is a strongly acidic cation exchange resin, more preferred is a $H^+$-form strongly acidic cation exchange resin.

The "mixed bed of cation exchange resin and anion exchange resin" encompasses, but is not limited to, the case where they are packed into a single column, the case where they are packed into different columns, and the case where they are dispersed in the aqueous dispersion.

In the step C, the fluorine-containing anion surfactant may be removed by condensation. As disclosed in WO 2005/042593, the condensation step may include condensation twice or more.

Accordingly, the step C may be a step of condensing the dispersion obtained in the step B twice or more.

The step C is preferably performed by bringing the aqueous dispersion into contact with an anion exchange resin.

The condensation in the step C is performed by a known method. Specific examples thereof include those disclosed in WO 2007/046482 and WO 2014/084399.

Examples thereof include phase separation, centrifugal settling, cloud point condensation, electric condensation, electrophoresis, filtration with ultrafiltration, filtration with a reverse osmosis membrane (RO membrane), and nanofiltration. The condensation may be performed to achieve a PTFE concentration of 50 to 70% by mass in accordance with the use. The condensation may impair the stability of the dispersion. Thus, a nonionic surfactant may be further added in the step C. The nonionic surfactant in the step C is the same as in the first PTFE aqueous dispersion of the disclosure.

If necessary, a dispersion stabilizer other than the nonionic surfactant may be used. The total amount of the dispersion stabilizer corresponds to a concentration of 0.5 to 20% by mass relative to the solid mass of the PTFE. Less than 0.5% by mass thereof may cause poor dispersion stability. More than 20% by mass thereof may be impractical because its dispersing effect fails to balance the amount. The lower limit of the dispersion stabilizer is more preferably 2% by mass and the upper limit thereof is more preferably 12% by mass.

Even when a fluorine-containing surfactant is used for polymerization, the above condensing operation can remove the fluorine-containing surfactant in the aqueous dispersion.

The condensation is preferably cloud point condensation. The cloud point condensation is preferably performed by heating the dispersion at a temperature that is not lower than the temperature 5° C. lower than the cloud point of the nonionic surfactant. Specifically, the cloud point condensation is preferably performed by heating the dispersion at a temperature that is not lower than the temperature 5° C. lower than the cloud point of the nonionic surfactant, leaving the dispersion to stand, and separating the supernatant phase and the condensed phase.

The condensation may be performed once or may be performed twice or more.

The step D is a step of adding a nonionic surfactant (2) and a fluorine-free anion surfactant to the dispersion obtained in the step C.

The nonionic surfactant (2) and the fluorine-free anion surfactant may be added in any order. The nonionic surfactant (2) may be first added and the fluorine-free anion surfactant may be then added, or the fluorine-free anion surfactant may be first added and the nonionic surfactant (2) may be then added, or the fluorine-containing anion surfactant and the nonionic surfactant may be added at the same time.

The nonionic surfactant (2) and the fluorine-free anion surfactant each may be added in multiple times. The nonionic surfactant (2) and the fluorine-free anion surfactant each may be added alternately in multiple times. The nonionic surfactant (2) added in the step D may be the nonionic surfactant represented by the aforementioned formula (i). The nonionic surfactant (2) is preferably a compound represented by the following formula (2):

$$R^5—O-A^3-H \quad (2)$$

wherein $R^5$ is a C8-C18 linear or branched primary or secondary alkyl group having an average number of methyl groups per molecule of 2.0 or more; and $A^3$ is a polyoxyalkylene chain having an average number of oxyethylene units of 10.0 to 12.0.

$R^5$ is preferably an alkyl group represented by the following formula (2-1):

$$CHR^{51}R^{52}, — \quad (2-1)$$

(wherein $R^{51}$ is a hydrogen atom or a C1-C16 alkyl group; $R^{52}$ is a C1-C17 alkyl group; and $R^{51}$ and $R^{52}$ have a total carbon number of 7 to 17). $R^{51}$ is more preferably a hydrogen atom or a C1-C15 alkyl group, still more preferably a hydrogen atom or a C1-$C_{12}$ alkyl group, further more preferably a hydrogen atom or a C1-C10 alkyl group. $R^{52}$ is more preferably a C1-C15 alkyl group, still more preferably a C1-$C_{14}$ alkyl group, further more preferably a C1-C13 alkyl group.

$R^5$ is preferably a C8-C18 alkyl group having an average number of methyl groups of 2.5 or more. $R^5$ more preferably has an average number of methyl groups of 3.0 or more, still more preferably 3.5 or more, further more preferably 4.0 or more. The upper limit of the average number of methyl groups in $R^5$ is preferably 12 or less, more preferably 10 or less, still more preferably 8 or less.

In the formula (2), $R^5$ is preferably a 2,6,8-trimethyl-4-nonyl group.

When $R^5$ is a 2,6,8-trimethyl-4-nonyl group, the average number of oxyethylene units is preferably 10.1 to 11.0. In this case, the average number of oxypropylene units is 0.0.

The step D is preferably a step of adding a nonionic surfactant (2) and thereby allowing the dispersion to have a concentration of the nonionic surfactants of 4 to 12% by mass relative to the polytetrafluoroethylene. More preferred is addition for 5% by mass or more while more preferred is addition for 10% by mass or less, still more preferred is addition for 8% by mass or less.

Examples of the fluorine-free anion surfactant added in the step D include an alkyl sulfonate, an alkyl sulfate, an alkyl aryl sulfate, and salts thereof; a fatty acid (aliphatic carboxylic acid) and salts thereof; an alkyl phosphate, an alkyl aryl phosphate, and salts thereof. Preferred among these are an alkyl sulfonate, an alkyl sulfate, an aliphatic carboxylic acid, and salts thereof.

More preferred among these is at least one selected from the group consisting of an alkyl sulfate and salts thereof and a fatty acid and salts thereof.

The alkyl sulfate or a salt thereof is preferably ammonium lauryl sulfate or sodium lauryl sulfate, for example.

The fatty acid or a salt thereof is preferably succinic acid, decanoic acid, undecanoic acid, undecenoic acid, lauric acid, hydrododecanoic acid, or a salt thereof.

The fluorine-free anion surfactant is preferably contained in an amount of 50 to 5000 ppm relative to the PTFE.

The lower limit of the amount of the fluorine-free anion surfactant added is more preferably 50 ppm, still more preferably 100 ppm, further more preferably 200 ppm. Too small an amount thereof may cause a poor viscosity adjusting effect.

The upper limit of the amount of the fluorine-free anion surfactant added is more preferably 4000 ppm, still more preferably 3000 ppm, further more preferably 2000 ppm, particularly preferably 1000 ppm. Too large an amount thereof may cause an increased viscosity, especially an increased viscosity at high temperature, as well as a large amount of bubbling.

The production method of the disclosure also preferably includes a step of adding a preservative to the aqueous dispersion. Examples of the preservative include those described for the aqueous dispersion of the disclosure.

The production method of the disclosure also preferably includes a step of adding a coating material ingredient. Examples of the coating material ingredient include additives that may be added to a coating material. Specific examples thereof include common coating material additives such as a pigment (e.g., extender pigment, scale pigment), pigment dispersant, thickening agent, leveling agent, film-forming aid, solid lubricant, precipitation inhibitor, moisture absorbent, surface conditioner, thixotropic agent, viscosity modifier, anti-gelling agent, ultraviolet absorber, HALS (light stabilizer), matting agent, plasticizer, anti-flooding agent, anti-skinning agent, scratch inhibitor, anti-corrosive agent, fungicide, antibacterial agent, antioxidant, flame retarder, sagging inhibitor, antistatic agent, silane-coupling agent, filler, carbon black, clay, barium sulfate, glass, a variety of reinforcing material, a variety of extender, conductive filler, colloidal silica, and powder of metal such as gold, silver, copper, platinum, or stainless steel.

The additives may be additives other than colloidal silica.

The coating material ingredient may be contained in an amount set as appropriate in accordance with the use, although not limited thereto.

The production method may also include a step of collecting the PTFE aqueous dispersion obtained by the polymerization.

The disclosure also provides a PTFE aqueous dispersion obtained by the production method of the disclosure. The PTFE aqueous dispersion obtained by the production method of the disclosure may have the features described for the above first PTFE aqueous dispersion of the disclosure as appropriate.

The PTFE aqueous dispersion obtained by the production method of the disclosure has a concentration of the nonionic surfactants of preferably 4% by mass or more, more preferably 5% by mass or more, while preferably 12% by mass or less, more preferably 10% by mass or less, still more preferably 8% by mass or less, further more preferably 7% by mass or less, relative to the PTFE.

In the PTFE aqueous dispersion obtained by the production method of the disclosure, the nonionic surfactants preferably have a cloud point of 60° C. or higher, more preferably 63° C. or higher, still more preferably 65° C. or higher, while preferably 80° C. or lower, more preferably 76° C. or lower, still more preferably 73° C. or lower.

In the PTFE aqueous dispersion obtained by the production method of the disclosure, the nonionic surfactants preferably have a HLB value of 13.00 to 15.00, more preferably 13.30 or higher, still more preferably 13.50 or higher.

In the PTFE aqueous dispersion obtained by the production method of the disclosure, the fluorine-containing anion surfactant preferably amounts to 1.0 ppm or less relative to the aqueous dispersion.

The PTFE aqueous dispersion obtained by the production method of the disclosure may be applied as it is or optionally in admixture with any additive, thereby providing various coated articles such as those shown below. Examples of the coated articles include cookware such as frying pans, electric skillets, pressure cookers, various other pots, rice cookers, mochi (rice cake) makers, ovens, hot plates, bread pans, kitchen knives, and gas cooktops; food and beverage containers such as electric kettles and ice cube trays; components for the food industry such as mixing rolls, rolling mill rolls, conveyors, and hoppers; industrial components such as rolls for office automation (OA) equipment, belts for OA equipment, separation claws for OA equipment, papermaking rolls, and calender rolls for film making; metal molds such as metal molds for molding expanded polystyrene, casting molds, and releasing plates for producing plywood and smoothly planned board; kitchen supplies such as cooking range hoods; equipment for producing frozen food such as conveyor belts; tools such as saws, files, dies, and gimlets; household utensils such as irons, scissors, and kitchen knives; metal foil and electric wiring; sliding bearings for food processing equipment, packaging machinery, and spinning and weaving machinery; sliding components for cameras and watches; automobile components such as pipes, valves, and bearings; snow shovels, spades, chutes, ship bottoms, boilers, and industrial containers (especially for the semiconductor industry).

The first PTFE aqueous dispersion of the disclosure and the PTFE aqueous dispersion obtained by the production method of the disclosure (hereinafter, the term “the aqueous dispersion of the disclosure” includes both the first PTFE aqueous dispersion of the disclosure and the PTFE aqueous dispersion obtained by the production method of the disclosure, unless otherwise mentioned) may be applied to any use. When the aqueous dispersion is applied as it is, examples of the use include coating formed by applying the aqueous dispersion to a substrate, followed by drying and optionally baking; impregnation achieved by impregnating the aqueous dispersion into a porous support such as nonwoven fabric or a resin molded article, followed by drying and preferably baking; cast film obtained by applying the aqueous dispersion to a substrate such as glass, followed by drying, optionally immersion into water, and removal of the substrate to provide a thin film. Examples of applications of these include an aqueous coating material, tent sheet, conveyer belt, printed circuit board (CCL), binding agent for electrodes, and water-repellent agent for electrodes.

The first PTFE aqueous dispersion of the disclosure is preferably an aqueous coating material. The first PTFE aqueous dispersion of the disclosure has a low viscosity at high temperature, and thus is particularly suitable for an aqueous coating material. The aqueous coating material contains PTFE, an aqueous medium, and a nonionic surfactant, and may contain the aforementioned preservative and coating material ingredient, if necessary.

The first PTFE aqueous dispersion of the disclosure may be compounded with any known compounding agents such as a pigment, thickening agent, dispersant, antifoam, antifreeze, and film-forming aid, or may be combined with a different polymer compound, so that it can be used as an aqueous coating material for coating.

The disclosure also relates to a coating film obtained by applying the first aqueous dispersion of the disclosure. The coating film of the disclosure can be produced by a conventionally known method except that the aqueous dispersion of the disclosure is used.

The coating film of the disclosure is obtainable by applying the aqueous dispersion of the disclosure to a substrate. The substrate may be formed from any material. Examples thereof include metals such as simple metal, e.g. iron, aluminum, stainless steel, and copper, and alloys of any of these; and nonmetal inorganic materials such as enamel, glass, and ceramic. An example of alloys is stainless steel. The material of the substrate is preferably a metal, more preferably aluminum or stainless steel.

In particular, the first PTFE aqueous dispersion of the disclosure is suitable for an aqueous coating material for impregnation. Impregnation includes baking and therefore easily causes a high temperature environment. Still, the PTFE aqueous dispersion of the disclosure exhibits good permeability into a fibrous substrate even in a high temperature environment and thus can uniformly impregnate thereinto. The disclosure also relates to an impregnated film obtainable by impregnation of the aqueous dispersion of the disclosure.

The impregnated film of the disclosure can be produced by a conventionally known method except that the aqueous dispersion of the disclosure is used. For example, the impregnated film of the disclosure is obtainable by impregnating the first PTFE aqueous dispersion of the disclosure into a porous support and then removing the aqueous medium. The aqueous medium can be commonly removed by drying at normal temperature and/or drying under heating. An impregnated film obtainable by impregnation of the first PTFE aqueous dispersion of the disclosure is preferably one that has been subjected to at least drying under heating. The “drying under heating” in the impregnation may be performed at 80° C. to 400° C., for example.

The porous support may be any support having a porous structure and may be either an organic or inorganic material. Examples thereof include those formed from glass wool, ceramic, alumina, PTFE porous film, carbon, nonwoven fabric, and a variety of polymers.

The first PTFE aqueous dispersion of the disclosure may also be applied to the use as an additive, such as the use as a binding agent, binder for reducing removal of an active material of an electrode, the use as a compound such as an anti-dripping agent, and the use for dust-reducing treatment that can prevent rising of dust, earth and sand.

The first PTFE aqueous dispersion of the disclosure is also preferably used as a dust-reducing agent. The dust-reducing agent may be used in a method of reducing dust of dusting material by mixing it with dusting material and applying a compression-shearing action to the mixture at 20° C. to 200° C. to form PTFE fibrils, such as the methods disclosed in JP 2827152 B and JP 2538783 B.

The PTFE aqueous dispersion can be suitably used for the dust-reducing agent composition disclosed in WO 2007/004250 and can be suitably used for the dust-reducing method disclosed in WO 2007/000812.

The dust-reducing agent may be suitably used for dust-reducing treatment in the field of building materials, the field of soil stabilizers, the field of solidifiers, the field of fertilizers, the field of landfill disposal of incinerator ash and hazardous material, the field of explosion proof, the field of cosmetics, and sand for pet excrement collection, typically cat litter.

The inventors have conducted intensive research for finding a composition that achieves both prevention of mud crack and prevention of coloring during baking. A conventionally known method for preventing mud crack is a method of adding a high boiling point solvent, such as triethanolamine or diethanolamine, and a long chain aliphatic acid that is liquid at room temperature and is non-volatile, such as caprylic acid, capric acid, or oleic acid. Unfortunately, a high boiling point solvent and a long chain aliphatic acid added in amounts effective to prevent mud crack may react during baking and be converted into substances that cause coloring of a coating film. Accordingly, an oxidant needs to be added. Adding an oxidant can cause decomposition of most of the high boiling point solvent and long chain aliphatic acid at the melting point of a fluororesin or lower and can thereby decrease the coloring substances, but such addition in turn causes a failure in preventing shrinkage crack during baking.

Another possible method may be a method of simultaneously preventing mud crack and thermal shrinkage by adding a water-soluble high boiling point solvent that dissolves acrylic resin particles, such as butyl diglycol or dipropylene glycol methyl ether, and then melting the acrylic resin particles during drying. Unfortunately, the water-soluble high boiling point solvent decreases the emulsifying action of a nonionic surfactant added as a dispersant. This causes break of fluororesin emulsion due to shearing in spray coating, resulting in issues such as unevenness of a coating film and occurrence of nibs.

The inventors have examined compounding a high boiling point polyhydric alcohol and a depolymerizable acrylic resin particulate in a specific ratio into a PTFE aqueous dispersion in which a PTFE resin particulate is dispersed by a nonionic surfactant. The inventors have then found that a high boiling point polyhydric alcohol alone can prevent mud crack, but fails to prevent cracking by thermal shrinkage without an acrylic resin binder. The inventors have also found that a depolymerizable acrylic resin particulate alone fails to prevent mud crack, but the target effects can be achieved only when both of the above components are used together in a specific compounding ratio. The inventors have further found that even the absence of an oxidant can achieve both prevention of mud crack and prevention of coloring during baking, as well as formation of a melted coating film with excellent appearance. Finally, the inventors have completed the following second and third PTFE aqueous dispersions.

The disclosure also relates to a PTFE aqueous dispersion (hereinafter, also referred to as a second PTFE aqueous dispersion of the disclosure) containing: (A) a PTFE resin particulate; (B) a high boiling point polyhydric alcohol containing no nitrogen atom, having a boiling point of 100° C. or higher, and containing two or more hydroxy groups; (C) a depolymerizable acrylic resin particulate having a decomposing and vaporizing temperature within a temperature range up to a decomposition temperature of the PTFE resin; (D) a nonionic surfactant; and (E) an aqueous medium, the high boiling point polyhydric alcohol (B) and the depolymerizable acrylic resin particulate (C) being contained respectively in an amount of 5 to 18 parts by mass and in an amount of 5 to 25 parts by mass relative to 100 parts by mass of the polytetrafluoroethylene resin (A), the polytetrafluoroethylene aqueous dispersion containing neither an oxidizing agent nor an amine-type solvent.

(A) PTFE Resin Particulate

The PTFE resin particulate used in the second PTFE aqueous dispersion of the disclosure may be the same PTFE as in the first PTFE aqueous dispersion of the disclosure and may be a TFE homopolymer. It is preferably a modified PTFE containing 99.0% by mass or more of a polymerized unit based on TFE and 1.0% by mass or less of a polymerized unit based on a modifying monomer. The amount of the modifying monomer constituting the modified PTFE is preferably within a range of 0.00001 to 1.0% by mass relative to the PTFE. The lower limit is more preferably 0.0001% by mass, still more preferably 0.001% by mass, further more preferably 0.005% by mass, particularly preferably 0.010% by mass, more particularly preferably 0.030% by mass. The upper limit is preferably 0.90% by mass, more preferably 0.50% by mass, still more preferably 0.40% by mass, further more preferably 0.30% by mass. When the modified PTFE contains PPVE as a modifying monomer, the lower limit of the amount of the polymerized unit based on PPVE in the modified PTFE is preferably 0.17% by mass. The modified PTFE also still more preferably has a core-shell structure.

(B) Polyhydric Alcohol

A function of the high boiling point polyhydric alcohol used in the second PTFE aqueous dispersion of the disclosure is to prevent mud crack when the aqueous dispersion applied is dried. The aqueous dispersion composition applied is commonly dried at room temperature to 150° C. In the drying, water evaporates first. Unless a high boiling point polyhydric alcohol is used which does not evaporate at the drying temperature or which evaporates slower than water, water will evaporate before the decomposable acrylic resin particulate softens and voids may occur between resin particles, which may cause mud crack.

As a result, in accordance with the drying temperature and the type of the high boiling point polyhydric alcohol (particularly the boiling point thereof), the inside of the dried coating film is in a state in which (1) both the high boiling point polyhydric alcohol and the depolymerizable acrylic resin particulate are present, (2) the high boiling point polyhydric alcohol hardly remains and the depolymerizable acrylic resin is melted to fix the PTFE resin particulate, or (3) both of these states are mixed.

The polyhydric alcohol used in the second PTFE aqueous dispersion of the disclosure is one which contains no nitrogen atom, has two or more hydroxy groups, and has a boiling point of 100° C. or higher (higher than the heat-melt starting temperature (softening point) of the depolymerizable acrylic resin). A polyhydric alcohol containing a nitrogen atom is not preferred because it causes coloring due to thermal decomposition during baking. The reason why the boiling point is to be 100° C. or higher (higher than the heat-melt starting temperature (softening point)) is that the polyhydric alcohol is not allowed to evaporate before water during drying and needs to remain in the coating film after drying. The boiling point is preferably the drying temperature or higher, more preferably 150° C. or higher, still more preferably 200° C. or higher. The polyhydric alcohol needs to contain two or more hydroxy groups. Those having one or no hydroxy group have poor hydrophilicity in the case of substances having a boiling point of 100° C. or higher and are therefore difficult to mix uniformly. The number of hydroxy groups is preferably 2 or 3. Many of those having four or more hydroxy groups are solid at room temperature and are less expected to achieve an effect of preventing mud crack.

The polyhydric alcohol used in the second PTFE aqueous dispersion of the disclosure finally needs to completely evaporate or completely decompose and volatilize by the heat during baking to be described later. Thus, the boiling point or thermal decomposition temperature thereof is preferably the melting point of the PTFE resin or lower, more preferably 340° C. or lower.

Preferred examples of the polyhydric alcohol include one or two or more of ethylene glycol (boiling point: 198° C.), 1,2-propanediol (188° C.), 1,3-propanediol (214° C.), 1,2-butanediol (190° C.), 1,3-butanediol (208° C.), 1,4-butanediol (229° C.), 1,5-pentanediol (242° C.), 2-butene-1,4-diol (235° C.), glycerol (290° C.), 2-ethyl-2-hydroxymethyl-1,3-propanediol (295° C.), and 1,2,6-hexanetriol (178° C./5 mmHg). In terms of cost and safety, for example, preferred among these is glycerol.

If necessary, an organic solvent other than the polyhydric alcohol may be used together within a range where the effects of the second PTFE aqueous dispersion of the disclosure are not impaired. Examples of this organic solvent include aromatic hydrocarbon solvents such as toluene and xylene, and C9-C11 aliphatic hydrocarbon solvents.

The polyhydric alcohol (B) is combined in an amount of 5 to 18 parts, preferably 7 to 15 parts, particularly preferably 7 to 12 parts, relative to 100 parts of the PTFE resin particulate (solid content). Less than 5 parts thereof may cause a weak effect of preventing mud crack, while more than 18 parts thereof may cause a clouded coating film.

(C) Depolymerizable Acrylic Resin Particulate

The depolymerizable acrylic resin particulate used in the second PTFE aqueous dispersion of the disclosure gradually decomposes while maintaining the binder effect to the PTFE resin particulate when the second PTFE aqueous dispersion of the disclosure is baked after application and drying, and thus prevents shrinkage crack. Accordingly, the depolymerizable acrylic resin particulate needs to melt and to start depolymerization at the melting point of the PTFE resin or lower, to remain at least partially at the melting point of the PTFE resin particulate, and to almost completely decompose and volatilize at the baking temperature.

When the dried coating film is heated, first started are evaporation or decomposition and volatilization of the remaining polyhydric alcohol and heat-melting of the depolymerizable acrylic resin particulate. The polyhydric alcohol needs to remain until the depolymerizable acrylic resin particulate is completely heat-melted. As the temperature further rises, evaporation or decomposition of the remaining polyhydric alcohol is completed and depolymerization of the heat-melted depolymerizable acrylic resin starts. This depolymerization of the depolymerizable acrylic resin gradually starts from a temperature that is not higher than the melting point of the PTFE resin, but is not yet completed at the temperature (melting point) at which the PTFE resin particulate starts to heat-melt. The depolymerization is completed when the temperature reaches the baking temperature that is higher than the melting point of the PTFE resin. This can prevent remaining of a large amount of the depolymerizable acrylic resin in the resulting PTFE resin coating film. Because the depolymerizable acrylic resin has viscosity during heat melting and depolymerization thereof gradually progresses, no sudden shrinkage occurs even when the PTFE resin particulate is melted and fused, reducing occurrence of thermal shrinkage crack.

Thus, the depolymerizable acrylic resin particulate is preferably a particulate that remains until the temperature (melting point) at which the PTFE resin particulate starts to melt even though depolymerization starts from the melting point of the PTFE resin or lower and that decomposes and volatilizes at the baking (processing) temperature. For example, the depolymerizable acrylic resin particulate preferably remains in an amount of 5% or more, particularly 10% or more and at least 50%, preferably at least 20%, at the melting point of the PTFE resin (commonly 240° C. to 345° C.), remains in an amount of at most 10%, particularly at most 5%, at the baking (processing) temperature (commonly higher than the melting point of the PTFE resin and up to 415° C., preferably 360° C. to 400° C.), and substantially does not remain at completion of baking. From the above, the depolymerization (decomposition) temperature of the depolymerizable acrylic resin particulate is preferably about 200° C. or higher and lower than the baking (processing) temperature of the PTFE resin, particularly the melting point of the PTFE resin or lower. In the case of an acrylic resin particulate that has a depolymerization (thermal decomposition) temperature of higher than the melting point of the PTFE resin and that generates a large amount of decomposition gas, the resulting coating film may easily have coating film defects such as pinholes. In particular, regardless of the type of the resin, the depolymerizable acrylic resin preferably remains in an amount of about 25 to 50% within a temperature range of 300° C. to 320° C., in an amount of about 20 to 10% in a temperature range of 330° C. to 345° C., in view of balance between the function of preventing shrinkage crack and the function of preventing coloring. Any depolymerizable acrylic resin particulate satisfying these conditions may be used.

With regard to depolymerizability, generally as described in "Polym. Eng. Soi., Vol. 6, p. 273 (1966)", "Plast. Massy., Vol. 75, p. 48 (1971)", and "Deterioration of Polymer Material", Corona Publishing Co., Ltd., p. 144 (1958), C—C bonds and C—H bonds become weaker and the polymer chain is more easily oxidized, decomposed, and depolymerized as the polymer chain contains more branches. Thus, the depolymerizable acrylic resin particulate in the second PTFE aqueous dispersion of the disclosure may be a methacrylate resin, and preferred specific examples thereof include a methacrylate homopolymer or copolymer essentially containing a methacrylate monomer represented by the following formula (5):

$$CH_2{=}C(CH_3)COOR \quad (5)$$

(wherein R is a C1-C5 alkyl group or hydroxyalkyl group). Preferred specific examples of the methacrylate monomer include methyl methacrylate, ethyl methacrylate, propyl methacrylate, dimethylpropyl methacrylate, butyl methacrylate, and pentyl methacrylate. Because of a low glass transition temperature and good depolymerizability (decomposability), preferred among these is a depolymerizable acrylic resin containing butyl methacrylate as a monomer.

A homopolymer may cause no issue when a stable emulsion is formed. Still, in order to stabilize the emulsion, a monomer having a carboxyl group or a hydroxy group may be appropriately used as a comonomer.

The depolymerizable acrylic resin particulate used may be a fine particulate (depolymerizable acrylic resin emulsion) as it is produced by a method such as emulsion polymerization. The average particle size thereof is preferably 0.1 to 100 μm, particularly 0.2 to 1 μm. A particulate having an average particle size of smaller than 0.1 μm tends to cause mud crack. A particulate having an average particle size of 100 μm tends to cause difficulty in application.

The amount of the depolymerizable acrylic resin particulate (C) is 5 to 25 parts, preferably 7 to 20 parts, particularly preferably 10 to 15 parts, relative to 100 parts of the PTFE resin particulate (solid content). Less than 5 parts thereof may cause a difficulty in forming a film of the PTFE resin, while more than 25 parts thereof may cause coloring of a coating film.

The depolymerizable acrylic resin particulate is preferably mixed with other components in the form of emulsion.

(D) Nonionic Surfactant

Examples of the nonionic surfactant used for the second PTFE aqueous dispersion of the disclosure include the same nonionic surfactants described for the first PTFE aqueous dispersion of the disclosure. The amount thereof is preferably 4% by mass or more, more preferably 5% by mass or more, still more preferably 5.5% by mass or more, while preferably 12% by mass or less, more preferably 10% by mass or less, still more preferably 8% by mass or less, further more preferably 7% by mass or less, relative to the PTFE.

Too large an amount of the nonionic surfactant may cause too high a viscosity. Too small an amount thereof may cause poor storage stability and poor mechanical stability.

Examples of a different nonionic surfactant to be used include at least one non-fluorinated nonionic surfactant represented by the formula:

$$R_1O—[CH_2CH_2O]_n—[R^2O]_mR_3 \quad (6)$$

(wherein $R_1$ represents a linear or branched aliphatic hydrocarbon group having at least 6 carbon atoms, preferably 8 to 18 carbon atoms; $R_2$ represents an alkylene unit having 3 or 4 carbon atoms; $R_3$ represents hydrogen, a $C_1$-$C_3$ alkyl group, or a $C_1$-$C_3$ hydroxyalkyl group; n has a value of 0 to 40; m has a value of 0 to 40; and the sum of n+m is at least 2). A specific example thereof is a polyoxyalkylene alkyl ether nonionic surfactant represented by the formula (6). A particularly preferred, non-phenolic nonionic surfactant is a nonionic surfactant represented by the following formula (7):

$$C_xH_{2x+1}CH(C_yH_{2y+1})C_zH_{2z}O(C_2H_4O)_nH \quad (7)$$

(wherein x is an integer of 1 or greater; y is an integer of 1 or greater; z is 0 or 1; x+y+z is an integer of 8 to 18; and n is an integer of 4 to 20) and having a HLB value of 9.50 to 16.00, and/or polyoxyethylene alkyl ether surfactant represented by the following formula (8):

$$C_xH_{2x+1}—O-A-H \quad (8)$$

(wherein x is an integer of 8 to 18; and A is a polyoxyalkylene chain having 5 to 20 oxyethylene units and one or two oxypropylene units). In order to stably disperse the PTFE resin, preferably, the HLB value of these is 9.50 to 16.00, more preferably 12.00 to 15.00, still more preferably 12.00 to 14.00.

(E) Aqueous Solvent

The aqueous solvent is used as a liquid medium of the aqueous dispersion composition for coating and adjusts the solid concentration of the composition. Water may be used alone, or an aqueous solvent mixture may be used in which water is used in combination with a water-soluble compound.

If necessary, a different additive may be further compounded.

(F) Inorganic Material

Examples of inorganic material include a pigment, as well as mica particles, mica particles coated with a pigment, metal flakes, and inorganic filler of two or more of these. These may be compounded in an amount within the range that does not impair the effects of the second PTFE aqueous dispersion of the disclosure.

Examples of the pigment used include various conventionally known pigments, such as titanium oxide, carbon black, and colcothar. The disclosure is superior in that carbon black, which is to be bleached by the influence of an oxidizing agent in conventional cases, can be used at ease.

The inorganic filler is a substance that imparts a function of improving the abrasion resistance. In order to give beautiful appearance, mica is preferred. The mica particles have a particle size of 10 to 100 μm, preferably 15 to 50 μm. A particle size of smaller than 10 μm tends to cause poor abrasion resistance and poor luster. A particle size of greater than 100 μm tends to cause poor non-stickiness. The mica particles coated with a pigment is obtainable by attaching a pigment such as $TiO_2$·$Fe_2O_3$ to the mica particles by sintering deposition, for example. Examples of the metal flakes include flakes of titanium, zirconium, aluminum, zinc, antimony, tin, iron, and nickel. In terms of rust resistance, preferred are titanium and zirconium. The size thereof used may be a size within the range for common coating material.

Other various known additives may be compounded as long as the effects of the second PTFE aqueous dispersion of the disclosure are not impaired. Examples thereof include an antifoam, a desiccant, a thickening agent, a leveling agent, and an anti-crawling agent.

Examples of the antifoam include nonpolar solvents such as toluene, xylene, and a C9-C11 hydrocarbon, and silicone oil.

An example of the desiccant is cobalt oxide.

Examples of the thickening agent include methyl cellulose, polyvinyl alcohol, a carboxylated vinyl polymer, and an aqueous solution of sodium lauryl sulfate.

The second PTFE aqueous dispersion of the disclosure preferably has a viscosity at 55° C. of 50 mPa·s or lower. The second PTFE aqueous dispersion of the disclosure having a viscosity at 55° C. of 50 mPa·s or lower is particularly suitable for use at high temperature such as used in the field of impregnation into a fibrous substrate. Impregnation includes baking and therefore easily causes a high temperature environment. Still, the second PTFE aqueous dispersion of the disclosure exhibits good permeability into a fibrous substrate even in a high temperature environment and thus can uniformly impregnate thereinto. The viscosity at 55° C. is more preferably 45 mPa·s or lower, still more preferably 40 mPa·s or lower, further more preferably 35 mPa·s or lower. The lower limit of the viscosity at 55° C. may be, but is not limited to, 10 mPa·s or higher, for example.

The second PTFE aqueous dispersion of the disclosure preferably has a ratio (viscosity at 55° C.)/(viscosity at 25° C.) of 4.00 or lower. The second PTFE aqueous dispersion of the disclosure is particularly suitable for use in impregnation into a fibrous substrate. Impregnation includes baking and therefore easily causes a high temperature environment. The amount of PTFE sticking to the fibrous substrate during impregnation is easily influenced by the viscosity of the aqueous dispersion, which generates a demand for an aqueous dispersion having a low viscosity-temperature dependence. The first PTFE aqueous dispersion of the disclosure, the above ratio of which is 4.00 or lower, is excellent in that it has a low viscosity-temperature dependence and has stable quality.

From this viewpoint, the ratio (viscosity at 55° C.)/(viscosity at 25° C.) is more preferably 3.00 or lower, still more preferably 2.00 or lower, further more preferably 1.50 or lower, still further more preferably 1.20 or lower, particularly preferably 1.10 or lower, more particularly preferably 1.00 or lower.

The viscosity at 25° C. is a value measured using a B-type rotational viscometer under the conditions described in Examples later. The viscosity at 55° C. is a value obtained by increasing the liquid temperature up to 55° C., maintaining the liquid for 60 minutes, and then performing the measurement under the same conditions as for the measurement at 25° C. In the case of 80 mPa·s or higher, a viscosity-increasing phenomenon occurs over time in the viscosity measurement. Thus, the viscosity is measured after 5 minutes and 10 minutes from the start of measurement and the average thereof is used.

The second PTFE aqueous dispersion of the disclosure preferably has a viscosity-temperature transition (VTT) of higher than 55° C., more preferably 60° C. or higher. A viscosity-temperature transition of higher than 55° C. means a technical significance of eliminating the need for changing the processing conditions between 25° C. and 55° C.

VTT indicates the viscosity-temperature dependence of the PTFE aqueous dispersion. VTT is obtainable by increasing the PTFE aqueous dispersion up to 25° C., 35° C., 45° C., and 55° C., maintaining the PTFE aqueous dispersion at the respective temperatures for 60 minutes, and then performing the measurement using a B-type rotational viscometer under the conditions described in Examples later. The VTT point is a temperature at which the viscosity again reaches the same value as obtained in the measurement at 25° C. In the case of 80 mPa·s or higher, a viscosity-increasing phenomenon occurs over time in the viscosity measurement. Thus, the viscosity is measured after 5 minutes and 10 minutes from the start of measurement and the average thereof is used.

The PTFE resin in the second PTFE aqueous dispersion of the disclosure has a solid concentration of 50 to 70% by mass. The solid concentration is preferably 55% by mass or more, more preferably 57% by mass or more, while preferably 65% by mass or less, more preferably 60% by mass or less. Even though the PTFE resin has a solid concentration within the above range, the second aqueous dispersion of the disclosure is able to have a viscosity at 55° C. of 50 mPa·s or lower.

The second PTFE aqueous dispersion of the disclosure is preferably substantially free from a fluorine-containing surfactant. For the composition of the disclosure, "substantially free from a fluorine-containing surfactant" means that the fluorine-containing surfactant amounts to 1.0 ppm or less relative to the PTFE aqueous dispersion.

Even though the second PTFE aqueous dispersion of the disclosure is substantially free from a fluorine-containing surfactant, it can have low viscosity at high temperature and can have excellent mechanical stability at high temperature.

The amount of the fluorine-containing surfactant is preferably 700 ppb or less, more preferably 600 ppb or less, still more preferably 500 ppb or less.

The amount of the fluorine-containing surfactant in the second PTFE aqueous dispersion of the disclosure can be determined by the same method as that described for the first PTFE aqueous dispersion of the disclosure.

In the case where the second PTFE aqueous dispersion of the disclosure is obtained by polymerization using a fluorine-containing surfactant, the amount of the fluorine-containing surfactant can be adjusted to the above range by adding a nonionic surfactant to the PTFE aqueous dispersion immediately after polymerization and then concentrating the mixture, for example. Examples of the fluorine-containing surfactant include the fluorine-containing anion surfactants described for the first PTFE aqueous dispersion of the disclosure.

The second PTFE aqueous dispersion of the disclosure may be prepared according to the aforementioned method, or may be prepared by a common method. For example, preparation may be performed by dispersing the PTFE resin particulate (A) in the aqueous medium (E) by the nonionic surfactant (D), mixing the resulting PTFE resin aqueous dispersion with the polyhydric alcohol (B) and the depolymerizable acrylic resin particulate emulsion (C), and optionally with the inorganic material (F) as well as a different additive under stirring, and stir-mixing the components at 5° C. to 30° C. for 10 to 40 minutes. The solid concentration may be adjusted by adding the aqueous medium (E).

The second PTFE aqueous dispersion of the disclosure is useful as a coating material, particularly a top coat coating material. Coating may be performed by a variety of coating methods as in conventional cases. Examples thereof include dipping, spraying, roll coating, doctor blade coating, and flow coating.

The second PTFE aqueous dispersion of the disclosure may be applied directly to a substrate. In order to improve the adhesion, preferably, a primer layer is provided and a coating film is formed thereon as a top coat layer. Examples of the substrate used include, but are not limited to, a variety of metal, enamel, glass, and a variety of ceramic. In order to improve the adhesion, the surface is preferably roughened by sandblasting, for example.

The composition for coating applied to the substrate is then dried. The second PTFE aqueous dispersion of the disclosure is characterized in that mud crack does not occur at this drying stage. Drying is performed under common conditions which depend on the boiling point of the polyhydric alcohol used. For example, drying at room temperature to 150° C., preferably 80° C. to 150° C., for 5 to 20 minutes can lead to set-to-touch.

The dried coating film is baked (processed). For the second PTFE aqueous dispersion of the disclosure, the depolymerizable acrylic resin serves as a binder until the PTFE resin particulate is melted and fused. This can prevent occurrence of crack due to thermal shrinkage at this baking stage. The baking (processing) temperature and duration depend on, for example, the type and melting point of the PTFE resin, and are the melting point of the PTFE resin or higher, commonly 360° C. to 415° C. and 5 to 30 minutes, preferably 360° C. to 380° C. for 10 to 30 minutes.

In the case of providing a primer layer, the primer layer may be provided by a method in which a primer layer is first applied, dried, and baked and the second PTFE aqueous dispersion of the disclosure is then applied, dried, and baked (2 coating 2 baking method), or by a method in which a primer layer is first applied and dried, the second PTFE aqueous dispersion of the disclosure is then applied and dried, and finally both are baked simultaneously (2 coating 1 baking method).

For the second PTFE aqueous dispersion of the disclosure, a single coating can provide a thick coating film with a melted coating film thickness of 30 μm or greater. The upper limit is preferably, but is not limited to, 100 μm or smaller because too thick a coating film may cause a variety of decomposition residues to remain in the coating film, which may be a cause of coloring.

The second PTFE aqueous dispersion of the disclosure is most useful for coating of metal cooking utensils, particularly frying pans, for example. The PTFE aqueous dispersion may be used for coating other products which require corrosion resistance. Examples of other products include bearings, valves, electric wires, metal foil, boilers, pipes, ship bottoms, oven linings, bottom plates of irons, bread pans, rice cookers, electric skillets, electric kettles, ice cube trays, snow plow shovels, spades, chutes, conveyers, rolls, metal dies, tools such as dies, saws, files, and drills, kitchen knives, scissors, hoppers, other industrial containers (particularly for the semiconductor industry) and casting molds.

The disclosure also relates to a coated article including a coating film obtained by applying the second PTFE aqueous dispersion of the disclosure. The coating film can be produced by a conventionally known method and is obtainable by applying the aqueous dispersion of the disclosure to a substrate. The substrate may be formed from any material. Examples thereof include metals such as simple metal, e.g. iron, aluminum, stainless steel, and copper, and alloys of any of these; and nonmetal inorganic materials such as enamel, glass, and ceramic. An example of alloys is stainless steel. The material of the substrate is preferably a metal, more preferably aluminum or stainless steel.

The coating film preferably has a thickness of 30 μm or greater. Too thick a coating film may cause a variety of decomposition residues to remain in the coating film, which may be a cause of coloring. Thus, the thickness is preferably 100 μm or smaller.

The coated article may include a primer layer.

Examples of the use of the coated article include metal cooking utensils (particularly frying pans), bearings, valves, electric wires, metal foil, boilers, pipes, ship bottoms, oven linings, bottom plates of irons, bread pans, rice cookers, electric skillets, electric kettles, ice cube trays, snow plow shovels, spades, chutes, conveyers, rolls, metal dies, tools such as dies, saws, files, and drills, kitchen knives, scissors, hoppers, other industrial containers (particularly for the semiconductor industry) and casting molds.

The disclosure also relates to a PTFE aqueous dispersion (hereinafter, also referred to as a third PTFE aqueous dispersion of the disclosure) containing a PTFE resin particulate, a depolymerizable acrylic resin particulate, and water, wherein supposing that primary average particles of the respective resin particulates are replaced by true spheres of a same volume, a nonionic surfactant is present in an amount that occupies 75 to 95% of a theoretical porosity, which is 26%, between the resin particulates when the resin particulates are arranged in a close packed structure, and the nonionic surfactant is a solvent that is substantially nonvolatile within a temperature range up to 100° C. and that volatilizes or thermally decomposes at a temperature lower than thermal decomposition temperatures of the resin particulates.

The third PTFE aqueous dispersion of the disclosure contains a PTFE resin particulate, a depolymerizable acrylic resin particulate, and water, and a nonionic surfactant is present in a void between resin particles.

The nonionic surfactant used may be the same as the nonionic surfactant described for the first PTFE aqueous dispersion of the disclosure. The amount thereof is preferably 4.0% by mass or more, more preferably 5.0% by mass or more, still more preferably 5.5% by mass or more, while preferably 12.0% by mass or less, more preferably 10.0% by mass or less, still more preferably 8.0% by mass or less, further more preferably 7.0% by mass or less, relative to the PTFE.

Too large an amount of the nonionic surfactant may cause too high a viscosity. Too small an amount thereof may cause poor storage stability and poor mechanical stability.

Essential features of the third PTFE aqueous dispersion of the disclosure are that:

(1) supposing that each resin particle is a true sphere, a nonionic surfactant is present in an amount that occupies 75 to 95% of the theoretical porosity between resin particles, which is 26% (hereinafter referred to as occupancy; which is based on the theoretical porosity), when the resin particles are arranged in a close packed structure; and (2) the nonionic surfactant is a solvent that is nonvolatile up to 100° C. and evaporates or thermally decomposes at a temperature lower than the thermal decomposition temperatures of the resin particulates.

The features (1) and (2) mean the following. When the PTFE aqueous dispersion is applied and dried, water evaporates and voids are formed where water is no longer present in the dried coating film. The PTFE aqueous dispersion is prepared in advance such that the nonionic surfactant of the feature (2) occupies 75 to 95% of the voids.

In other words, supposing a system in which no nonionic surfactant is present, water is present between resin particles in the applied PTFE aqueous dispersion at an early stage and, as drying (evaporation of water) progresses, voids develop between the resin particles and mud crack occurs. Such occurrence of mud crack can be prevented even after evaporation of water when a nonionic surfactant is present between the resin particles. The presence of a nonionic surfactant, such as a large amount of a nonionic surfactant, can prevent occurrence of mud crack, but may cause issues such as large shrinkage during baking and significantly poor film formability. The degree of occupation by liquid substance by which mud crack can be effectively prevented is unclear until experiments are repeated.

When a nonionic surfactant having the thermal properties of the feature (2) is present in an aqueous dispersion composition under the conditions of the feature (1), a required amount of the nonionic surfactant is present between resin particles even after water evaporates and the coating film is dried. This nonionic surfactant apparently serves as a binder and can effectively prevent mud crack. Too small an amount of the nonionic surfactant may cause significant movement of resin particles along with evaporation of water, causing a failure in effectively preventing mud crack. Too large an amount thereof may cause large shrinkage when the nonionic surfactant is decomposed and volatilized by heating, resulting in occurrence of crack. The occupancy is preferably 76 to 94%, more preferably 77 to 93%.

The reason of supposing that each resin particle is a true sphere is that each resin particle is commonly not a true sphere even when having a particle shape and that each resin particles need to be true spheres so as to be arranged in a close packed structure. It should be noted that the theoretical porosity of the particles arranged in the close packed structure is 26% regardless of the particle size (occupancy of the resin particles is 74%). Accordingly, the occupancy can be calculated by the following formula.

[Math. 1]

$$\text{Occupancy (\%)} = \frac{\text{Amount of organic liquid (ml)}}{\frac{\text{Volume of resin particles (ml)}}{0.74} \times 0.26} \times 100$$

The volume of the resin particles is calculated from the weight and specific gravity of the resin particles.

The feature (2) defines the thermal properties of the nonionic surfactant. Being "nonvolatile in a temperature range up to 100° C." is necessary because the nonionic surfactant fails to prevent occurrence of mud crack if it evaporates with water. Even a high boiling point solvent is not surely prevented from evaporation in this temperature range. When evaporation occurs, mud crack also occurs. Being "a nonionic surfactant which evaporates or thermally decomposes at a temperature lower than the thermal decomposition temperatures of the resin particulates" is necessary because the nonionic surfactant, if remaining even at a temperature at which the resin is thermally decomposed, inhibits formation of a resin coating film although an object is to form a resin coating film.

It should be noted that the occupancy of the nonionic surfactant is based on the condition after water evaporates. In other words, the condition in which the resin particles are arranged in a close packed structure is not a condition of the aqueous dispersion composition but a condition in which the resin particles move and are closely packed with each other after water evaporates. Thus, when a different nonionic surfactant is present, this different nonionic surfactant may evaporate with water by heating (e.g., during drying). In short, the nonionic surfactant needs to be present in the coating film with the aforementioned occupancy when drying is completed. If the occupancy is not lower than a specific value, a step of baking for volatilizing the nonionic surfactant is included as the final step. For example, in the case of using a fluororesin, large shrinkage occurs along with decomposition and volatilization of organic matter, causing crack.

The resin particulates may have any particle size. This is because the theoretical porosity in the close packed structure does not depend on the type and particle size of the resin but is a constant value of 26%. In the case where particulates of different particle sizes are present in combination, the theoretical porosity is found by first determining the packed structures of the respective particulates and then determining the total amount of the voids. The reason for this lies in that the third PTFE aqueous dispersion of the disclosure, which is a coating material composition, commonly contains two or more particulates mixed with each other and the ratio thereof is not limited. Also, adding a thickening agent as appropriate is common, and thus small particles do not enter the space between large particles.

In short, the nonionic surfactant occupies 75 to 95% of the voids (theoretical voids) between resin particles even when two or more resin particulates are packed in the close packed structure.

The PTFE resin particulate used in the third PTFE aqueous dispersion of the disclosure may be the same as the PTFE (or the aqueous dispersion) in the first PTFE aqueous dispersion of the disclosure. The average particle size thereof is preferably 0.01 to 100 μm, particularly 0.1 to 5 μm. An average particle size of smaller than 0.01 μm tends to cause poor film formability. An average particle size of greater than 100 μm tends to cause clogging of a gun nozzle used for coating. The PTFE may be a TFE homopolymer. Still, it is preferably a modified PTFE containing 99.0% by mass or more of a polymerized unit based on TFE and 1.0% by mass or less of a polymerized unit based on a modifying monomer. The amount of the modifying monomer constituting the modified PTFE is preferably within a range of 0.00001 to 1.0% by mass relative to the PTFE. The lower limit is more preferably 0.0001% by mass, still more preferably 0.001% by mass, further preferably 0.005% by mass, further more preferably 0.010% by mass, still further more preferably 0.05% by mass, particularly preferably 0.10% by mass, most preferably 0.15% by mass. The upper limit is preferably 0.90% by mass, more preferably 0.50% by mass, still more preferably 0.40% by mass, further more preferably 0.30% by mass. When the modified PTFE contains PPVE as a modifying monomer, the lower limit of the amount of the polymerized unit based on PPVE in the modified PTFE is preferably 0.17% by mass. The modified PTFE also still more preferably has a core-shell structure.

An aqueous dispersion of the PTFE resin particulate obtainable by emulsion polymerization or particles in the form of powder obtainable from this aqueous dispersion may be used. Powder may have poor handleability due to electric repulsion of the particles, and therefore preferred is the use in the form of an aqueous dispersion.

The PTFE preferably has a standard specific gravity (SSG) of 2.220 or lower, more preferably 2.190 or lower, while preferably 2.140 or higher, more preferably 2.150 or higher. A SSG of higher than 2.220 tends to cause a brittle coating film. A SSG of lower than 2.140 tends to cause too high a melt viscosity, causing a difficulty in fusion of particles.

As described above, the depolymerizable acrylic resin particulate gradually decomposes while maintaining the binder effect to the PTFE resin particulate when the aqueous dispersion composition is baked after application and drying, and thus prevents shrinkage crack. Accordingly, the depolymerizable acrylic resin particulate needs to melt and to start depolymerization at the melting point of the PTFE resin or lower, to remain at least partially at the melting point of the PTFE resin particulate, and to almost completely decompose and volatilize at the baking temperature.

When the dried coating film is heated, first started are evaporation or decomposition and volatilization of the remaining nonionic surfactant and heat melting of the depolymerizable acrylic resin particulate. The nonionic surfactant needs to remain at least until the depolymerizable acrylic resin particulate is completely heat-melted. As the temperature further rises, evaporation or decomposition of the remaining nonionic surfactant is completed and depolymerization of the heat-melted depolymerizable acrylic resin starts. This depolymerization of the depolymerizable acrylic resin gradually starts from a temperature that is not higher than the melting point of the PTFE resin, but is not yet completed at the temperature (melting point) at which the PTFE resin particulate starts to heat-melt. The depolymerization is completed when the temperature reaches the baking temperature that is higher than the melting point of the PTFE resin. This can prevent remaining of a large amount of the depolymerizable acrylic resin in the resulting PTFE resin coating film. Because the depolymerizable acrylic resin has viscosity during heat melting and depolymerization thereof gradually progresses, no sudden shrinkage occurs even when the PTFE resin particulate is melted and fused, reducing occurrence of thermal shrinkage crack.

Thus, the depolymerizable acrylic resin particulate is preferably a particulate that remains until the temperature (melting point) at which the PTFE resin particulate starts to melt even though depolymerization starts from the melting point of the PTFE resin or lower and that decomposes and volatilizes at the baking (processing) temperature. For example, the depolymerizable acrylic resin particulate preferably remains in an amount of 5% or more, particularly 10% or more and at least 50%, preferably at least 20%, at the melting point of the PTFE resin, remains in an amount of at most 10%, particularly at most 5%, at the baking (processing) temperature (commonly higher than the melting point of the PTFE resin and up to 415° C., preferably 360° C. to 400° C.), and substantially does not remain at completion of baking. From the above, the depolymerization (decomposition) temperature of the depolymerizable acrylic resin particulate is preferably about 200° C. or higher and lower than the baking (processing) temperature of the PTFE resin, particularly the melting point of the PTFE resin or lower. In the case of an acrylic resin particulate that has a depolymerization (thermal decomposition) temperature of higher than the melting point of the PTFE resin and that generates a large amount of decomposition gas, the resulting coating film may easily have coating film defects such as pinholes.

In particular, regardless of the type of the resin, the depolymerizable acrylic resin preferably remains in an amount of about 25 to 50% within a temperature range of 300° C. to 320° C., in an amount of about 20 to 10% in a temperature range of 330° C. to 345° C., in view of balance between the function of preventing shrinkage crack and the function of preventing coloring. Any depolymerizable acrylic resin particulate satisfying these conditions may be used.

With regard to depolymerizability, generally as described in "Polym. Eng. Soi., Vol. 6, p. 273 (1966)", "Plast. Massy., Vol. 75, p. 48 (1971)", and "Deterioration of Polymer Material", Corona Publishing Co., Ltd., p. 144 (1958), C—C bonds and C—H bonds become weaker and the polymer chain is more easily oxidized, decomposed, and depolymerized as the polymer chain contains more branches. Thus, the depolymerizable acrylic resin particulate of the disclosure may be a methacrylate resin, and preferred specific examples thereof include a methacrylate homopolymer or copolymer essentially containing a methacrylate monomer represented by the following formula (9):

$$CH_2{=}C(CH_3)COOR \quad (9)$$

(wherein R is a C1-C5 alkyl group or hydroxyalkyl group). Preferred specific examples of the methacrylate monomer include methyl methacrylate, ethyl methacrylate, propyl methacrylate, dimethylpropyl methacrylate, butyl methacrylate, and pentyl methacrylate. Because of a low glass transition temperature and good depolymerizability (decomposability), preferred among these is a depolymerizable acrylic resin containing butyl methacrylate as a monomer.

A homopolymer may cause no issue when a stable emulsion is formed. Still, in order to stabilize the emulsion, a monomer having a carboxyl group or a hydroxy group may be appropriately used as a comonomer.

The depolymerizable acrylic resin particulate used may be a fine particulate (depolymerizable acrylic resin emulsion) as it is produced by a method such as emulsion polymerization. The average particle size thereof is preferably 0.1 to 100 μm, particularly 0.2 to 1 μm. A particulate having an average particle size of smaller than 0.1 μm tends to cause mud crack. A particulate having an average particle size of 100 μm tends to cause difficulty in application.

The amount of the depolymerizable acrylic resin particulate is 5 to 25 parts, preferably 7 to 20 parts, particularly preferably 10 to 15 parts, relative to 100 parts of the PTFE resin particulate (solid content). Less than 5 parts thereof may cause a difficulty in forming a film of the PTFE resin, while more than 25 parts thereof may cause coloring of a coating film.

The depolymerizable acrylic resin particulate is preferably mixed with other components in the form of emulsion.

Elastomers in the form of particles are also included in the scope of the disclosure similarly to the resin particulates.

The particle size is selected from a wide range. For the use of common coating, the particle size is appropriately within a range of 0.1 to 10 μm. One or two or more of resin particulates within this range are used.

In addition to the PTFE resin particulate and the depolymerizable acrylic resin, examples of particulates to be used include particulates of acrylic resins such as butyl methacrylate urethane emulsion; polyurethane resins such as urethane emulsion; polyester resins such as polyester emulsion; polyolefin resins such as polyethylene emulsion; and PPS, PAI, PES, and PEEK.

In the disclosure, in addition to the nonionic surfactant, a different liquid organic compound containing a hydrophilic group may also be used together in order to achieve affinity to water and dispersion stability of the aqueous dispersion composition. The organic compound containing a hydrophilic group is preferably a high boiling point polyhydric alcohol.

The high boiling point polyhydric alcohol is preferably a nitrogen-free polyhydric alcohol because it causes less coloring by thermal decomposition during baking. The number of hydroxy groups is preferably 2 or 3. Many of those having four or more hydroxy groups are solid at room temperature.

Preferred examples of the polyhydric alcohol include one or two or more of ethylene glycol (boiling point: 198° C.), 1,2-propanediol (188° C.), 1,3-propanediol (214° C.), 1,2-butanediol (190° C.), 1,3-butanediol (208° C.), 1,4-butanediol (229° C.), 1,5-pentanediol (242° C.), 2-butene-1,4-diol (235° C.), glycerol (290° C.), 2-ethyl-2-hydroxymethyl-1,3-propanediol (295° C.), and 1,2,6-hexanetriol (178° C./5 mmHg).

If necessary, an organic solvent other than the high boiling point polyhydric alcohol may be used together within a range where the effects of the disclosure are not impaired. Examples of this organic solvent include aromatic hydrocarbon solvents such as toluene and xylene, and C9-C11 aliphatic hydrocarbon solvents.

The polyhydric alcohol is combined in an amount of 5 to 18 parts, preferably 7 to 15 parts, particularly preferably 7 to 12 parts, relative to 100 parts of the PTFE resin particulate (solid content). Less than 5 parts thereof may cause a weak effect of preventing mud crack, while more than 18 parts thereof may cause a clouded coating film.

Water is used as a liquid medium of the third PTFE aqueous dispersion of the disclosure and adjusts the solid concentration of the aqueous dispersion. Water may be used alone, or an aqueous solvent mixture may be used in which water is used in combination with a water-soluble compound.

In the disclosure, a different additive such as inorganic material may be further compounded, if necessary.

Examples of inorganic material include a pigment, as well as mica particles, mica particles coated with a pigment, metal flakes, and inorganic filler of two or more of these. These may be compounded in an amount within the range that does not impair the effects of the disclosure.

Examples of the pigment used include various conventionally known pigments, such as titanium oxide, carbon black, and colcothar.

The inorganic filler is a substance that imparts a function of improving the abrasion resistance. In order to give beautiful appearance, mica is preferred. The mica particles have a particle size of 10 to 100 μm, preferably 15 to 50 μm. A particle size of smaller than 10 μm tends to cause poor abrasion resistance and poor luster. A particle size of greater than 100 μm tends to cause poor non-stickiness. The mica particles coated with a pigment is obtainable by attaching a pigment such as $Tio_2 \cdot Fe_2O_3$ to the mica particles by sintering deposition, for example. Examples of the metal flakes include flakes of titanium, zirconium, aluminum, zinc, antimony, tin, iron, and nickel. In terms of rust resistance, preferred are titanium and zirconium. The size thereof used may be a size within the range for common coating material.

Other various known additives may be compounded as long as the effects of the third aqueous dispersion of the disclosure are not impaired. Examples thereof include an antifoam, a desiccant, a thickening agent, a leveling agent, and an anti-crawling agent.

Examples of the antifoam include nonpolar solvents such as toluene, xylene, and a C9-C11 hydrocarbon, and silicone oil.

An example of the desiccant is cobalt oxide.

Examples of the thickening agent include methyl cellulose, polyvinyl alcohol, and a carboxylated vinyl polymer.

The third PTFE aqueous dispersion of the disclosure preferably has a viscosity at 55° C. of 50 mPa·s or lower. The third PTFE aqueous dispersion of the disclosure having a viscosity at 55° C. of 50 mPa·s or lower is particularly suitable for use at high temperature such as used in the field of impregnation into a fibrous substrate. Impregnation includes baking and therefore easily causes a high temperature environment. Still, the second PTFE aqueous dispersion of the disclosure exhibits good permeability into a fibrous substrate even in a high temperature environment and thus can uniformly impregnate thereinto. The viscosity at 55° C. is more preferably 45 mPa·s or lower, still more preferably 40 mPa·s or lower, further more preferably 35 mPa·s or lower. The lower limit of the viscosity at 55° C. may be, but is not limited to, 10 mPa·s or higher, for example.

The third PTFE aqueous dispersion of the disclosure preferably has a ratio (viscosity at 55° C.)/(viscosity at 25° C.) of 4.00 or lower. The second PTFE aqueous dispersion of the disclosure is particularly suitable for use in impregnation into a fibrous substrate. Impregnation includes baking and therefore easily causes a high temperature environment. The amount of PTFE sticking to the fibrous substrate during impregnation is easily influenced by the viscosity of the aqueous dispersion, which generates a demand for an aqueous dispersion having a low viscosity-temperature dependence. The first PTFE aqueous dispersion of the disclosure, the above ratio of which is 4.00 or lower, is excellent in that it has a low viscosity-temperature dependence and has stable quality.

From this viewpoint, the ratio (viscosity at 55° C.)/(viscosity at 25° C.) is more preferably 3.00 or lower, still more preferably 2.00 or lower, further more preferably 1.50 or lower, still further more preferably 1.20 or lower, particularly preferably 1.10 or lower, more particularly preferably 1.00 or lower.

The viscosity at 25° C. is a value measured using a B-type rotational viscometer under the conditions described in Examples later. The viscosity at 55° C. is a value obtained by increasing the liquid temperature up to 55° C., maintaining the liquid for 60 minutes, and then performing the measurement under the same conditions as for the measurement at 25° C. In the case of 80 mPa·s or higher, a viscosity-increasing phenomenon occurs over time in the viscosity measurement. Thus, the viscosity is measured after 5 minutes and 10 minutes from the start of measurement and the average thereof is used.

The third PTFE aqueous dispersion of the disclosure preferably has a viscosity-temperature transition (VTT) of higher than 55° C., more preferably 60° C. or higher. A viscosity-temperature transition of higher than 55° C. means a technical significance of eliminating the need for changing the processing conditions between 25° C. and 55° C.

VTT indicates the viscosity-temperature dependence of the PTFE aqueous dispersion. VTT is obtainable by increasing the PTFE aqueous dispersion up to 25° C., 35° C., 45° C., and 55° C., maintaining the PTFE aqueous dispersion at the respective temperatures for 60 minutes, and then performing the measurement using a B-type rotational viscometer under the conditions described in Examples later. The VTT point is a temperature at which the viscosity again reaches the same value as obtained in the measurement at 25° C. In the case of 80 mPa·s or higher, a viscosity-increasing phenomenon occurs over time in the viscosity measurement. Thus, the viscosity is measured after 5 minutes and 10 minutes from the start of measurement and the average thereof is used.

The PTFE in the third PTFE aqueous dispersion of the disclosure preferably has a solid concentration of 50 to 70% by mass. The solid concentration is more preferably 55% by mass or more, still more preferably 57% by mass or more, while more preferably 65% by mass or less, still more preferably 60% by mass or less. Even though the PTFE has a solid concentration within the above range, the third aqueous dispersion of the disclosure is able to have a viscosity at 55° C. of 50 mPa·s or lower.

The third PTFE aqueous dispersion of the disclosure is preferably substantially free from a fluorine-containing surfactant. For the composition of the disclosure, "substantially free from a fluorine-containing surfactant" means that the fluorine-containing surfactant amounts to 1.0 ppm or less relative to the PTFE aqueous dispersion.

Even though the third PTFE aqueous dispersion of the disclosure is substantially free from a fluorine-containing surfactant, it can have low viscosity at high temperature and can have excellent mechanical stability at high temperature.

The amount of the fluorine-containing surfactant is preferably 700 ppb or less, more preferably 600 ppb or less, still more preferably 500 ppb or less.

The amount of the fluorine-containing surfactant in the third PTFE aqueous dispersion of the disclosure can be determined by the same method as that described for the first PTFE aqueous dispersion of the disclosure.

In the case where the third PTFE aqueous dispersion of the disclosure is obtained by polymerization using a fluorine-containing surfactant, the amount of the fluorine-containing surfactant can be adjusted to the above range by adding a nonionic surfactant to the PTFE aqueous dispersion immediately after polymerization and then concentrating the mixture, for example. Examples of the fluorine-containing surfactant include the fluorine-containing anion surfactants described for the first PTFE aqueous dispersion of the disclosure.

The third PTFE aqueous dispersion of the disclosure can be prepared by the method described for the first PTFE aqueous dispersion of the disclosure.

The third PTFE aqueous dispersion of the disclosure is useful for coating, such as for a coating material, particularly a top coat coating material. Coating may be performed by a variety of coating methods as in conventional cases. Examples thereof include dipping, spraying, roll coating, doctor blade coating, and flow coating.

The third PTFE aqueous dispersion of the disclosure may be applied directly to a substrate. In order to improve the adhesion, preferably, a primer layer is provided and a coating film is formed thereon as a top coat layer. Examples of the substrate used include, but are not limited to, a variety of metal, enamel, glass, and a variety of ceramic. In order to improve the adhesion, the surface is preferably roughened by sandblasting, for example.

The composition applied to the substrate is then dried. The third PTFE aqueous dispersion of the disclosure is characterized in that mud crack does not occur at this drying stage. Drying is performed under common conditions. For example, drying at room temperature to 80° C., preferably 80° C. to 100° C., for 5 minutes to 1 hour can lead to set-to-touch.

In the case of a baking coating material, such as a fluororesin coating material, the dried coating film is baked (processed). The depolymerizable acrylic resin, when compounded, serves as a binder until the fluororesin particulate is melted and fused. This can prevent occurrence of crack due to thermal shrinkage at this baking stage. The baking (processing) temperature and duration depend on, for example, the type and melting point of the PTFE resin, and are the melting point of the PTFE resin or higher, commonly 360° C. to 415° C. and 5 to 30 minutes, preferably 360° C. to 380° C. for 10 to 30 minutes.

In the case of providing a primer layer, the primer layer may be provided by a method in which a primer layer is first applied, dried and baked and the composition of the disclosure is then applied, dried, and baked (2 coating 2 baking method), or by a method in which a primer layer is first applied and dried, the composition of the disclosure is then applied and dried, and finally both are baked simultaneously (2 coating 1 baking method).

For the third PTFE aqueous dispersion of the disclosure, a single coating can provide a thick coating film with a melted coating film thickness of 30 μm or greater. The upper limit is, although not limited to, 100 μm or smaller because too thick a coating film may cause a variety of decomposition residues to remain in the coating film, which may be a cause of coloring.

The third PTFE aqueous dispersion of the disclosure is most useful for coating of metal cooking utensils, particularly frying pans, for example. The composition may be used for coating other products which require corrosion resistance. Examples of other products include bearings, valves, electric wires, metal foil, boilers, pipes, ship bottoms, oven linings, bottom plates of irons, bread pans, rice cookers, electric skillets, electric kettles, ice cube trays, snow plow shovels, spades, chutes, conveyers, rolls, metal dies, tools such as dies, saws, files, and drills, kitchen knives, scissors, hoppers, other industrial containers (particularly for the semiconductor industry) and casting molds.

The disclosure also relates to a coated article including a coating film obtained by applying the second PTFE aqueous dispersion of the disclosure. The coating film can be produced by a conventionally known method and is obtainable by applying the aqueous dispersion of the disclosure to a substrate. The substrate may be formed from any material. Examples thereof include metals such as simple metal, e.g. iron, aluminum, stainless steel, and copper, and alloys of any of these; and nonmetal inorganic materials such as enamel, glass, and ceramic. An example of alloys is stainless steel. The material of the substrate is preferably a metal, more preferably aluminum or stainless steel.

The coating film preferably has a thickness of 30 μm or greater. Too thick a coating film may cause a variety of decomposition residues to remain in the coating film, which may be a cause of coloring. Thus, the thickness is preferably 100 μm or smaller.

The coated article may include a primer layer.

Examples of the use of the coated article include metal cooking utensils (particularly frying pans), bearings, valves, electric wires, metal foil, boilers, pipes, ship bottoms, oven linings, bottom plates of irons, bread pans, rice cookers, electric skillets, electric kettles, ice cube trays, snow plow shovels, spades, chutes, conveyers, rolls, metal dies, tools such as dies, saws, files, and drills, kitchen knives, scissors, hoppers, other industrial containers (particularly for the semiconductor industry) and casting molds.

The disclosure provides a PTFE aqueous dispersion containing PTFE and a nonionic surfactant, having a PTFE solid concentration of 50 to 70% by mass, being substantially free from a fluorine-containing surfactant, and having a viscosity at 55° C. of 50 mPa·s or lower.

The fluorine-containing surfactant preferably amounts to 100 ppb or more and 1.0 ppm or less.

The aqueous dispersion of the disclosure preferably has a ratio (viscosity at 55° C.)/(viscosity at 25° C.) of 4.00 or lower.

The nonionic surfactant is preferably contained in an amount of 4% by mass or more and 12% by mass or less relative to the PTFE.

The aqueous dispersion of the disclosure preferably has a stability retention time at 60° C. of 30 minutes or longer.

The aqueous dispersion of the disclosure also preferably has a stability retention time at 60° C. of 40 minutes or longer.

The nonionic surfactant preferably contains a compound represented by the following formula (i):

$$R^3\text{—O-}A^1\text{-H} \qquad \text{(i)}$$

wherein $R^3$ is a C8-C18 alkyl group; and $A^1$ is a polyoxyalkylene chain including an oxyethylene unit or an oxypropylene unit.

$R^3$ is preferably an alkyl group represented by the following formula (i-1):

$$CHR^{31}R^{32}\text{, —} \qquad \text{(i-1)}$$

wherein $R^{31}$ is a hydrogen atom or a C1-C16 alkyl group; $R^{32}$ is a C1-C17 alkyl group; and $R^{31}$ and $R^{32}$ have a total carbon number of 7 to 17.

$R^3$ is preferably a C8-C18 alkyl group having an average number of methyl groups of 2.0 or more.

In the formula (i), $R^3$ is preferably a 2,6,8-trimethyl-4-nonyl group.

In the formula (i), $A^1$ is preferably a polyoxyethylene chain having an average number of oxyethylene units of 10.1 to 10.8.

The nonionic surfactant preferably has a HLB value of 14.00 or higher.

The nonionic surfactant is preferably a mixture of compounds represented by the formula (i) with $A^1$s having different average numbers of oxyethylene units.

The nonionic surfactant is preferably a mixture of a compound represented by the formula (i) wherein $R^3$ is a 2,6,8-trimethyl-4-nonyl group and $A^1$ is a polyoxyethylene chain having an average number of oxyethylene units of 7.0 to 9.0 and a compound represented by the formula (i) wherein $R^3$ is a 2,6,8-trimethyl-4-nonyl group and $A^1$ is a polyoxyethylene chain having an average number of oxyethylene units of 10.0 to 12.0.

Preferably, the nonionic surfactant is a mixture of a compound (first component) represented by the formula (i) wherein $R^3$ is a 2,6,8-trimethyl-4-nonyl group and $A^1$ is a polyoxyethylene chain having an average number of oxyethylene units of 7.0 to 9.0 and a compound (second component) represented by the formula (i) wherein $R^3$ is a 2,6,8-trimethyl-4-nonyl group and $A^1$ is a polyoxyethylene chain having an average number of oxyethylene units of 10.0 to 12.0, and the first component is contained in an amount of 5% by mass or more and 25% by mass or less and the second component is contained in an amount of 75% by mass or more and 95% by mass or less.

The disclosure also provides a method for producing a PTFE aqueous dispersion, the method including:

a step A of emulsion-polymerizing TFE in the presence of a fluorine-containing anion surfactant and providing a dispersion containing PTFE;

a step B of adding a nonionic surfactant (1) to the dispersion obtained in the step A;

a step C of removing the fluorine-containing anion surfactant from the dispersion obtained in the step B and then condensing the dispersion, or of condensing the dispersion obtained in the step B and then removing the fluorine-containing anion surfactant; and a step D of adding a nonionic surfactant (2) and a fluorine-free anion surfactant to the dispersion obtained in the step C.

The step A is preferably a step of polymerizing TFE and at least one monomer selected from the group consisting of a perfluoro(alkyl vinyl ether) (hereinafter, referred to as "PAVE"), a (perfluoroalkyl)ethylene, and a cyclic monomer.

Preferably, the step A is a step of providing a dispersion of modified polytetrafluoroethylene having a core-shell structure, and includes:

a step A-1 of polymerizing TFE and at least one modifying monomer selected from the group consisting of a perfluoro(alkyl vinyl ether), a (perfluoroalkyl)ethylene, and a cyclic monomer and forming the core; and a step A-2 of polymerizing, in addition to the TFE and the modifying monomer, at least one selected from the group consisting of hexafluoropropylene and a chain transfer agent and forming the shell.

The nonionic surfactant (1) is preferably a compound represented by the following formula (1):

$$R^4\text{—O-}A^2\text{-H} \quad (1)$$

wherein $R^4$ is a C8-C18 linear or branched primary or secondary alkyl group having an average number of methyl groups per molecule of 4.0 or more; and $A^2$ is a polyoxyalkylene chain having an average number of oxyethylene units of 7.0 to 12.0 and an average number of oxypropylene units of 0.0 to 2.0.

In the formula (1), $R^4$ is preferably a 2,6,8-trimethyl-4-nonyl group.

The nonionic surfactant (2) is preferably a compound represented by the following formula (2):

$$R^5\text{—O-}A^3\text{-H} \quad (2)$$

wherein $R^5$ is a C8-C18 linear or branched primary or secondary alkyl group having an average number of methyl groups per molecule of 4.0 or more; and $A^3$ is a polyoxyalkylene chain having an average number of oxyethylene units of 10.0 to 12.0.

In the formula (2), $R^5$ is preferably a 2,6,8-trimethyl-4-nonyl group.

The step D is preferably a step of adding the nonionic surfactant (2) and thereby allowing the dispersion to have a concentration of the nonionic surfactants of 4% by mass or more and 12% by mass or less relative to the PTFE.

The nonionic surfactants in the PTFE aqueous dispersion preferably have a cloud point of 60° C. to 80° C.

The nonionic surfactants in the PTFE aqueous dispersion preferably have a HLB value of 14.00 or higher.

The removing the fluorine-containing anion surfactant in the step C is preferably performed by bringing the aqueous dispersion into contact with an anion exchange resin.

The fluorine-containing anion surfactant in the PTFE aqueous dispersion preferably amounts to 1.0 ppm or less relative to the aqueous dispersion.

The fluorine-containing anion surfactant is preferably a fluorine-containing anion surfactant having a LogPOW value of 3.5 or lower.

The fluorine-containing anion surfactant is preferably a fluorine-containing anion surfactant having a LogPOW value of 3.4 or lower.

The fluorine-free anion surfactant preferably includes at least one selected from the group consisting of an alkyl sulfate and a salt thereof and a fatty acid and a salt thereof.

The fluorine-free anion surfactant in the PTFE aqueous dispersion preferably amounts to 50 to 5000 ppm relative to the PTFE.

The production method of the disclosure preferably further includes a step of adding a preservative to the aqueous dispersion.

The preservative is preferably an organic iodine compound or an organic nitrogen-sulfur compound.

The production method of the disclosure preferably further includes a step of adding a coating material ingredient.

The disclosure also provides a PTFE aqueous dispersion obtained by the above production method.

The aqueous dispersion of the disclosure is preferably an aqueous coating material.

The disclosure also provides a coating film obtained by applying the above aqueous dispersion.

The disclosure also provides an impregnated film obtained by impregnating the above aqueous dispersion.

The disclosure also provides a polytetrafluoroethylene aqueous dispersion containing:

(A) a polytetrafluoroethylene resin particulate;

(B) a high boiling point polyhydric alcohol containing no nitrogen atom, having a boiling point of 100° C. or higher, and containing two or more hydroxy groups;

(C) a depolymerizable acrylic resin particulate having a decomposing and vaporizing temperature within a temperature range up to a decomposition temperature of the PTFE resin;

(D) a nonionic surfactant; and (E) an aqueous medium, the high boiling point polyhydric alcohol (B) and the depolymerizable acrylic resin particulate (C) being contained respectively in an amount of 5 to 18 parts by mass and in an amount of 5 to 25 parts by mass relative to 100 parts by mass of the polytetrafluoroethylene (A), the polytetrafluoroethylene aqueous dispersion containing neither an oxidizing agent nor an amine-type solvent.

The disclosure also provides a polytetrafluoroethylene aqueous dispersion containing:

a polytetrafluoroethylene resin particulate;

a depolymerizable acrylic resin particulate; and water, wherein supposing that primary average particles of the respective resin particulates are replaced by true spheres of a same volume, a nonionic surfactant is present in an amount that occupies 75 to 95% of a theoretical porosity, which is 26%, between the resin particulates when the resin particulates are arranged in a close packed structure, and the nonionic surfactant is a solvent that is substantially nonvolatile within a temperature range up to 100° C. and that volatilizes or thermally decomposes at a temperature lower than thermal decomposition temperatures of the resin particulates.

The disclosure also provides a coated article including a coating film obtained by applying the above polytetrafluoroethylene aqueous dispersion.

The coated article preferably includes at least one selected from the group consisting of a metal cooking utensil, a bearing, a valve, an electric wire, metal foil, a boiler, a pipe, a ship bottom, an oven lining, a bottom plate of an iron, a bread pan, a rice cooker, an electric skillet, an electric kettle, an ice cube tray, a snow plow shovel, a spade, a tool, a kitchen knife, scissors, a hopper, an industrial container, and a casting mold.

EXAMPLES

The disclosure is described hereinbelow with reference to examples, but the disclosure is not limited to these examples.

The parameters in the examples were determined by the following methods.

(1) Average Primary Particle Size

The PTFE aqueous dispersion was diluted with water to a solid concentration of 0.15% by mass. First, the transmittance of 550-nm light relative to the unit length of the resulting diluted aqueous dispersion was measured. The Feret diameters in a photograph by a transmission electron microscope (TEM) were then measured and the number-based length average primary particle size was determined therefrom. A calibration curve was obtained from these values. Using this calibration curve, the average primary particle size was determined from the measured transmittance of 550-nm light incident on each sample.

(2) Solid Concentration (P)

About 1 g (X g) of a sample was put into a 5-cm-diameter aluminum cup and dried at 110° C. for 30 minutes, then dried at 300° C. for 30 minutes. Based on the heating residue (Z g), the solid concentration was determined by the formula: P=Z/X×100 (% by mass).

(3) Standard Specific Gravity (SSG)

The SSG was measured by the water displacement method in conformity with ASTM D792 using a sample molded in conformity with ASTM D4895-89.

(4) Amounts of Modifying Monomers

PTFE powder was press-molded into a thin-film disc and the thin-film disc was subjected to FT-IR measurement, so that infrared absorbances were obtained. The amount of HFP was determined by multiplying the ratio (absorbance at 982 $cm^{-1}$)/(absorbance at 935 $cm^{-1}$) by 0.3.

PTFE powder was press-molded into a thin-film disc and the thin-film disc was subjected to FT-IR measurement, so that infrared absorbances were obtained. The amount of PPVE was determined by multiplying the ratio (absorbance at 995 $cm^{-1}$/(absorbance at 935 $cm^{-1}$) by 0.14.

(5) Concentration of Fluorine-Containing Surfactant

The solid content of the aqueous dispersion was measured and the aqueous dispersion in an amount corresponding to 1.5 g of the PTFE solid content was weighed in a 100-mL screw tube bottle. Water and methanol were added thereto such that the extraction solvent amounted to 37 g containing water/methanol=10/90% by mass in combination with the water contained in the aqueous dispersion. The tube was shaken until coagulation. The liquid phase was extracted and centrifuged at 4000 rpm for one hour, whereby a supernatant was extracted.

The fluorine-containing surfactant in the extract was subjected to measurement using a liquid chromatograph-mass spectrometer (LC-MS ACQUITY UPLC/TOD, available from Waters). The structure of the measurement device and the LC-MS measurement conditions are shown in Table 1.

TABLE 1

| | | |
|---|---|---|
| LC section | | |
| Device | Acquily UPLC, Waters | |
| Column | Acquily UPLC BEH G18 1.7 mm (2.1 × 50 mm), Waters | |
| Mobile phase | A $CH_8CN$ | |
| | B 20 mM $CH_3COONH_4/H_2O$ | |
| | 0 to 15 min | AB = 10:90 |
| | 1.5 to 8.5 min | AB = 10:90 to A:B = 90:10 |
| | 8.5 to 0 min | Linear gradient |
| | 0.4 mL/min | AB = 90:10 |
| Flow rate | | |
| Column temp. | 40° C. | |
| Amount of sample | 5 µL | |
| MS section | | |
| Device | TQ Delecter | |
| Measurement mode | Multiple Reaction Monitoring (MRM) | |
| | Electrospray ionization | |
| lonization mode | Negative | |

The calibration curve used for calculating the concentration of the fluorine-containing surfactant was determined under the following conditions.

Five levels of a standard solution of a fluorine-containing surfactant having a known concentration of 1 ng/ml to 100 ng/mL in methanol were prepared and subjected to measurement using a liquid chromatograph-mass spectrometer (LC-MS ACQUITY UPLC/TOD, available from Waters).

First approximation was performed based on the sample concentration and the peak integral value, and the values a and b were determined by the following relational formula (3).

$$A=a\times X+b \quad (3)$$

A: peak area of fluorine-containing surfactant

X: concentration (ng/ml) of fluorine-containing surfactant

The lower limit of quantification is 100 ppb.

(6) Amount (N) of Nonionic Surfactant

About 1 g (X g) of a sample was put into a 5-cm-diameter aluminum cup and heated at 110° C. for 30 minutes, whereby a heating residue (Y g) was obtained. The resulting heating residue (Y g) was further heated at 300° C. for 30 minutes, whereby a heating residue (Z g) was obtained. These heating residues were used for calculation by the formula: $N=[(Y-Z)/X]\times 100$ (% by mass). The amount of the stabilizer was subtracted from the calculated amount. The resulting amount was taken as the amount of the nonionic surfactant. The stabilizer was calculated based on the amount added during preparation.

(7) Mechanical Stability

A plastic cup having a diameter of 67 mm and an inner capacity of 300 mL was charged with 100 g of the PTFE aqueous dispersion. This cup was immersed in a water tank at 60° C. A stirring blade having a diameter of 50 mm (FIG. 1(*a*)) was set such that the height from the bottom of the plastic cup to the center of the stirring blade (the position 6 mm from the lower end of the stirring blade in the axial direction of FIG. 1(*b*)) was 20 mm. The stirring blade was rotated at 3000 rpm and the period of time until the PTFE aqueous dispersion coagulated or solidified to scatter was measured as the stability retention time.

(8) Viscosity

The viscosity at 25° C. was measured using a B-type rotational viscometer (rotor No. 2, available from Toki Sangyo Co., Ltd.) at a number of rotations of 60 rpm for a measurement time of 120 seconds. The viscosity at 55° C. was measured by increasing the liquid temperature up to 55° C., maintaining the liquid for 60 minutes, and then performing the measurement under the same conditions as for the measurement at 25° C. In the case of 80 mPa·s or higher, a viscosity-increasing phenomenon occurs over time in the viscosity measurement. Thus, the viscosity was measured after 5 minutes and 10 minutes from the start of measurement and the average thereof was used.

(9) pH

The pH at 25° C. was measured using a glass electrode (available from Horiba, Ltd.) in conformity with JIS K6893.

(10) Viscosity-Temperature Transition (VTT)

VTT was obtained by increasing the PTFE aqueous dispersion up to 25° C., 35° C., 45° C., and 55° C., maintaining the PTFE aqueous dispersion at the respective temperatures for 60 minutes, and then measuring the viscosity using a B-type rotational viscometer (rotor No. 2, available from Toki Sangyo Co., Ltd.) at a number of rotations of 60 rpm for a measurement time of 120 seconds. The VTT point is a temperature at which the viscosity again reaches the same value as obtained in the measurement at 25° C. In the case of 80 mPa·s or higher, a viscosity-increasing phenomenon occurs over time in the viscosity measurement. Thus, the viscosity was measured after 5 minutes and 10 minutes from the start of measurement and the average thereof was used.

(11) Average Number of Methyl Groups Per Molecule

The PTFE aqueous dispersion was combined with an equivalent amount of methanol and subjected to Soxhlet extraction. The extract was then subjected to 1H-NMR measurement, whereby the average number of methyl groups per molecule was obtained.

(12) Extrusion Pressure at Reduction Ratio of 1500

To 100 parts by mass (60 g) of the PTFE powder was added 20.5 parts by mass (12.3 g) of hydrocarbon oil (trade name: Isopar G, available from Exxon Chemical Co.) as an extrusion aid. The mixture was aged at room temperature (25±1° C.) for one hour and was paste-extrusion-molded using an extrusion die (reduction ratio 1500) equipped with a cylinder having an inner diameter of 25.4 mm. In a late stage of extrusion, the pressure at a position at which the pressure was in an equilibrium state was divided by the cross-sectional area of the cylinder and the resulting value was taken as the extrusion pressure at a reduction ratio of 1500.

The average molecular structures of the surfactants used in the examples and comparative examples are shown below.

Surfactant (a): Tergitol TMN-100X, $C_{12}H_{25}O(CH_2CH_2O)_{10}H$ (average number of methyl groups per molecule 5.0), HLB 14.00, cloud point 65° C.

Surfactant (b): Tergitol TMN-10, $C_{12}H_{25}O(CH_2CH_2O)_{11}H$ (average number of methyl groups per molecule 5.0), HLB 14.40, cloud point 76° C.

Tergitol TMN-100X is a mixture of Tergitol TMN-6 and Tergitol TMN-10, and the composition ratio is as follows. TMN-6: TMN-10=30:70 (ratio by weight)

Structural formula of TMN-6: $C_{12}H_{25}O(CH_2CH_2O)_8H$ (average number of methyl groups per molecule 5.0), HLB 13.10, cloud point 36° C.

Surfactant (c): $C_{13}H_{27}O(CH_2CH_2O)_8H$ (average number of methyl groups per molecule 4.0), HLB 13.30, cloud point 60° C.

Surfactant (d): $C_{13}H_{27}O(CH_2CH_2O)_{10}H$ (average number of methyl groups per molecule 4.0), HLB 13.80, cloud point 71° C.

Synthesis Example 1

A 1-L autoclave was purged with nitrogen, charged with 16.5 g of dehydrated tetramethylurea and 220 g of diethylene glycol dimethyl ether, and cooled. Thereto were fed 38.5 g of carbonyl fluoride, then 100 g of hexafluoropropylene oxide. The contents were stirred, and 38.5 g of carbonyl fluoride and 100 g of hexafluoropropylene oxide were additionally fed thereto. The same amounts of carbonyl fluoride and hexafluoropropylene oxide were fed thereto. As the reaction was completed, the reaction mixture liquid was taken, subjected to liquid separation, and a reaction product was obtained in the lower layer.

A 6-L autoclave was charged with 1000 mL of tetraglyme and CsF (75 g), and then purged with nitrogen. The autoclave was cooled and 2100 g of the reaction product obtained above was fed thereto. Hexafluoropropylene oxide was introduced into the autoclave, whereby the reaction was initiated. Eventually, 1510 g of hexafluoropropylene oxide was fed. The contents were then taken and separated into an upper layer and a lower layer using a separating funnel. The upper layer weighed 1320 g and the lower layer weighed 3290 g. The lower layer was rectified.

Next, 1000 g of a product obtained by rectifying the lower layer was combined with 1000 g of pure water for hydrolysis. The product was subjected to liquid separation using a separating funnel and an organic layer (lower layer) was collected. The collected organic layer (lower layer) was washed with sulfuric acid water. The washed organic layer was simply distilled, whereby a distillate was obtained.

Further, 76 g of a 28% by weight ammonia aqueous solution and 600 g of pure water were mixed to provide an aqueous solution. Thereto was added dropwise 500 g of the distillate obtained above. As the dropwise addition was completed, a 28% by weight ammonia aqueous solution was added to adjust the pH to 7. The product was freeze-dried, whereby a white solid was obtained.

Production Example 1

A 6-L-capacity stainless steel reactor equipped with a stirrer was charged with 3540 g of deionized water, 94 g of paraffin wax, and 5.4 g of the white solid obtained in Synthesis Example 1 as a fluorine-containing surfactant. The contents in the reactor were sucked while being heated up to 70° C. and simultaneously the reactor was purged with TFE so that the oxygen therein was removed. The contents were then stirred. Into the reactor was injected 0.78 g of perfluoropropyl vinyl ether (PPVE) using TFE. To the reactor were injected, as initiators, 250.6 mg of disuccinic acid peroxide (DSP) dissolved in 20 g of deionized water and 10.7 mg of ammonium persulfate (APS) dissolved in 20 g of deionized water, whereby the reactor was adjusted to a pressure of 0.90 MPaG. After the initiator was injected, the pressure dropped and start of polymerization was observed. TFE was added to the reactor to maintain the pressure at a constant value of 0.90 MPaG. At the timing when TFE consumed in the reaction reached 1380 g, 1.0 g of methanol was injected into the reactor and the reaction was allowed to continue. At the timing when TFE consumed in the reaction reached 1534 g, TFE feeding was stopped and stirring was stopped so that the reaction was finished. The air inside the reactor was discharged until the pressure reached normal pressure. The contents were taken from the reactor and cooled. The paraffin wax was removed, whereby a PTFE aqueous dispersion 1-1 was obtained.

The resulting aqueous dispersion 1-1 had a solid concentration of 30.0% by mass and an average primary particle size of 254 nm. The resulting PTFE aqueous dispersion 1-1 was diluted with deionized water to a solid concentration of about 13% by mass and coagulated under rapid stirring conditions. The coagulated wet powder was dried at 150° C. for 18 hours, whereby a PTFE powder was obtained. The resulting PTFE powder had a standard specific gravity of 2.174 and a PPVE content of 0.046% by mass. The extrusion pressure at a reduction ratio of 1500 was 42.1 MPa.

The aqueous dispersion 1-1 was combined with the surfactant (a) as a nonionic surfactant. Thereby, a dispersion was prepared in which the nonionic surfactant concentration was 10 parts by mass relative to 100 parts by mass of the PTFE. Then, a column having a diameter of 20 mm was charged with 250 mL of OH anion exchange resin (trade name: AMBERJET AMJ 4002, available from Rohm and Haas Co.) and the dispersion was passed therethrough at SV=1. The aqueous dispersion obtained by passing was combined with the surfactant (a) such that the amount was 20 parts by mass relative to 100 parts by mass of the PTFE. The mixture was maintained at 65° C. for three hours and separated into a supernatant phase and a condensed phase. The condensed phase was collected, whereby a PTFE aqueous dispersion 1-2 was obtained.

The resulting PTFE aqueous dispersion 1-2 had a solid concentration of 71.5% by mass, a nonionic surfactant content of 2.7% by mass relative to the PTFE, and a fluorine-containing surfactant concentration of 480 ppb relative to the PTFE aqueous dispersion.

Production Example 2

A PTFE aqueous dispersion 2-1 was obtained by polymerization in conformity with Example 2 of WO 2015/116754, except that $CF_3OCF_2CF_2CF_2OCHFCF_2COOH$ was changed to the white solid obtained in Synthesis Example 1. The resulting PTFE aqueous dispersion 2-1 had an average primary particle of 250 nm. The resulting PTFE aqueous dispersion 2-1 was diluted with deionized water to a solid concentration of about 10% and coagulated under rapid stirring conditions. The coagulated wet powder was dried at 150° C. for 18 hours, whereby a PTFE powder was obtained. The resulting PTFE powder had a standard specific gravity of 2.205 and an HFP content of 0.010% by mass.

The resulting PTFE aqueous dispersion 2-1 was subjected to ion exchange and condensation as in Production Example 1, whereby a PTFE aqueous dispersion 2-2 was obtained. The resulting PTFE aqueous dispersion 2-2 had a solid concentration of 69.5% by mass and a nonionic surfactant content of 2.9% by mass relative to the PTFE.

Production Example 3

A PTFE aqueous dispersion 3-1 was obtained by polymerization in conformity with Example 1 of WO 2006/127317. The following points were changed.

The fluorine-containing surfactant was changed from 3.24 parts of ammonium perfluorooctanoate to 2.03 parts of the white solid obtained in Synthesis Example 1. No fluorine-containing surfactant was additionally fed during the polymerization.

The timing of adding APS and methanol solution was changed from when the amount of TFE fed reached 88.1 parts to when the amount reached 62.4 parts.

The timing of stopping TFE feeding was changed from when the amount of TFE reached 96.9 parts to when the amount reached 69.4 parts.

The PTFE aqueous dispersion 3-1 had an average primary particle size of 285 nm.

The PTFE aqueous dispersion 3-1 was diluted with deionized water to a solid concentration of about 10% and coagulated under rapid stirring conditions. The coagulated wet powder was dried at 150° C. for 18 hours, whereby a PTFE powder was obtained. The resulting PTFE powder had a standard specific gravity of 2.241.

The resulting PTFE aqueous dispersion 3-1 was subjected to ion exchange and condensation as in Production Example 1, whereby a PTFE aqueous dispersion 3-2 was obtained. The resulting PTFE aqueous dispersion 3-2 had a solid concentration of 70.9% by mass and a nonionic surfactant content of 2.9% by mass relative to the PTFE.

Example 1

The PTFE aqueous dispersion 1-2 obtained in Production Example 1 was combined with the surfactant (a) in an amount of 4.0% by mass relative to the PTFE, then with the surfactant (b) in an amount of 2.0% by mass relative to the PTFE and ammonium lauryl sulfate in an amount of 500 ppm relative to the PTFE, and further with deionized water and ammonia water. The solid concentration (% by mass) of the resulting PTFE aqueous dispersion 1-3 and the amounts (% by mass) of the respective components relative to the PTFE are shown in Table 2.

The PTFE aqueous dispersion 1-3 was subjected to the pH measurement and the viscosity measurement by the aforementioned methods, and then subjected to mechanical stability testing. The results are shown in Table 2. The resulting PTFE aqueous dispersion 1-3 was combined with an equivalent amount of methanol and subjected to Soxhlet extraction. The extract was then subjected to 1H-NMR measurement, whereby the average number of oxyalkylene units was found to be 10.4.

Examples 2 to 7

A PTFE aqueous dispersion was obtained and evaluated as in Example 1 except that the compounds added to the PTFE aqueous dispersion 1-2 were changed as shown in Table 2. The results are shown in Table 2.

Comparative Example 1

The PTFE aqueous dispersion 1-2 obtained in Production Example 1 was combined with the surfactant (a) in an amount of 5.5% by mass relative to the PTFE, then with ammonium lauryl sulfate in an amount of 1000 ppm relative to the PTFE, and further with an acetylene antifoam (trade name: Surfynol 440, available from Air Products and Chemicals, Inc.) as an antifoam in an amount of 0.5% by mass relative to the PTFE. Except for these, a PTFE aqueous dispersion was obtained and evaluated as in Example 1. The results are shown in Table 3.

Comparative Example 2

The PTFE aqueous dispersion 2-2 obtained in Production Example 2 was combined with the surfactant (a) in an amount of 6.0% by mass relative to the PTFE, then with ammonium lauryl sulfate in an amount of 1000 ppm relative to the PTFE, and further with deionized water and ammonia water. Except for these, a PTFE aqueous dispersion was obtained and evaluated as in Example 1. The results are shown in Table 3.

Comparative Example 3

The PTFE aqueous dispersion 3-2 obtained in Production Example 3 was subjected to the same processing as in Comparative Example 2. The results are shown in Table 3.

Comparative Example 4

The PTFE aqueous dispersion 1-2 obtained in Production Example 1 was subjected to the same processing as in Comparative Example 2. The results are shown in Table 3.

TABLE 2

| | | | | Unit | Example 1 | Example 2 | Example 3 | Example 4 | Example 5 | Example 6 | Example 7 |
|---|---|---|---|---|---|---|---|---|---|---|---|
| PTFE | Modifying monomer | | | — | PPVE | PPVE | PPVE | PPVE | PPVE | PPVE | PPVE |
| PTFE aqueous dispersion | Amounts of main components | Nonionic surfactant | (a) | Mass %/PTFE | 4.0 | 4.0 | 3.0 | 5.0 | 4.0 | 4.0 | 4.0 |
| | | | (b) | Mass %/PTFE | 2.0 | 2.0 | 3.0 | 1.0 | 2.0 | 2.0 | 2.0 |
| | | Anion | Ammonium lauryl sulfate | ppm/PTFE | 500 | 250 | 250 | 1000 | — | — | 500 |
| | | | Decanoic acid | ppm/PTFE | — | — | — | — | 500 | 250 | — |
| | | Additive | Deltop NEO | Mass %/PTFE aqueous dispersion | — | — | — | — | — | — | 0.05 |
| | HLB value | | | — | 14.13 | 14.13 | 14.20 | 14.07 | 14.13 | 14.13 | 14.13 |
| | Average number of oxyalkylene units | | | — | 10.4 | 10.4 | 10.6 | 10.3 | 10.4 | 10.4 | 10.4 |
| | Solid concentration | | | Mass % | 58.1 | 58.0 | 58.0 | 58.1 | 58.1 | 58.1 | 58.1 |
| | Amount of nonionic surfactants | | | Mass %/PTFE | 6.0 | 6.0 | 6.0 | 6.0 | 6.0 | 6.0 | 6.0 |
| Physical properties | pH | | | — | 10.3 | 10.4 | 10.4 | 10.2 | 10.0 | 10.2 | 10.3 |
| | Viscosity | 25° C. | | mPa · s | 19.2 | 17.5 | 18.2 | 19.5 | 17.9 | 17.0 | 19.3 |
| | | 55° C. | | mPa · s | 15.2 | 16.0 | 11.9 | 19.2 | 15.3 | 17.0 | 15.0 |
| | | Ratio = (viscosity at 55° C.)/(viscosity at 25° C.) | | — | 0.79 | 0.91 | 0.65 | 0.98 | 0.85 | 1.00 | 0.78 |
| | VTT | | | — | >55° C. | >55° C. | >55° C. | >55° C. | >55° C. | >55° C. | >55° C. |
| Mechanical stability | Stability retention time at 60° C. | | | Min | 63 | 60 | 55 | 68 | 53 | 55 | 60 |

TABLE 3

| | | | | Unit | Comparative Example 1 | Comparative Example 2 | Comparative Example 3 | Comparative Example 4 |
|---|---|---|---|---|---|---|---|---|
| PTFE | Modifying monomer | | | — | PPVE | HFP | — | PPVE |
| PTFE aqueous dispersion | Amounts of main components | Nonionic surfactant | (a) | Mass %/PTFE | 5.5 | 6.0 | 6.0 | 6.0 |
| | | | (b) | Mass %/PTFE | — | — | — | — |
| | | Anion | Ammonium lauryl sulfate | ppm/PTFE | 1000 | 1000 | 1000 | — |
| | | | Decanoic acid | ppm/PTFE | — | — | — | — |
| | | Additive | Surfynol 440 | Mass %/PTFE | 0.5 | — | — | — |
| | HLB value | | | — | 14.00 | 14.00 | 14.00 | 14.00 |
| | Average number of oxyalkylene units | | | — | 10.1 | 10.1 | 10.1 | 10.1 |

TABLE 3-continued

| | | | Unit | Comparative Example 1 | Comparative Example 2 | Comparative Example 3 | Comparative Example 4 |
|---|---|---|---|---|---|---|---|
| Physical properties | | Solid concentration | Mass % | 58.1 | 58.0 | 58.1 | 58.0 |
| | | Amount of nonionic surfactants | Mass %/PTFE | 5.5 | 6.0 | 6.0 | 6.0 |
| | | pH | — | 10.2 | 10.0 | 10.0 | 10.9 |
| | Viscosity | 25° C. | mPa · s | 19.0 | 18.7 | 19.4 | 210.7 |
| | | 55° C. | mPa · s | 144.1 | 79.9 | 72.5 | 231.6 |
| | | Ratio = (viscosity at 55° C.)/(viscosity at 25° C.) | — | 7.58 | 4.27 | 3.74 | 1.10 |
| | | VTT | — | 45° C. | 55° C. | 55° C. | 55° C. |
| Mechanical stability | | Stability retention time at 60° C. | Min | 64 | 16 | 37 | 56 |

The viscosities at 55° C. in Examples 1 to 7 were significantly lower than those in Comparative Examples 1 to 4 and the VTT values were higher than 55° C. This means that an increase in the viscosity at high temperature was reduced.

The stability retention times at 60° C. in Examples 1 to 7 were significantly longer than those in Comparative Examples 1 to 4. This means that the mechanical stability was improved.

Production Example 4

A 6-L-capacity stainless steel reactor equipped with a stirrer was charged with 3580 g of deionized water, 160 g of paraffin wax, and 4.7 g of the white solid obtained in Synthesis Example 1 as a fluorine-containing surfactant. The contents in the reactor were sucked while being heated up to 70° C. and simultaneously the reactor was purged with TFE so that the oxygen therein was removed. The contents were then stirred. Into the reactor was injected 6.5 g of PPVE using TFE. To the reactor were injected 50 mg of APS as an initiator dissolved in 20 g of deionized water, whereby the pressure was adjusted to 1.5 MPaG. TFE was added to maintain the pressure at a constant value of 1.5 MPaG. At the timing when TFE consumed in the reaction reached 1466 g, 0.5 g of methanol was injected into the reactor and the reaction was allowed to continue. At the timing when TFE consumed in the reaction reached 1543 g, TFE feeding was stopped and stirring was stopped so that the reaction was finished. The air inside the reactor was discharged until the pressure reached normal pressure. The contents were taken from the reactor and cooled. The paraffin wax was removed, whereby a PTFE aqueous dispersion 4-1 was obtained.

The resulting aqueous dispersion 4-1 had a solid concentration of 30.0% by mass and an average primary particle size of 272 nm. The resulting PTFE aqueous dispersion 4-1 was diluted with deionized water to a solid concentration of about 10% by mass and coagulated under rapid stirring conditions. The coagulated wet powder was dried at 150° C. for 18 hours, whereby a PTFE powder was obtained. The resulting PTFE powder had a standard specific gravity of 2.167 and a PPVE content of 0.28% by mass. The extrusion pressure at a reduction ratio of 1500 was 58.9 MPa.

Production Example 5

A PTFE aqueous dispersion 5-1 was obtained as in Production Example 4 except that no methanol was injected into the reactor at the timing when TFE consumed in the reaction reached 1466 g and the reaction was allowed to continue.

The resulting PTFE aqueous dispersion 5-1 had a solid concentration of 30.0% by mass and an average primary particle size of 270 nm. A PTFE powder was obtained from the resulting PTFE aqueous dispersion 5-1 as in Production Example 4. The resulting PTFE powder had a standard specific gravity of 2.163 and a PPVE content of 0.28% by mass. The extrusion pressure at a reduction ratio of 1500 exceeded 100 MPa, and thus the measurement was stopped.

Example 8

The aqueous dispersion 4-1 was combined with the surfactant (c) as a nonionic surfactant. Thereby, a dispersion was prepared in which the nonionic surfactant concentration was 10 parts by mass relative to 100 parts by mass of the PTFE. Then, a column having a diameter of 20 mm was charged with 250 mL of OH anion exchange resin (trade name: AMBERJET AMJ 4002, available from Rohm and Haas Co.) and the dispersion was passed therethrough at SV=1. The aqueous dispersion obtained by passing was combined with the surfactant (c) such that the amount was 16 parts by mass relative to 100 parts by mass of the PTFE. The mixture was maintained at 65° C. for three hours and separated into a supernatant phase and a condensed phase. The condensed phase was collected, whereby a PTFE aqueous dispersion 4-2 was obtained.

The resulting PTFE aqueous dispersion 4-2 had a solid concentration of 68.3% by mass, a nonionic surfactant content of 2.7% by mass relative to the PTFE, and a fluorine-containing surfactant concentration of 420 ppb relative to the PTFE aqueous dispersion.

The resulting PTFE aqueous dispersion 4-2 was combined with the surfactant (d) in an amount of 5.0% by mass relative to the PTFE, then with ammonium lauryl sulfate in an amount of 500 ppm relative to the PTFE, and further with deionized water and ammonia water. Thereby, a PTFE aqueous dispersion 4-3 was obtained.

The resulting PTFE aqueous dispersion 4-3 had a solid concentration of 62.9% by mass and a nonionic surfactant content of 5.0% by mass relative to the PTFE. The evaluation was performed as in Example 1. It should be noted that the stability retention time was measured with a dilution having a solid concentration of 60.0% by mass. The results are shown in Table 4.

Comparative Example 5

A PTFE aqueous dispersion 5-2 and a PTFE aqueous dispersion 5-3 were obtained as in Example 8 except that the PTFE aqueous dispersion 4-1 was changed to the PTFE aqueous dispersion 5-1.

The resulting PTFE aqueous dispersion 5-2 had a solid concentration of 68.3% by mass, a nonionic surfactant content of 2.7% by mass relative to the PTFE, and a fluorine-containing surfactant concentration of 430 ppb relative to the PTFE aqueous dispersion.

The resulting PTFE aqueous dispersion 5-3 had a solid concentration of 62.9% by mass and a nonionic surfactant content of 5.0% by mass relative to the PTFE. The evaluation was performed as in Example 1. It should be noted that the stability retention time was measured with a dilution having a solid concentration of 60.0% by mass. The results are shown in Table 4.

TABLE 4

| | | | | Unit | Example 8 | Comparative Example 5 |
|---|---|---|---|---|---|---|
| PTFE | | Modifying monomer | | — | PPVE | PPVE |
| PTFE aqueous dispersion | Amounts of main components | Nonionic surfactant | (c) | Mass %/PTFE | 2.7 | 2.7 |
| | | | (d) | Mass %/PTFE | 2.3 | 2.3 |
| | | Anion | Ammonium lauryl sulfate | ppm/PTFE | 500 | 500 |
| | | HLB value | | — | 13.53 | 13.53 |
| | | Solid concentration | | Mass % | 62.9 | 62.9 |
| | | Amount of nonionic surfactants | | Mass %/PTFE | 5.0 | 5.0 |
| Physical properties | | pH | | — | 9.5 | 9.5 |
| | Viscosity | 25°C | | mPa · s | 29.9 | 30.2 |
| | | 55°C | | mPa · s | 48.3 | 85.3 |
| | | Ratio = (viscosity at 55° C.)/(viscosity at 25° C.) | | — | 1.62 | 2.82 |
| | | VTT | | — | 55° C. | 45° C. |
| Mechanical stability | | Stability retention time at 60° C. | | Min | 31 | 18 |

The viscosity at 55° C. in Example 8 was significantly lower than that in Comparative Example 5 and the VTT value was not lower than 55° C. This means that an increase in the viscosity at high temperature was reduced.

The stability retention time at 60° C. in Example 8 was significantly longer than that in Comparative Example 5. This means that the mechanical stability was improved.

Example 9

The following components were mixed in the stated order.

(A) PTFE aqueous dispersion 1-3 obtained in Example 1:80.7 parts (B) Glycerol: 4.7 parts (C) Depolymerizable acrylic resin particulate emulsion (butyl methacrylate resin, average particle size 0.3 μm, solid concentration 40%): 11.7 parts (D) Nonionic surfactant (polyoxyethylene tridecyl ether, Dispanol TOC available from NOF Corp., 50% aqueous solution): 4.7 parts (Other) Thickening agent (25% aqueous solution of sodium lauryl sulfate): 1.9 parts (E) Water: 0.5 parts For the resulting aqueous dispersion composition for coating, the following properties were examined. The results are shown in Table 5.

(Storage Stability)

A polyethylene bottle was charged with 500 g of the aqueous dispersion composition for coating and left to stand in a 40° C. constant-temperature chamber for one month. The storage stability was evaluated by the redispersibility. The evaluation was performed using a 150-mesh wire net. The cases where all particles passed through the wire net were evaluated as good, while the cases where residues were present on the wire net were evaluated as poor. The resulting aqueous dispersion composition for coating was sprayed on an unblasted aluminum plate and dried at 80° C. for 15 minutes. The resulting dry coating surface was observed using an optical microscope for checking the occurrence of mud crack, and no mud crack was found. The dry coating film was baked at 380° C. for 20 minutes, whereby a melted coating film was formed. For this coating film, the following coating film physical properties were examined.

(Appearance of Coating Film)

The coating surface was observed using an optical microscope.

(Pencil Hardness)

The pencil hardness was evaluated at 25° C. in conformity with the method described in JIS K5600.

(Crack Limit Thickness)

For a variety of thicknesses, the minimum thickness at which crack occurred was defined as the crack limit thickness.

(Coloring)

The coating film was visually observed for coloring.

(Alkyl Phenol Content)

The alkyl phenol content was analyzed by liquid chromatography (column: ASAHIPAC GS-310, eluent: acetonitrile/water=50/50 ratio by volume, flow rate: 1.2 mL/min, column temperature: 25° C. to 28° C., detection: UV (230 nm)). The cases with no detection were evaluated as good, while the cases with detection were evaluated as poor.

(Gun Clogging)

Iwata spray gun W88 (nozzle diameter 1.5 mm) was used for coating while its trigger was intermittently opened and closed at 9.8 N (5 kgf), with the dispensing valve being turned backwards once and the pattern valve being completely closed. The number of dispensing operations until no coating material was dispensed through the gun was counted.

(White Spots)

Iwata spray gun W88 (nozzle diameter 1.5 mm) was used for coating on 10 sheets of 20 cm×60 cm black kraft while its trigger was intermittently opened and closed at 9.8 N (5 kgf), with the dispensing valve being turned backwards once and the pattern valve being completely closed. The number of shots until white spots occurred was visually counted.

Example 10

The PTFE aqueous dispersion 1-3 of Example 1 used in Example 9 was changed to the PTFE aqueous dispersion 4-3 obtained in Example 8 and the components were mixed in the formulation shown in Table 5, whereby an aqueous dispersion composition for coating was obtained. The measurements were performed as in Example 9. The results are shown in Table 5.

Comparative Example 6

The PTFE aqueous dispersion 1-3 of Example 1 used in Example 9 was changed to the PTFE aqueous dispersion 5-3 obtained in Comparative Example 5 and the components were mixed in the formulation shown in Table 5, whereby an aqueous dispersion composition for coating was obtained. The measurements were performed as in Example 9. The results are shown in Table 5.

(C) Nonionic surfactant (specific gravity about 1.0) Nonionic surfactant (polyoxyethylene tridecyl ether, Dispanol TOC available from NOF Corp., 50% aqueous solution): 8.8 parts (D) Other additives Glycerol: 3.5 parts Hydrocarbon solvent: 1.4 parts Water: 3.2 parts For the resulting resin aqueous dispersion composition, the properties were examined. The results are shown in Table 6.

Example 12

The PTFE aqueous dispersion 1-3 of Example 1 used in Example 11 was changed to the PTFE aqueous dispersion

| | | Example 9 | Example 10 | Comparative Example 6 |
|---|---|---|---|---|
| Formulation of composition | | | | |
| PTFE aqueous dispersion 1-3 (composition of Example 1, solid content 58.1%) | Parts by weight | 90.7 | | |
| PTFE aqueous dispersion 4-3 (composition of Example 8, solid content 62.9%) | Parts by weight | | 74.5 | |
| PTFE aqueous dispersion 5-3 (composition of Comparative Example 5, solid content 62.9%) | Parts by weight | | | 74.5 |
| Glycerol | Parts by weight | 4.7 | 4.7 | 4.7 |
| Depolymerizable acrylic resin (solid content 40% aqueous solution) | Parts by weight | 11.7 | 11.7 | 11.7 |
| Dispanol TOC (50% aqueous solution) | Parts by weight | 4.7 | 4.7 | 4.7 |
| Thickening agent | Parts by weight | 1.9 | 1.9 | 1.9 |
| Water | Parts by weight | 0.5 | 6.6 | 6.6 |
| Total | Parts by weight | 104.1 | 104.1 | 104.1 |
| Prysical properties of composition | | | | |
| Solid concentration | Mass % | 45.0 | 45.0 | 45.0 |
| Viscosity (25° C.) | mPa · s | 283 | 267 | 290 |
| pH | | 8.8 | 8.8 | 8.9 |
| Storage stability (redispensibility at 40° C. × 1 month) | | Good | Good | Good |
| Physical properties of coating film | | | | |
| Occurrence of mud crack | | No | No | No |
| Pencil hardness (25° C.) | | 2H | 2H | 2H |
| Appearance of baked coating film | | No abnormality | No abnormality | No abnormality |
| Crack limit thickness | μm | 40 | 40 | 40 |
| Coloring | | No | No | No |
| Number of shots until occurence of gun clogging | Times | >300 | >300 | 100 |
| Number of shots until occurence of white spots | Times | 200 | 190 | 110 |

The number of shots until occurrence of gun clogging and the number of shots until occurrence of white spots in each of Example 9 and Example 10 were significantly greater than those in Comparative Example 6. This means that the mechanical stability was improved.

Example 11

The following components were mixed in the stated order.

(A) PTFE aqueous dispersion 1-3 obtained in Example 1:80.6 parts (B) Depolymerizable acrylic resin particulate emulsion (specific gravity about 1.1, butyl methacrylate resin, average particle size 0.6 μm, solid concentration 40%): 14.1 parts 4-3 obtained in Example 8 and the components were mixed in the formulation shown in Table 6, whereby an aqueous dispersion composition for coating was obtained. For the resulting resin aqueous dispersion composition, the properties were examined. The results are shown in Table 6.

Comparative Example 7

The PTFE aqueous dispersion 1-3 of Example 1 used in Example 11 was changed to the PTFE aqueous dispersion 5-3 obtained in Comparative Example 5 and the components were mixed in the formulation shown in Table 6. For the resulting resin aqueous dispersion composition, the properties were examined. The results are shown in Table 6.

TABLE 6

| | | | Example 11 | Example 12 | Comparative Example 7 |
|---|---|---|---|---|---|
| Formulation of composition-Physical properties | | | | | |
| PTFE aqueous dispersion 1-3 (composition of Example 1, solid content 58.1%) | | | | | |
| PTFE particulate | Particulate specific gravity about 2.2 | Parts by weight | 46.9 | | |
| Nonionic Surfactant (a) | | Parts by weight | 1.9 | | |
| Nonionic Surfactant (b) | | Parts by weight | 0.9 | | |
| Water | | Parts by weight | 30.9 | | |
| Subtotal | | Parts by weight | 80.6 | | |
| PTFE aqueous dispersion 4-3 (composition of Example 8, solid content 62.9%) | | | | | |
| PTFE particulate | Particulate specific gravity about 2.2 | Parts by weight | | 46.9 | |
| Nonionic Surfactant (c) | | Parts by weight | | 1.3 | |
| Nonionic Surfactant (d) | | Parts by weight | | 1.1 | |
| Water | | Parts by weight | | 25.3 | |
| Subtotal | | Parts by weight | | 74.5 | |
| PTFE aqueous dispersion 5-3 (composition of Comparative Example 5, solid content 62.9%) | | | | | |
| PTFE particulate | Particulate specific gravity about 2.2 | Parts by weight | | | 46.9 |
| Nonionic Surfactant (c) | | Parts by weight | | | 1.3 |
| Nonionic Surfactant (d) | | Parts by weight | | | 1.1 |
| Water | | Parts by weight | | | 25.3 |
| Subtotal | | Parts by weight | | | 74.5 |
| Depolymerizable acrylic resin (solid content 40%) | | | | | |
| Acrylic resin particulate | Particulate specific gravity about 1.1 | Parts by weight | 5.6 | 5.6 | 5.6 |
| Water | | Parts by weight | 8.4 | 8.4 | 8.4 |
| Subtotal | | Parts by weight | 14.1 | 14.1 | 14.1 |
| Dispanol TOC (50% aqueous solution) | | Parts by weight | 8.8 | 8.4 | 8.4 |
| Glycerol | | Parts by weight | 3.5 | 3.5 | 3.5 |
| Hydrocarbon solvent | | Parts by weight | 1.4 | 1.4 | 1.4 |
| Water | | Parts by weight | 8.1 | 8.7 | 8.7 |
| Total | | Parts by weight | 111.5 | 111.5 | 111.5 |
| Solid concentration | | % by weight | 42.0 | 42.0 | 42.0 |
| Viscosity (25° C.) | | mPa · s | 274 | 305 | 286 |
| pH | | — | 9.1 | 8.9 | 9.0 |
| Storage stability (redispensibility at 40° C. × 1 month) | | — | Good | Good | Good |
| Amount of nonionic surfactant required for filling voids (theoretical value) | | g | 8.3 | 8.3 | 8.3 |
| Nonionic surfactant content | | g | 7.2 | 6.8 | 6.8 |
| Occupancy of total nonionic surfactant content to theoretical voids | | % | 87 | 86 | 86 |
| Physical properties of coating film | | | | | |
| Occurence of mud crack | | — | No | No | No |
| Pencil hardness (25° C.) | | — | 2H | 2H | 2H |
| Crack limit thickness | | μm | >100 | >100 | >100 |
| Number of shots until occurence of gun clogging | | Times | 180 | 190 | 110 |
| Number of shots until occurence of white spots | | Times | 100 | 110 | 50 |

The number of shots until occurrence of gun clogging and the number of shots until occurrence of white spots in each of Example 11 and Example 12 were significantly greater than those in Comparative Example 7. This means that the mechanical stability was improved.

What is claimed is:

1. A polytetrafluoroethylene aqueous dispersion comprising polytetrafluoroethylene and a nonionic surfactant, the aqueous dispersion having a polytetrafluoroethylene solid concentration of 50 to 70% by mass, the aqueous dispersion being substantially free from a fluorine-containing surfactant, and the aqueous dispersion having a viscosity at 55° C. of 50 mPa·s or lower, wherein the nonionic surfactant includes oxyalkylene units, and an average number of oxyalkylene units in the nonionic surfactant is 10.2 or more.

2. The polytetrafluoroethylene aqueous dispersion according to claim 1, wherein the fluorine-containing surfactant amounts to 100 ppb or more and 1.0 ppm or less.

3. The polytetrafluoroethylene aqueous dispersion according to claim 1, wherein the aqueous dispersion has a ratio (viscosity at 55° C.)/(viscosity at 25° C.) of 4.00 or lower.

4. The polytetrafluoroethylene aqueous dispersion according to claim 1, wherein the nonionic surfactant is contained in an amount of 4% by mass or more and 12% by mass or less relative to the polytetrafluoroethylene.

5. The polytetrafluoroethylene aqueous dispersion according to claim 1, wherein the aqueous dispersion has a stability retention time at 60° C. of 30 minutes or longer.

6. The polytetrafluoroethylene aqueous dispersion according to claim 1, wherein the aqueous dispersion has a stability retention time at 60° C. of 40 minutes or longer.

7. The polytetrafluoroethylene aqueous dispersion according to claim 1, wherein the nonionic surfactant contains a compound represented by the following formula (i):

$$R^3—O—A^1—H \quad (i)$$

wherein $R^3$ is a C8-C18 alkyl group; and $A^1$ is a polyoxyalkylene chain including an oxyethylene unit or an oxypropylene unit.

8. The polytetrafluoroethylene aqueous dispersion according to claim 7, wherein $R^3$ is an alkyl group represented by the following formula (i-1):

$$CHR^{31}R^{32}, — \quad (i\text{-}1)$$

wherein $R^{31}$ is a hydrogen atom or a C1-C16 alkyl group; $R^{32}$ is a C1-C17 alkyl group; and $R^{31}$ and $R^{32}$ have a total carbon number of 7 to 17.

9. The polytetrafluoroethylene aqueous dispersion according to claim 7, wherein $R^3$ is a C8-C18 alkyl group having an average number of methyl groups of 2.0 or more.

10. The polytetrafluoroethylene aqueous dispersion according to claim 7, wherein in the formula (i), $R^3$ is a 2,6,8-trimethyl-4-nonyl group.

11. The polytetrafluoroethylene aqueous dispersion according to claim 10, wherein in the formula (i), $A^1$ is a polyoxyethylene chain having an average number of oxyethylene units of 10.2 to 10.8.

12. The polytetrafluoroethylene aqueous dispersion according to claim 10, wherein the nonionic surfactant has a HLB value of 14.00 or higher.

13. The polytetrafluoroethylene aqueous dispersion according to claim 10, wherein the nonionic surfactant is a mixture of compounds represented by the formula (i) with Als having different average numbers of oxyethylene units.

14. The polytetrafluoroethylene aqueous dispersion according to claim 13, wherein the nonionic surfactant is a mixture of:

a compound represented by the formula (i) wherein $R^3$ is a 2,6,8-trimethyl-4-nonyl group and $A^1$ is a polyoxyethylene chain having an average number of oxyethylene units of 7.0 to 9.0; and a compound represented by the formula (i) wherein $R^3$ is a 2,6,8-trimethyl-4-nonyl group and $A^1$ is a polyoxyethylene chain having an average number of oxyethylene units of 10.0 to 12.0.

15. The polytetrafluoroethylene aqueous dispersion according to claim 14, wherein the nonionic surfactant is a mixture of:

a compound (first component) represented by the formula (i) wherein $R^3$ is a 2,6,8-trimethyl-4-nonyl group and $A^1$ is a polyoxyethylene chain having an average number of oxyethylene units of 7.0 to 9.0; and a compound (second component) represented by the formula (i) wherein $R^3$ is a 2,6,8-trimethyl-4-nonyl group and $A^1$ is a polyoxyethylene chain having an average number of oxyethylene units of 10.0 to 12.0, and the first component is contained in an amount of 5% by mass or more and 25% by mass or less and the second component is contained in an amount of 75% by mass or more and 95% by mass or less.

16. The polytetrafluoroethylene aqueous dispersion according to claim 1, wherein the aqueous dispersion is an aqueous coating material.

17. A coating film obtained by applying the polytetrafluoroethylene aqueous dispersion according to claim 1.

18. An impregnated film obtained by impregnating the polytetrafluoroethylene aqueous dispersion according to claim 1.

19. The polytetrafluoroethylene aqueous dispersion according to claim 1, wherein the average number of oxyalkylene units in the nonionic surfactant is 10.3 or more.

* * * * *